United States Patent
Billa et al.

(10) Patent No.: US 10,229,144 B2
(45) Date of Patent: Mar. 12, 2019

(54) NSP MANAGER

(71) Applicant: Cavium, LLC, Santa Clara, CA (US)

(72) Inventors: Satyanarayana Lakshmipathi Billa, Sunnyvale, CA (US); Rajan Goyal, Saratoga, CA (US)

(73) Assignee: Cavium, LLC, Santa Clara, CA (US)

( * ) Notice: Subject to any disclaimer, the term of this patent is extended or adjusted under 35 U.S.C. 154(b) by 716 days.

(21) Appl. No.: 14/207,933

(22) Filed: Mar. 13, 2014

(65) Prior Publication Data

US 2014/0280357 A1    Sep. 18, 2014

Related U.S. Application Data

(60) Provisional application No. 61/799,013, filed on Mar. 15, 2013.

(51) Int. Cl.
*G06F 17/30* (2006.01)
*G06F 7/00* (2006.01)
(Continued)

(52) U.S. Cl.
CPC ........ *G06F 17/30327* (2013.01); *G06F 3/067* (2013.01); *G06F 3/0619* (2013.01);
(Continued)

(58) Field of Classification Search
CPC ........ G06F 17/30961; G06F 17/30327; G06F 17/30864; G06F 17/30595;
(Continued)

(56) References Cited

U.S. PATENT DOCUMENTS 5,107,361 A    4/1992  Kneidinger et al.
5,463,777 A   10/1995  Bialkowski et al.
(Continued)

FOREIGN PATENT DOCUMENTS

CN    1535460 A    10/2004
CN  101351784 A     1/2009
(Continued)

OTHER PUBLICATIONS

Gupta, P., "Algorithms for Packet Routing Lookups and Packet Classification," Dissertation submitted to the Dept. of Comp. Science of Stanford Univ. (Dec. 2000).
(Continued)

*Primary Examiner* — Usmaan Saeed
*Assistant Examiner* — Raquel Perez-Arroyo
(74) *Attorney, Agent, or Firm* — Hamilton, Brook, Smith & Reyonlds, P.C.

(57) ABSTRACT

In an embodiment, a method of updating a memory with a plurality of memory lines, the memory storing a tree, a plurality of buckets, and a plurality of rules, can include maintaining a copy of the memory with a plurality of memory lines. The method can further include writing a plurality of changes to at least one of the tree, the plurality of buckets, and the plurality of rules to the copy. The method can additionally include determining whether each of the plurality of changes is an independent write or a dependent write. The method can further include merging independent writes to the same line of the copy. The method further includes transferring updates from the plurality of lines of the copy to the plurality of lines of the memory.

21 Claims, 40 Drawing Sheets

(51) Int. Cl.
*G06F 3/06* (2006.01)
*G06F 11/16* (2006.01)

(52) U.S. Cl.
CPC .......... *G06F 3/0646* (2013.01); *G06F 11/167* (2013.01); *G06F 11/1666* (2013.01)

(58) Field of Classification Search
CPC ......... G06F 17/30625; G06F 17/30584; G06F 3/061; G06F 3/0611; G06F 3/0613; G06F 3/0635; G06F 3/0631; G06Q 10/06; H04L 45/745
USPC ........................................................ 707/797
See application file for complete search history.

(56) References Cited

U.S. PATENT DOCUMENTS

| | | | |
|---|---|---|---|
| 5,909,699 | A | 6/1999 | Sarangdhar et al. |
| 6,233,575 | B1 | 5/2001 | Agrawal et al. |
| 6,298,340 | B1 | 10/2001 | Calvignac et al. |
| 6,467,019 | B1 | 10/2002 | Washburn |
| 6,473,763 | B1 | 10/2002 | Corl et al. |
| 6,476,763 | B2 | 11/2002 | Allen |
| 6,578,131 | B1* | 6/2003 | Larson .................... G06F 9/526 707/E17.036 |
| 6,587,466 | B1 | 7/2003 | Bhattacharya et al. |
| 6,735,600 | B1 | 5/2004 | Andreev |
| 6,778,530 | B1 | 8/2004 | Greene |
| 6,868,414 | B2 | 3/2005 | Khanna et al. |
| 6,980,555 | B2 | 12/2005 | Mar |
| 7,023,807 | B2 | 4/2006 | Michels et al. |
| 7,039,641 | B2 | 5/2006 | Woo |
| 7,366,728 | B2 | 4/2008 | Corl et al. |
| 7,415,472 | B2 | 8/2008 | Testa |
| 7,441,022 | B1 | 10/2008 | Schuba et al. |
| 7,509,300 | B2 | 3/2009 | Salmi et al. |
| 7,522,581 | B2 | 4/2009 | Acharya et al. |
| 7,536,476 | B1 | 5/2009 | Alleyne |
| 7,546,234 | B1 | 6/2009 | Deb et al. |
| 7,548,944 | B2 | 6/2009 | Sahita |
| 7,571,156 | B1 | 8/2009 | Gupta et al. |
| 7,937,355 | B2 | 5/2011 | Corl et al. |
| 8,005,869 | B2 | 8/2011 | Corl et al. |
| 8,156,507 | B2 | 4/2012 | Brjazovski et al. |
| 8,447,120 | B2 | 5/2013 | Ji et al. |
| 8,477,611 | B2 | 7/2013 | Lim |
| 8,856,203 | B1 | 10/2014 | Schelp et al. |
| 8,934,488 | B2 | 1/2015 | Goyal et al. |
| 8,937,952 | B2 | 1/2015 | Goyal et al. |
| 8,937,954 | B2 | 1/2015 | Goyal et al. |
| 9,137,340 | B2 | 9/2015 | Goyal et al. |
| 9,183,244 | B2 | 11/2015 | Bullis et al. |
| 9,191,321 | B2 | 11/2015 | Goyal et al. |
| 9,195,939 | B1 | 11/2015 | Goyal et al. |
| 9,208,438 | B2 | 12/2015 | Goyal et al. |
| 9,430,511 | B2 | 8/2016 | Billa et al. |
| 9,595,003 | B1 | 3/2017 | Bullis et al. |
| 10,083,200 | B2 | 9/2018 | Goyal et al. |
| 2002/0023089 | A1 | 2/2002 | Woo |
| 2002/0124086 | A1 | 9/2002 | Mar |
| 2002/0143747 | A1 | 10/2002 | Tal et al. |
| 2003/0115403 | A1* | 6/2003 | Bouchard .......... G06F 13/1647 711/5 |
| 2003/0123459 | A1 | 7/2003 | Liao |
| 2003/0135704 | A1 | 7/2003 | Martin |
| 2004/0095936 | A1 | 5/2004 | O'Neill et al. |
| 2005/0013293 | A1 | 1/2005 | Sahita |
| 2005/0240604 | A1 | 10/2005 | Corl et al. |
| 2006/0026138 | A1 | 2/2006 | Robertson et al. |
| 2006/0098652 | A1 | 5/2006 | Singh et al. |
| 2006/0136570 | A1 | 6/2006 | Pandya |
| 2006/0155915 | A1 | 7/2006 | Pereira |
| 2006/0221967 | A1 | 10/2006 | Narayan et al. |
| 2006/0253465 | A1 | 11/2006 | Willis et al. |
| 2007/0168377 | A1 | 7/2007 | Zabarsky |
| 2008/0031258 | A1 | 2/2008 | Acharya et al. |
| 2008/0109392 | A1 | 5/2008 | Nandy |
| 2008/0120441 | A1 | 5/2008 | Loewenstein |
| 2008/0140631 | A1 | 6/2008 | Pandya |
| 2008/0177994 | A1 | 7/2008 | Mayer |
| 2008/0310644 | A1 | 12/2008 | Chen et al. |
| 2009/0125470 | A1 | 5/2009 | Shah et al. |
| 2009/0185568 | A1 | 7/2009 | Cho et al. |
| 2009/0274384 | A1 | 11/2009 | Jakobovits |
| 2010/0034202 | A1 | 2/2010 | Lu et al. |
| 2010/0067535 | A1 | 3/2010 | Ma et al. |
| 2010/0110936 | A1 | 5/2010 | Bailey et al. |
| 2010/0175124 | A1 | 7/2010 | Miranda |
| 2011/0038375 | A1 | 2/2011 | Liu et al. |
| 2011/0137930 | A1 | 6/2011 | Hao et al. |
| 2011/0167416 | A1 | 7/2011 | Sager et al. |
| 2011/0219010 | A1 | 9/2011 | Lim |
| 2011/0270889 | A1 | 11/2011 | Stevens et al. |
| 2013/0036102 | A1 | 2/2013 | Goyal et al. |
| 2013/0039366 | A1 | 2/2013 | Goyal et al. |
| 2013/0060727 | A1 | 3/2013 | Goyal et al. |
| 2013/0070753 | A1 | 3/2013 | Sahni et al. |
| 2013/0085978 | A1 | 4/2013 | Goyal et al. |
| 2013/0166886 | A1 | 6/2013 | Sasanka et al. |
| 2013/0201831 | A1* | 8/2013 | Tal ........................ H04L 47/625 370/235 |
| 2013/0218853 | A1 | 8/2013 | Bullis et al. |
| 2013/0232104 | A1 | 9/2013 | Goyal et al. |
| 2013/0238576 | A1* | 9/2013 | Binkert ............. G06F 17/30961 707/695 |
| 2013/0282766 | A1 | 10/2013 | Goyal et al. |
| 2014/0279850 | A1 | 9/2014 | Goyal et al. |
| 2014/0281809 | A1 | 9/2014 | Goyal et al. |
| 2015/0117461 | A1 | 4/2015 | Goyal et al. |
| 2016/0071016 | A1 | 3/2016 | Goyal et al. |

FOREIGN PATENT DOCUMENTS

| | | |
|---|---|---|
| CN | 101501637 A | 8/2009 |
| JP | 2002290447 A | 10/2004 |
| WO | WO 2009/145712 A1 | 12/2009 |
| WO | WO 2013/020002 A1 | 2/2013 |
| WO | WO 2013/020003 A1 | 2/2013 |

OTHER PUBLICATIONS

Zhang, B., et al., "On Constructing Efficient Shared Decision Trees for Multiple Packet Filters," Dept. Computer Science Rice University (2010).

Abdelghani, M., et al. "Packet Classification Using Adaptive Rule Cutting," IEEE (2005).

Yu, L., et al., "A Novel IP Packet Classification Algorithm Based on Hierarchical Intelligent Cuttings," IEEE 6th Int. Conf. on ITS Telecom. Proceedings 1033-1036 (2006).

Theiling, Henrik "Generating Decision Trees for Decoding Binaries" ACM 2001 [Online] Downloaded Jul. 14, 2015 http://delivery.acm.org/1 0.1145/390000/384213/p112-theiling.pdf?ip=151.207.250.51&id=384213&acc=ACTIVE%20SERVICE&key=C15944E53D0ACA63%2E4D4702B0C3E38B35%2 E4 D4 702B0C3 E38B35%2E4 D4 702B0C3 E38B35&C FI D=528083660&C FTOKEN= 15678279& acm =1436903293 abc.

http://en.wikipedia.org/Access_control_list, downloaded Feb. 4, 2011.

Baboescu, F., et al., "Packet Classification for Core Routers: Is there an alternative to CAMs?", *Proceedings f the 22nd IEEE Conference on Computer Communications (INFOCOM '03)*, vol. 1, pp. 53-63 (2003).

Baboescu, F. and Varghese, G., "Scalable Packet Classification," *Proceedings of the ACMSIGCOMM '01 Conference on Applications, Technologies, Architectures, and Protocols for Computer Communication (SIGCOMM '01)*, pp. 199-210 (2001).

Gupta, P. and McKeown, N. "Packet Classification on Multiple Fields," *Proceedings of SIGCOMM '99 Conference on Applications, Technologies, Architectures, and Protocols for Computer Communication (SIGCOMM '99)*, pp. 147-160 (1999).

(56) References Cited

OTHER PUBLICATIONS

Gupta, P. and McKeown, N. "Classifying Packets With Hierarchical Intelligent Cuttings," *IEEE Micro*, 20(1):34-41 (2000).

Qi, Y., et al., "Packet Classification Algorithms: From Theory to Practice," *Proceedings of the 28th IEEE Conference on Computer Communications (INFOCOM '09)*, pp. 648-656 (2009).

Singh, S., et al., "Packet Classification Using Multidimensional Cutting," *Proceedings of the ACMSIGCOMM '03 Conference on Applications, Technologies, Architectures, and Protocols for Computer Communication (SIGCOMM '03)*, pp. 213-224 (2003).

Pong et al., HaRP: Rapid Packet Classification via Hashing Round-Down Prefixes, *IEEE Transactions Parallel and Distributed Systems, IEEE Service Center*, v. 22(7), pp. 1105-1119 (2011).

\* cited by examiner

| CLUSTER INDEX | UNIFIED MIGRATION CREDITS | REMOTE REQUEST CREDIT | XBR CREDIT |
|---|---|---|---|
| 0 | – | – | – |
| 1 | 5 | 8 | 16 |
| 2 | 5 | 8 | 16 |
| 3 | 5 | 8 | 16 |
| 4 | 5 | 8 | 16 |
| 5 | 5 | 8 | 16 |
| 6 | 5 | 8 | 16 |
| 7 | 5 | 8 | 16 |

FIG. 10A

| CLUSTER INDEX | TREE MIGRATION CREDITS | BUCKET MIGRATION CREDITS | REMOTE REQUEST CREDIT | XBR CREDIT |
|---|---|---|---|---|
| 0 | – | – | – | – |
| 1 | 5 | 5 | 8 | 16 |
| 2 | 5 | 5 | 8 | 16 |
| 3 | 5 | 5 | 8 | 16 |
| 4 | 5 | 5 | 8 | 16 |
| 5 | 5 | 5 | 8 | 16 |
| 6 | 5 | 5 | 8 | 16 |
| 7 | 5 | 5 | 8 | 16 |

FIG. 10B

← CLOCK CYCLES

0 | MIGR0_0
1 | REQ0_0
2 | MIGR0_0
3 | MIGR0_0
... | REQ1_0
... | MIGR0_0

FIG. 11A

EXAMPLE_1: INTERLEAVING OF TYPES

MIGR0_0: MIGRATION DATA BELONGING TO MIGRATE 0, DESTINATION CLUSTER = 0
REQ0_0: REQUEST 0, DESTINATION CL = 0
REQ1_0: REQUEST 1, DESTINATION CL = 0

← CLOCK CYCLES

0 | MIGR0_0
1 | RESP0_1
2 | RESP0_1
3 | MIGR0_0
... | REQ0_0
...

FIG. 11B

EXAMPLE_2: INTERLEAVING OF TYPES AND DESTINATION

MIGR0_0: MIGRATE 0, DEST CL = 0
RESP0_1: RESPONSE 0, DEST CL = 1
REQ0_0: REQUEST 0, DEST CL = 0

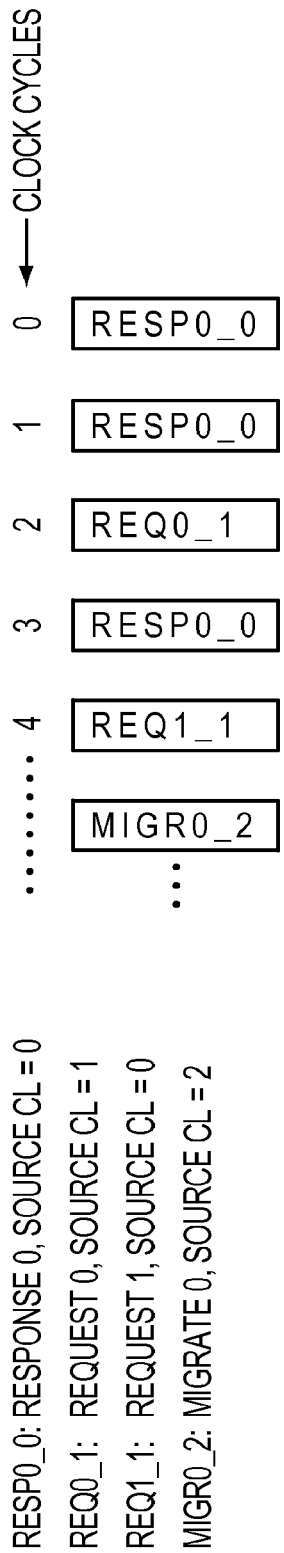

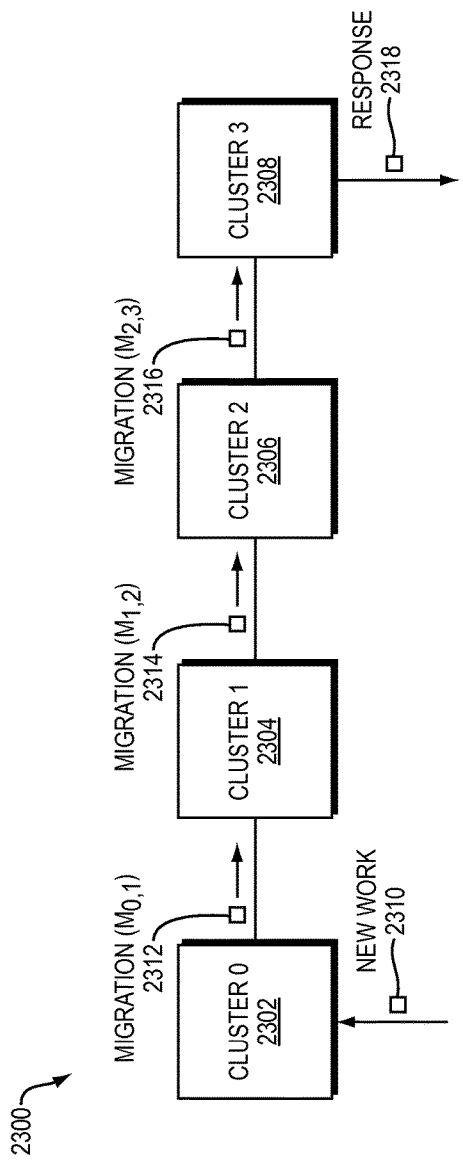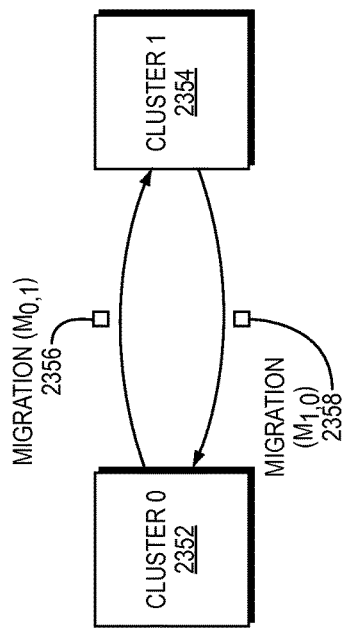
FIG. 23A
FIG. 23B

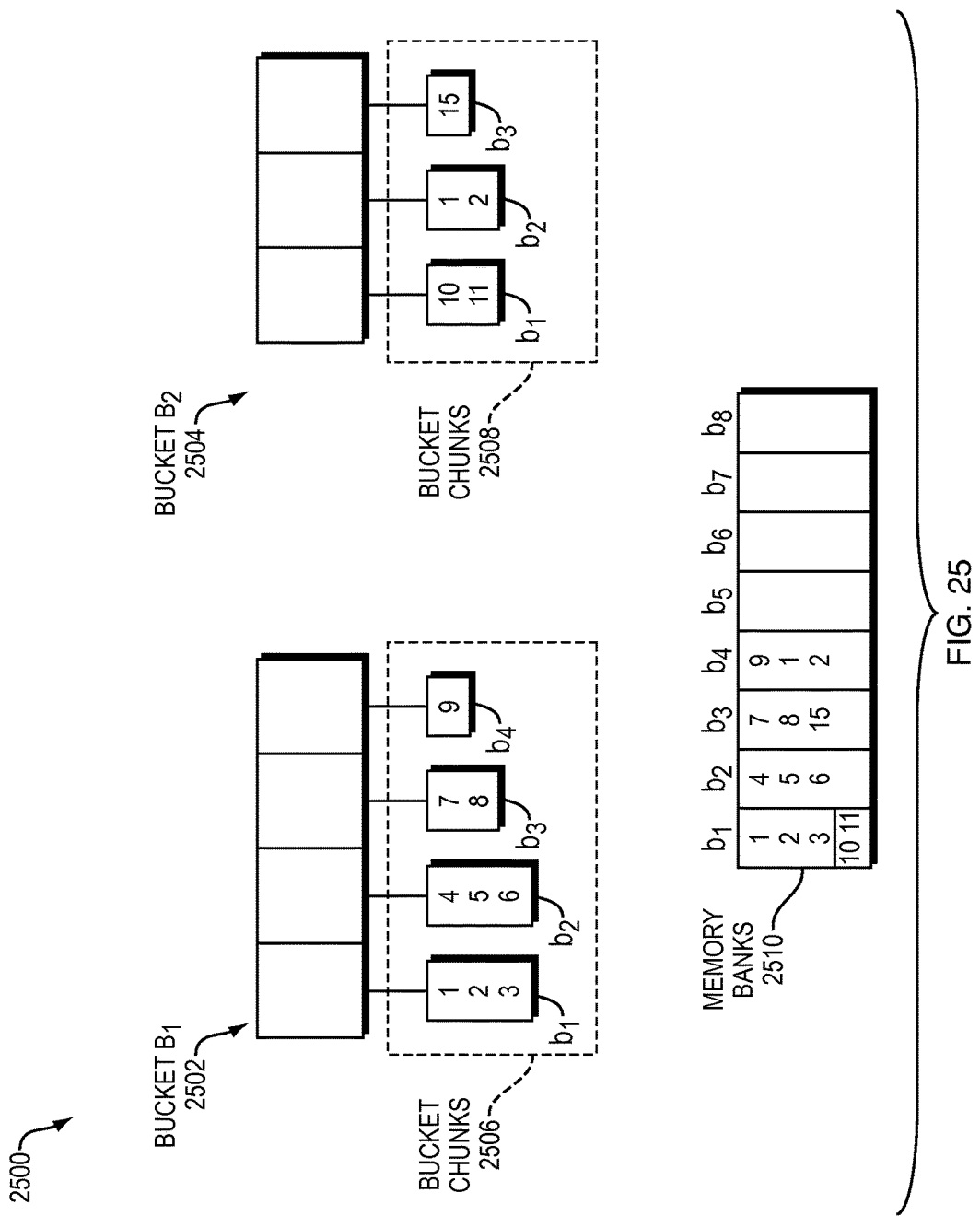

NSP MANAGER

RELATED APPLICATIONS

This application claims the benefit of U.S. Provisional Application No. 61/799,013, filed on Mar. 15, 2013.

This application is being co-filed on Mar. 13, 2014 with U.S. patent application Ser. No. 14/207,928 entitled "Merging Independent Writes, Separating Dependent And Independent Writes, And Error Roll Back" by Satyanarayana Lakshmipathi Billa and Rajan Goyal.

This application is related to "A System And Method For Storing Lookup Request Rules In Multiple Memories," U.S. application Ser. No. 13/565,271, filed on Aug. 2, 2012, "A Method And Apparatus Encoding A Rule For A Lookup Request In A Processor," U.S. application Ser. No. 13/565,389, filed on Aug. 2, 2012, "A System And Method For Rule Matching In A Processor," U.S. application Ser. No. 13/565,406, filed on Aug. 2, 2012, "A Method And Apparatus For Managing Transfer Of Transport Operations From A Cluster In A Processor," U.S. application Ser. No. 13/565,743, filed on Aug. 2, 2012, and "Incremental Update," U.S. application Ser. No. 13/565,755, filed on Aug. 2, 2012.

The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

In an embodiment, a method of managing a database including a tree, a plurality of buckets, and a plurality of rules, includes providing a memory with a plurality of cluster memories. Each cluster memory has a plurality of banks and a plurality of access ports. The memory stores the database across the plurality of cluster memories. The method also includes packing nodes of the tree in each of the plurality of cluster memories such that walking the tree accesses a minimal amount of cluster memories in the memory and walking the tree accesses each particular cluster memory no more than once.

In an embodiment, the method includes packing a first particular number of bucket chunks per bucket and a second particular number of rule pointers per bucket chunk based on addresses of the rules. Packing the first particular number of bucket chunks per bucket and the second particular number of rule pointers per bucket can include storing each of the first particular number of consecutively addressed bucket chunks in a respective unique memory bank, where the first particular number of bucket chunks is based on a quantity of the access ports.

In an embodiment, the method includes allocating the rules in the memory in a same order as an order of the rules in bucket chunks of the buckets.

In an embodiment, the method includes replicating a rule or a chunk of rules across a first and second bank in a particular cluster memory such that the rule or chunk of rules can be accessed on the second bank when the first bank has a memory access conflict during a particular clock cycle.

In an embodiment, the method includes distributing rules and buckets across a first cluster memory and a second cluster memory within the memory and enabling processing of the rules by a rule match engine within the first cluster memory and a rule match engine within the second cluster memory.

In an embodiment, the method includes storing a first rule of a particular bucket of the plurality of buckets in a particular cluster memory of the plurality of cluster memories and storing any other rules of the particular bucket in the particular cluster memory.

In an embodiment, the method includes allocating a node of the tree in a particular cluster memory of the memory and allocating a bucket in the memory that the node of the tree points to in the particular cluster memory.

In an embodiment, the method includes allocating a bucket in a particular cluster memory of the memory and allocating a rule associated with the bucket in the particular cluster memory storing the bucket.

In an embodiment, the method includes allocating the rules in chunks according to an order of the buckets, determining a need to replicate the rules across the plurality of cluster memories and replicating the rules across the plurality of cluster memories, if necessary.

In an embodiment, the method can include determining at least one division of the database, the database including the tree, the plurality of buckets, and the plurality of rules. The division can be based on either a horizontal division or a vertical division. The horizontal division can separate the tree based on a depth of data of the tree. The vertical division can separate the tree based on sub-trees of the tree. The method can further include generating at least one memory request to store each division of the database in a respective cluster memory.

In an embodiment, the method can also include maintaining relationships among the tree, the plurality of buckets, and the plurality of rules. Allocating the memory can include allocating the tree, the plurality of buckets, and the plurality of rules to respective memory blocks based on the relationships to avoid migrations, remote reads, and bank conflicts by storing rules in a bucket of an optimal size and storing the tree, the plurality of buckets, and the plurality of rules within the same cluster across multiple banks.

In an embodiment, a system for managing a database including a tree, a plurality of buckets, and a plurality of rules includes a memory with a plurality of cluster memories. Each cluster memory has a plurality of banks and a plurality of access ports. The memory stores the database across the plurality of cluster memories. The system also includes a tree packing module configured to pack nodes of the tree in each of the plurality of cluster memories such that walking the tree accesses a minimal amount of cluster memories in the memory and walking the tree accesses each particular cluster memory no more than once.

In another embodiment, the system can include a bucket packet module configured to pack a first particular number of bucket chunks per bucket and a second particular number of rule pointers per bucket by storing each of the first particular number of consecutively addressed bucket chunks in a respective unique memory bank, where the first particular number of bucket chunks is based on a quantity of the access ports.

In an embodiment, a non-transitory computer-readable medium is configured to store instructions for managing a database including a tree, a plurality of buckets, and a plurality of rules. The instructions, when loaded and executed by a processor, can cause the processor to provide a memory with a plurality of cluster memories. Each cluster memory has a plurality of banks and a plurality of access ports. The memory stores the database across the plurality of cluster memories. The instructions can further cause the processor to pack nodes of the tree in each of the plurality of cluster memories such that walking the tree accesses a minimal amount of cluster memories in the memory and walking the tree accesses each particular cluster memory no more than once.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 10A and 10B show two example tables storing resource state information in terms of credits.

FIGS. 11A to 11C illustrate examples of interleaving transport operations and partial transport operations over consecutive clock cycles.

FIG. 23A is a block diagram illustrating an example embodiment of migration from cluster to cluster.

FIG. 23B is a block diagram illustrating an example embodiment of a loop formed during migration.

FIG. 25 is a diagram illustrating an example embodiment of memory replication.

DETAILED DESCRIPTION

Figure 1:
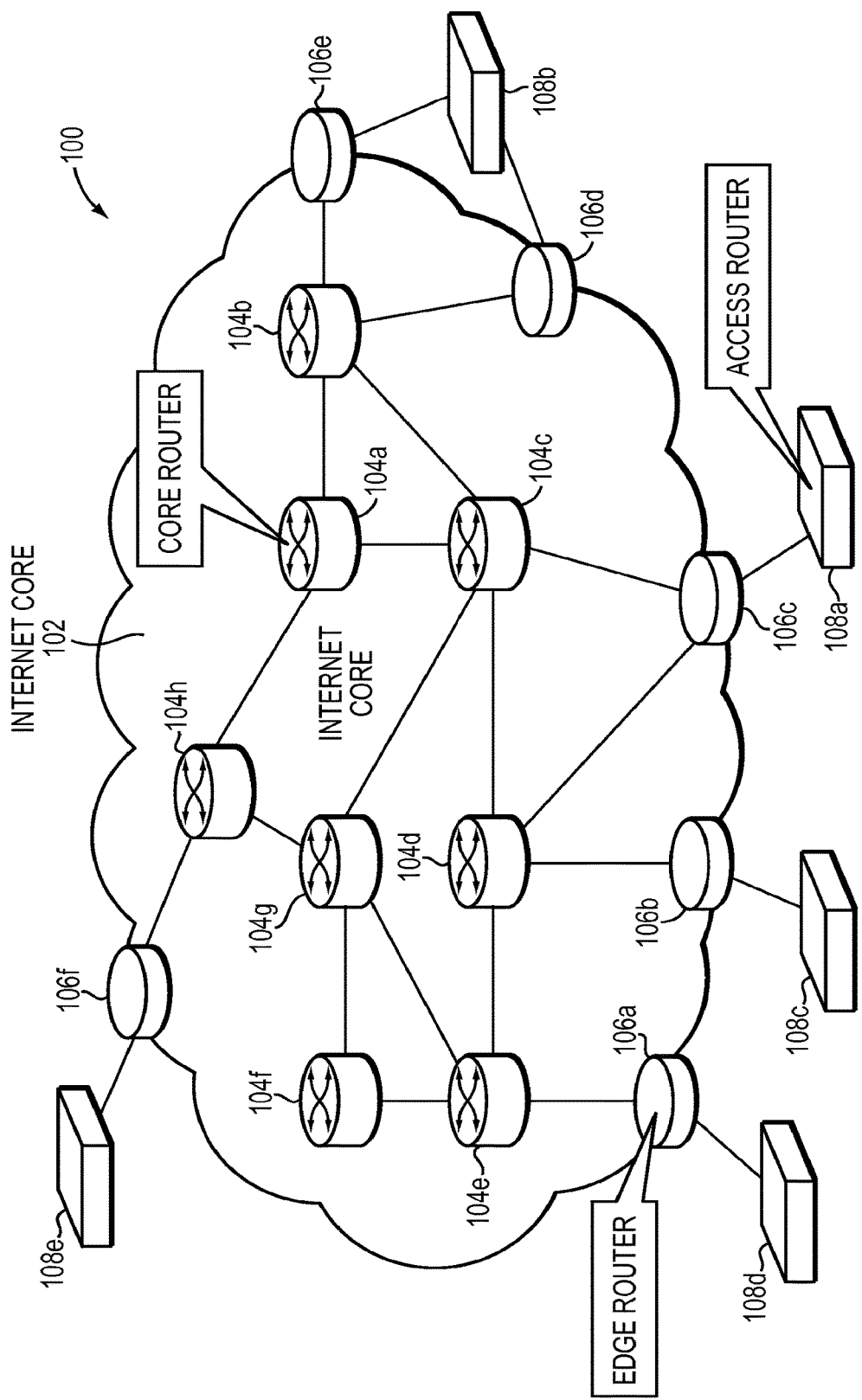
FIG. 1 is a block diagram of a typical network topology including network elements where a search processor may be employed.

A description of example embodiments of the invention follows.

Although packet classification has been widely studied for a long time, researchers are still motivated to seek novel and efficient packet classification solutions due to: i) the continued growth of network bandwidth, ii) increasing complexity of network applications, and iii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexity of network applications is increasing due to the increasing number of network applications being implemented in network devices. Packet classification is widely used for various kinds of applications, such as service-aware routing, intrusion prevention and traffic shaping. Therefore, novel solutions of packet classification must be intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Existing packet classification algorithms trade memory for time. Although the tradeoffs have been constantly improving, the time taken for a reasonable amount of memory is still generally poor.

Because of problems with existing algorithmic schemes, designers use ternary content-addressable memory (TCAM), which uses brute-force parallel hardware to simultaneously check packets against all rules. The main advantages of TCAMs over algorithmic solutions are speed and determinism. TCAMs work for all databases.

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleene star '*'. In operation, a whole packet header can be presented to a TCAM to determine which entry, or rule, it matches. However, the complexity of TCAMs has allowed only small, inflexible, and relatively slow implementations that consume a lot of power. Therefore, a need continues for efficient algorithmic solutions operating on specialized data structures.

Current algorithmic methods remain in the stages of mathematical analysis and/or software simulation, that is observation based solutions.

Proposed mathematical solutions have been reported to have excellent time/spatial complexity. However, methods of this kind have not been found to have any implementation in real-life network devices because mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these algorithmic methods generally only work well with a specific type of rule sets. Because packet classification rules for different applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to according to criteria on 'F' fields of the packet header and associates an identifier, e.g., class ID, with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier, class ID, of the rule among them that appears first in the classifier.

Packet classifiers may analyze and categorize rules in a classifier table and create a decision tree that is used to match received packets with rules from the classifier table. A decision tree is a decision support tool that uses a graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Decision trees may be used to match a received packet with a rule in a classifier table to determine how to process the received packet.

In simple terms, the problem may be defined as finding one or more rules, e.g., matching rules, that match a packet. Before describing a solution to this problem, it should be noted that a packet may be broken down into parts, such as a header, payload, and trailer. The header of the packet, or packet header, may be further broken down into fields, for example. So, the problem may be further defined as finding one or more rules that match one or more parts of the packet.

A possible solution to the foregoing problem(s) may be described, conceptually, by describing how a request to find one or more rules matching a packet or parts of the packet, a "lookup request," leads to finding one or more matching rules.

FIG. 1 is a block diagram 100 of a typical network topology including network elements where a search processor may be employed. The network topology includes an Internet core 102 including a plurality of core routers 104a-h. Each of the plurality of core routers 104a-h is connected to at least one other of the plurality of core routers 104a-h. Core routers 104a-h that are on the edge of the Internet core 102, e.g., core routers 104b-e and 104h, are coupled with at least one edge router 106a-f. Each edge router 106a-f is coupled to at least one access router 108a-e.

The core routers 104a-104h are configured to operate in the Internet core 102 or Internet backbone. The core routers 104a-104h are configured to support multiple telecommunications interfaces of the Internet core 102 and are further configured to forward packets at a full speed of each of the multiple telecommunications protocols.

The edge routers 106a-106f are placed at the edge of the Internet core 102. Edge routers 106a-106f bridge access routers 108a-108e outside the Internet core 102 and core routers 104a-104h in the Internet core 102. Edge routers 106a-106f may be configured to employ a bridging protocol to forward packets from access routers 108a-108e to core routers 104a-104h and vice versa.

The access routers 108a-108e may be routers used by an end user, such as a home user or an office, to connect to one of the edge routers 106a-106f, which in turn connects to the Internet core 102 by connecting to one of the core routers 104a-104h. In this manner, the edge routers 106a-106f may connect to any other edge router 106a-106f via the edge routers 106a-106f and the interconnected core routers 104a-104h.

The search processor described herein may reside in any of the core routers 104a-104h, edge routers 106a-106f, or access routers 108a-108e. The search processor described herein, within each of these routers, is configured to analyze Internet protocol (IP) packets based on a set of rules and forward the IP packets along an appropriate network path.

Figure 2A:
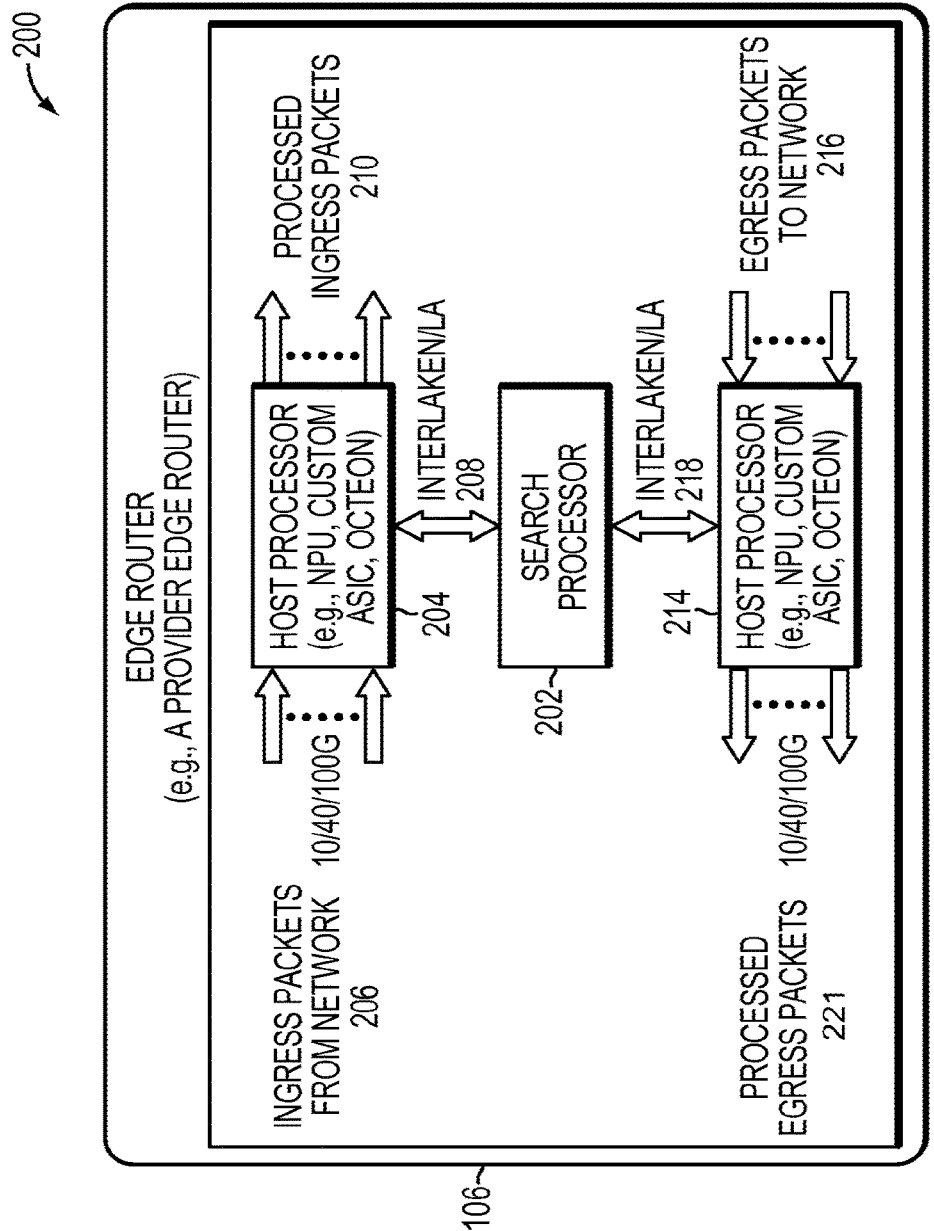
FIGS. 2A-2C show block diagrams illustrating example embodiments of routers employing a search processor.

FIG. 2A is a block diagram illustrating an example embodiment of an edge router 106 employing a search processor 202. An edge router 106, such as a service provider edge router, includes the search processor 202, a first host processor 204 and a second host processor 214. Examples of the first host processor include processors such as a network processor unit (NPU), a custom application-specific integrated circuit (ASIC), an OCTEON® processor available from Cavium Inc., or the like. The first host processor 204 is configured as an ingress host processor. The first host processor 204 receives ingress packets 206 from a network. Upon receiving a packet, the first host processor 204 forwards a lookup request including a packet header, or field, from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. Examples of the second host processor include processors such as a NPU, a custom ASIC, an OCTEON processor, or the like. The second host processor 214 receives egress packets 216 to send to the network. The second host processor 214 forwards a lookup request with a packet header, or field, from the egress packets 216 to the search processor 202 over a second Interlaken interface 218. The search processor 202 then processes the packet header using a plurality of rule processing engines employing a plurality of rules to determine a path to forward the packets on the network. The search processor 202 forwards the processed egress packets 221 from the host processor 214 to another network element in the network.

Figure 2B:
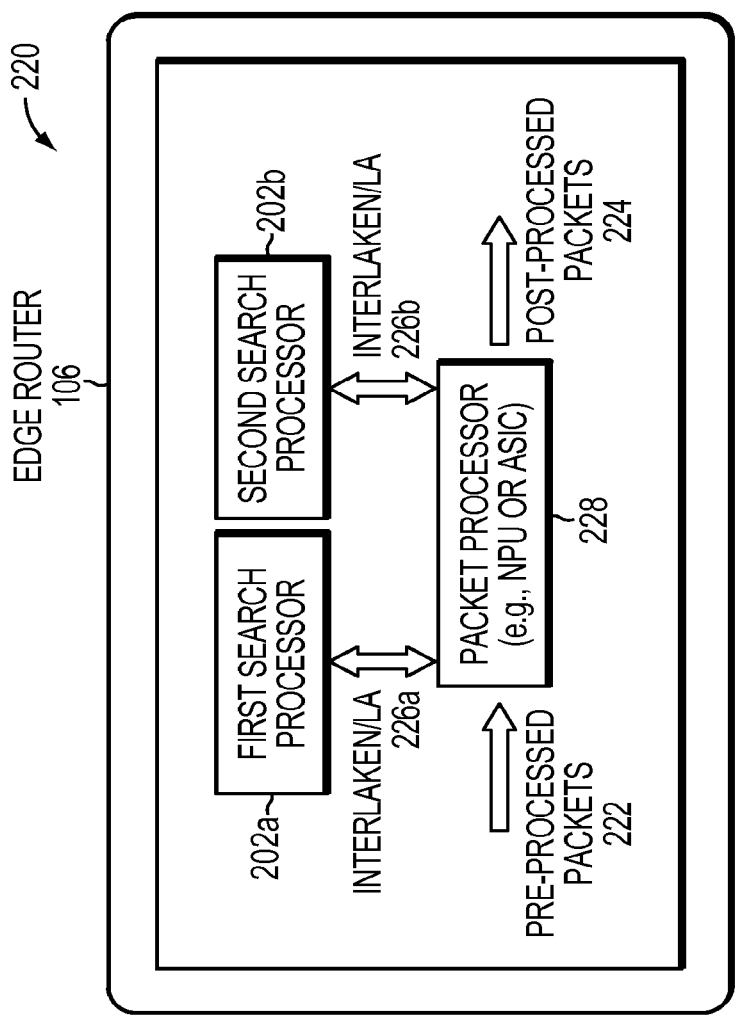

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The plurality of search processors 202a-202b are coupled to a packet processor 228 using a plurality of Interlaken interfaces 226a-b, respectively. Examples of the packet processor 228 include processors such as NPU, ASIC, or the like. The plurality of search processors 202a-202b may be coupled to the packet processor 228 over a single Interlaken interface. The edge router 106 receives a lookup request with a packet header, or fields, of pre-processed packets 222 at the packet processor 228. The packet processor 228 sends the lookup request to one of the search processors 202a-202b. The search processor, 202a or 202b, searches a packet header for an appropriate forwarding destination for the pre-processed packets 222 based on a set of rules and data within the packet header, and responds to the lookup request to the packet processor 228. The packet processor 228 then sends the post processed packets 224 to the network based on the response to the lookup request from the search processors 202a-202b.

Figure 2C:
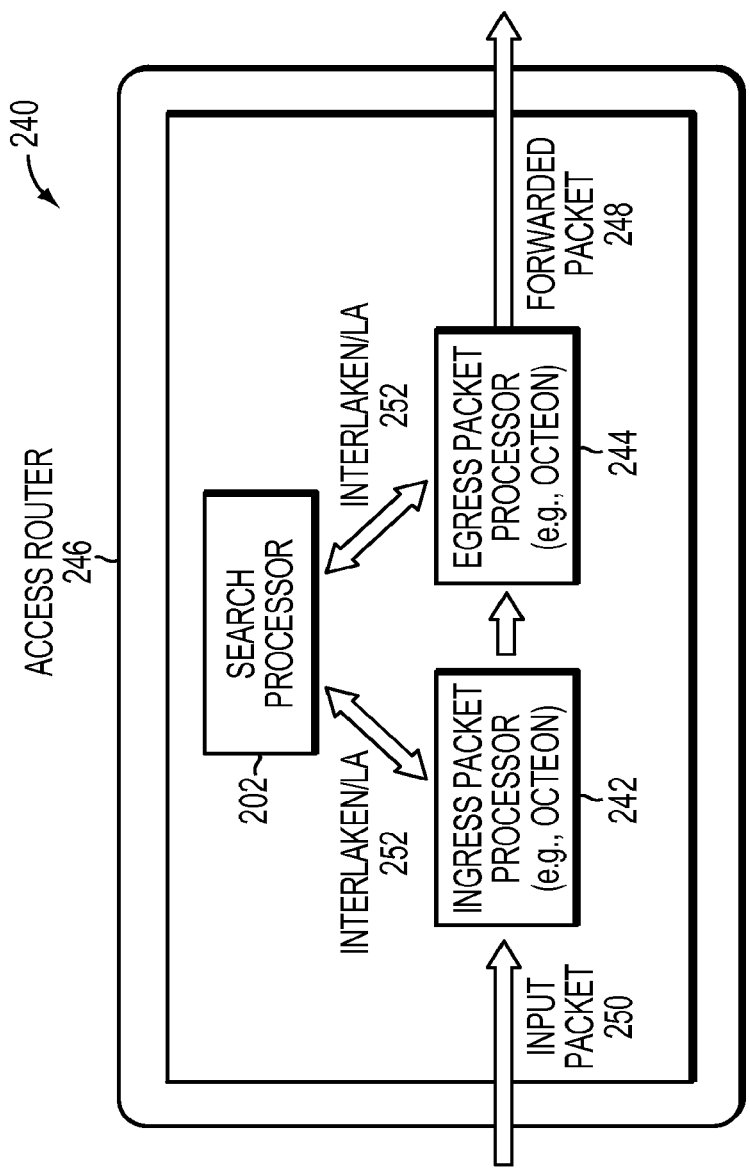

FIG. 2C is a block diagram 240 illustrating an example embodiment of an access router 246 employing the search processor 202. The access router 246 receives an input packet 250 at an ingress packet processor 242. Examples of the ingress packet processor 242 include OCTEON processor, or the like. The ingress packet processor 242 then forwards a lookup request with a packet header of the input packet 250 to the search processor 202. The search processor 202 determines, based on packet header of the lookup request, a forwarding path for the input packet 250 and responds to the lookup requests over the Interlaken interface 252 to the egress packet processor 244. The egress packet processor 244 then outputs the forwarded packet 248 to the network.

Figure 3:
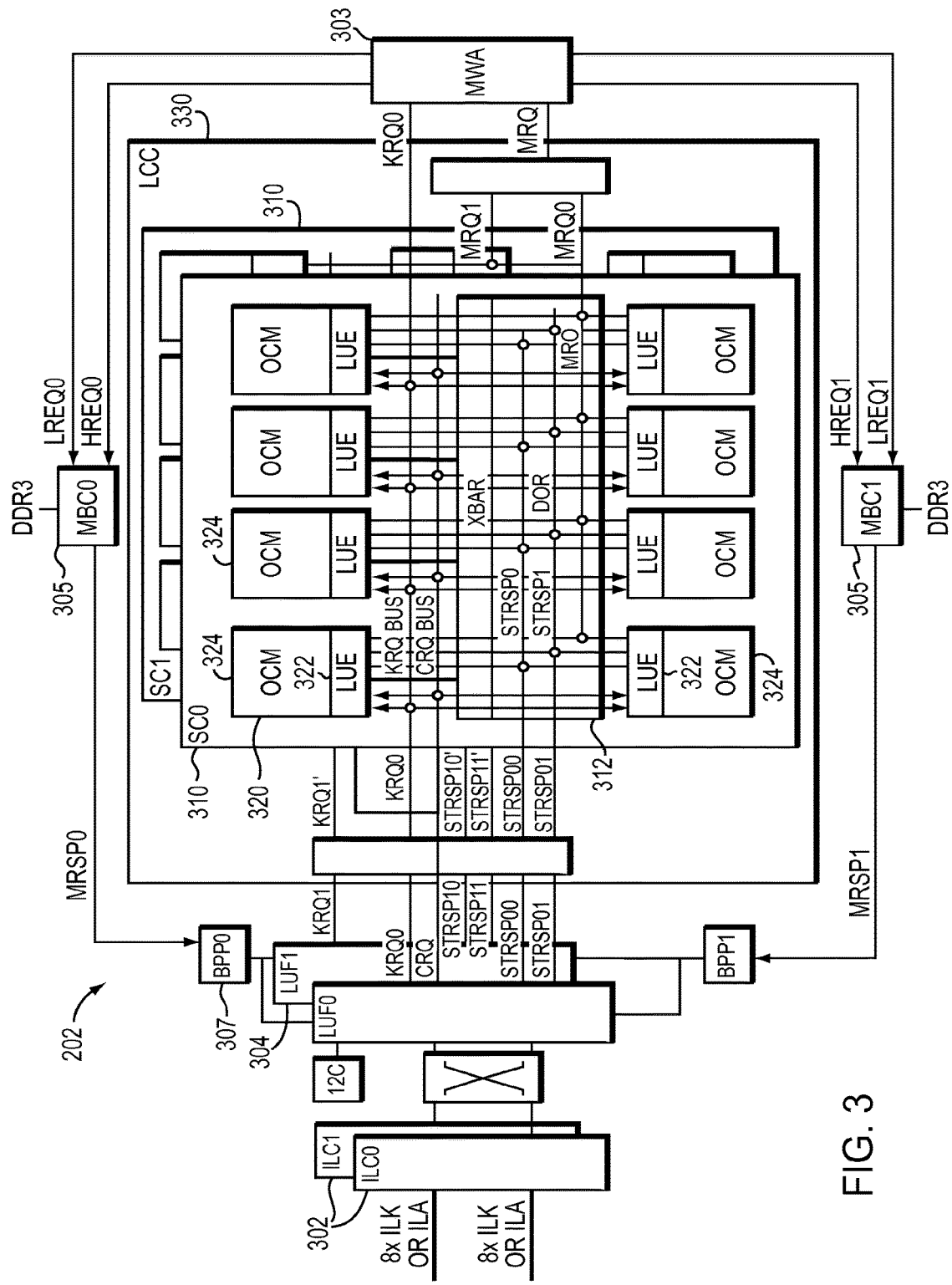
FIG. 3 shows an example architecture of a search processor.

FIG. 3 shows an example architecture of a search processor 202. The processor includes, among other things, an interface, e.g., Interlaken LA interface, 302 to receive requests from a host processor, e.g., 204, 214, 228, 242, or 244, and to send responses to the host processor. The interface 302 is coupled to Lookup Front-end (LUF) processors 304 configured to process, schedule, and order the requests and responses communicated from or to the interface 302. According to an example embodiment, each of the LUF processors is coupled to one of the super clusters 310. Each super cluster 310 includes one or more memory clusters, or search clusters, 320. Each of the memory, or search, clusters 320 includes a Lookup Engine (LUE) component 322 and a corresponding on-chip memory (OCM) component 324. A memory, or search, cluster may be viewed as a search block including a LUE component 322 and a corresponding OCM component 324. Each LUE component 322 is associated with a corresponding OCM component 324. A LUE component 322 includes processing engines configured to search for rules in a corresponding OCM component 324, given a request, that match keys for packet classification. The LUE component 322 may also include interface logic, or engine(s), configured to manage transport of data between different components within the memory cluster 320 and communications with other clusters. The memory clusters 320, in a given super cluster 310, are coupled through an interface device, e.g., crossbar (XBAR), 312. The XBAR 312 may be viewed as an intelligent fabric enabling coupling LUF processors 304 to different memory clusters 320 as well as coupling between different memory clusters 320 in the same super cluster 310. The search processor 202 may include one or more super clusters 310. A lookup cluster complex (LCC) 330 defines the group of super clusters 310 in the search processor 202.

The search processor 202 may also include a memory walker aggregator (MWA) 303 and at least one memory block controller (MBC) 305 to coordinate read and write operations from/to memory located external to the processor. The search processor 202 may further include one or more Bucket Post Processors (BPPs) 307 to search rules, which are stored in memory located external to the search processor 202, that match keys for packet classification.

Figure 4:
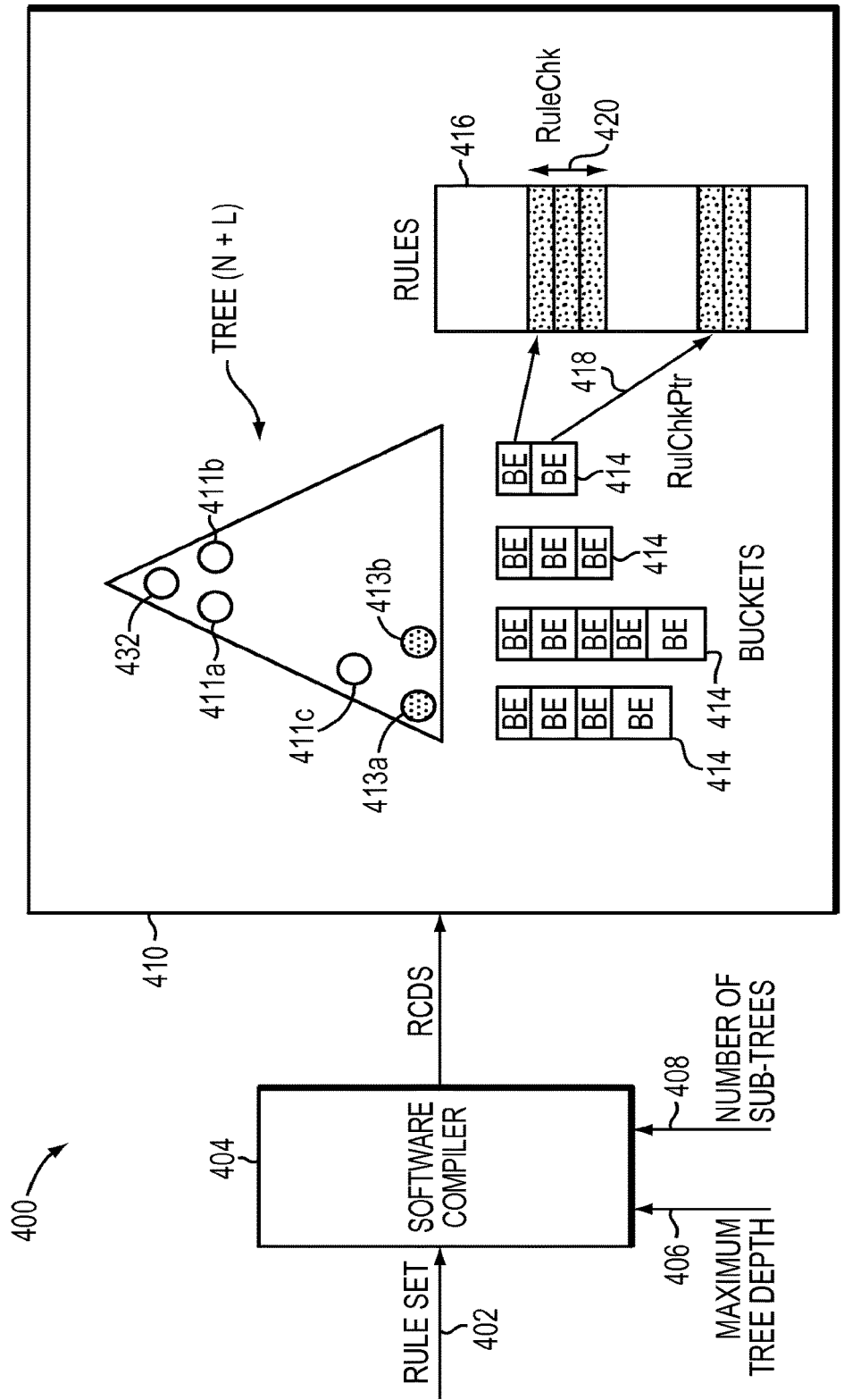
FIG. 4 is a block diagram illustrating an example embodiment of loading rules, by a software compiler, into an on-chip memory (OCM).

FIG. 4 is a block diagram 400 illustrating an example embodiment of loading rules, by a software compiler, into OCM components. According to an example embodiment, the software compiler 404 is software executed by a host processor or control plane processor to store rules into the search processor 202. Specifically, rules are loaded to at least one OCM component 324 of at least one memory cluster, or search block, 320 in the search processor 202. According to at least one example embodiment, the software compiler 404 uses multiple data structures, in storing the rules, in a way to facilitate the search of the stored rules at a later time. The software compiler 404 receives a rule set 402, parameter(s) indicative of a maximum tree depth 406 and parameter(s) indicative of a number of sub-trees 408. The software compiler 404 generates a set of compiled rules formatted, according at least one example embodiment, as linked data structures referred to hereinafter as rule compiled data structure (RCDS) 410. The RCDS is stored in at least one OCM component 324 of at least one memory cluster, or search block, 320 in the search processor 202. The RCDS 410 includes at least one tree 412. Each tree 412 includes nodes 411a-411c, leaf nodes 413a-413b, and a root node 432. A leaf node, 413a-413b, of the tree 412 includes or points to one of a set of buckets 414. A bucket 414 may be viewed as a sequence of bucket entries, each bucket entry storing a pointer or an address, referred to hereinafter as a chunk pointer 418, of a chunk of rules 420. Buckets may be implemented, for example, using tables, linked lists, or any other data structures known in the art adequate for storing a sequence of entries. A chunk of rules 420 is basically a chunk of data describing or representing one or more rules. In other words, a set of rules 416 stored in one or more OCM components 324 of the search processor 202 include chunks of rules 420. A chunk of rules 420 may be a sequential group of rules, or a group of rules scattered throughout the memory, either organized by a plurality of pointers or by recollecting the scattered chunk of rules 420, for example, using a hash function.

The RCDS 410 described in FIG. 4 illustrates an example approach of storing rules in the search engine 202. A person skilled in the art should appreciate that other approaches of using nested data structures may be employed. For example, a table with entries including chunk pointers 418 may be used instead of the tree 412. In designing a rule compiled data structure for storing and accessing rules used to classify data packets, one of the factors to be considered is enabling efficient and fast search or access of such rules.

Once the rules are stored in the search processor 202, the rules may then be accessed to classify data packets. When a host processor receives a data packet, the host processor forwards a lookup request with a packet header, or field, from the data packet to the search processor 202. On the search processor side, a process of handling the received lookup request includes:

1) The search processor receives the lookup request from the host processor. According to at least one example embodiment, the lookup request received from the host processor includes a packet header and a group identifier (GID).

2) The GID indexes an entry in a group definition table (GDT). Each GDT entry includes n number of table identifiers (TID), a packet header index (PHIDX), and key format table index (KFTIDX).

3) Each TID indexes an entry in a tree location table (TLT). Each TLT entry identifies which lookup engine or processor will look for the one or more matching rules. In this way, each TID specifies both who will look for the one or more matching rules and where to look for the one or more matching rules.

4) Each TID also indexes an entry in a tree access table (TAT). TAT is used in the context in which multiple lookup engines, grouped together in a super cluster, look for the one or more matching rules. Each TAT entry provides the starting address in memory of a collection of rules, or pointers to rules, called a table or tree of rules. The terms table of rules or tree of rules, or simply table or tree, are used interchangeably hereinafter. The TID identifies which collection or set of rules in which to look for one or more matching rules.

5) The PHIDX indexes an entry in a packet header table (PHT). Each entry in the PHT describes how to extract n number of keys from the packet header.

6) The KFTIDX indexes an entry in a key format table (KFT). Each entry in the KFT provides instructions for extracting one or more fields, e.g., parts of the packet header, from each of the n number of keys, which were extracted from the packet header.

7) Each of the extracted fields, together with each of the TIDs are used to look for subsets of the rules. Each subset contains rules that may possibly match each of the extracted fields.

8) Each rule of each subset is then compared against an extracted field. Rules that match are provided in responses, or lookup responses.

The handling of the lookup request and its enumerated stages, described above, are being provided for illustration purposes. A person skilled in the art should appreciate that different names as well as different formatting for the data included in a look up request may be employed. A person skilled in the art should also appreciate that at least part of the data included in the look up request is dependent on the design of the RCDS used in storing matching rules in a memory, or search, cluster 320.

Figure 5:
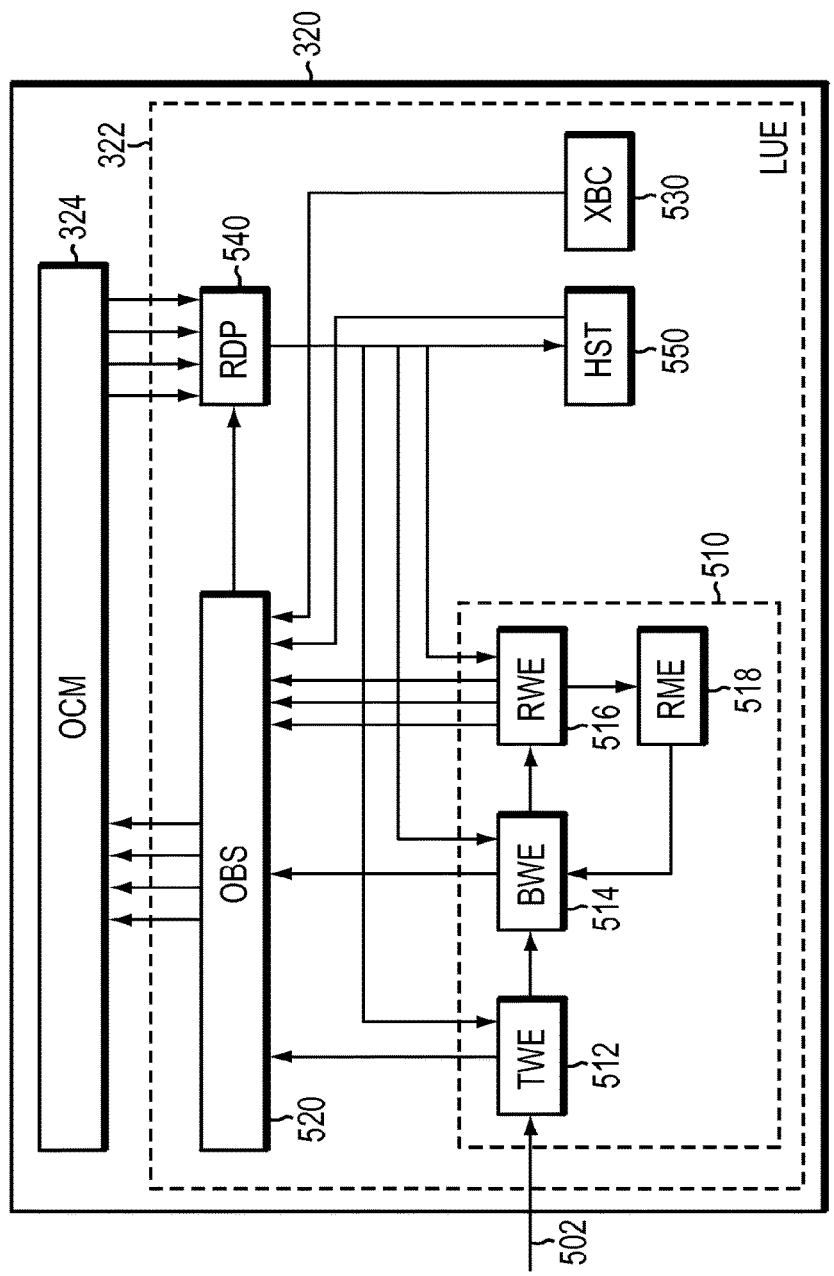
FIG. 5 shows a block diagram illustrating an example embodiment of a memory, or search, cluster.

FIG. 5 shows a block diagram illustrating an example embodiment of a memory, or search, cluster 320. The memory, or search, cluster 320 includes an on-chip memory (OCM) 324, a plurality of processing, or search, engines 510, an OCM bank slotter (OBS) module 520, and a cross-bar controller (XBC) 530. The OCM 324 includes one or more memory banks According to an example implementation, the OCM 324 includes two mega bytes (MBs) of memory divided into 16 memory banks According to the example implementation, the OCM 324 includes 64 k, or 65536, of rows each 256 bits wide. As such, each of the 16 memory banks has 4096 contiguous rows, each 256 bits wide. A person skilled in the art should appreciate that the described example implementation is provided for illustration and the OCM may, for example, have more or less than 2 MBs of memory and the number of memory banks may be different from 16. The number of memory rows, the number of bits in each memory row, as well as the distribution of memory rows between different memory banks may be different from the illustration in the described example implementation. The OCM 324 is configured to store, and provide access to, the RCDS 410. In storing the RCDS 410, the distribution of the data associated with the RCDS 410 among different memory banks may be done in different ways. For example, different data structures, e.g., the tree data structure(s), the bucket storage data structure(s), and the chunk rule data structure(s), may be stored in different memory banks. Alternatively, a single memory bank may store data associated with more than one data structure. For example, a given memory bank may store a portion of the tree data structure, a portion of the bucket data structure, and a portion of the chunk rule data structure.

The plurality of processing engines 510 include, for example, a tree walk engine (TWE) 512, a bucket walk engine (BWE) 514, one or more rule walk engines (RWE) 516, and one or more rule matching engines (RME) 518. When the search processor 202 receives a request, called a lookup request, from the host processor, the LUF processor 304 processes the lookup request into one or more key requests, each of which has a key 502. The LUF processor 304 then schedules the key requests to the search cluster. The search cluster 320 receives a key 502 from the LUF processor 304 at the TWE 512. A key represents, for example, a field extracted from a packet header. The TWE 512 is configured to issue requests to access the tree 412 in the OCM 324 and receive corresponding responses. A tree access request includes a key used to enable the TWE 512 to walk, or traverse, the tree from a root node 432 to a possible leaf node 413. If the TWE 512 does not find an appropriate leaf node, the TWE 512 issues a no match response to the LUF processor 304. If the TWE 512 does find an appropriate leaf node, it issues a response that an appropriate leaf node is found.

The response that an appropriate leaf node is found includes, for example, a pointer to a bucket passed by the TWE 512 to the BWE 514. The BWE 514 is configured to issue requests to access buckets 414 in the OCM 324 and receive corresponding responses. The BWE 514, for example, uses the pointer to the bucket received from the TWE 512 to access one or more buckets 414 and retrieve at least one chunk pointer 418 pointing to a chunk of rules. The BWE 514 provides the retrieved at least one chunk pointer 418 to at least one RWE 516. According to at least one example, BWE 514 may initiate a plurality of rule searched to be processed by one RWE 516. However, the maximum number of outstanding, or on-going, rule searches at any point of time may be constrained, e.g., maximum of 16 rule searches. The RWE is configured to issue requests to access rule chunks 420 in the OCM 324 and receive corresponding responses. The RWE 416 uses a received chunk pointer 418 to access rule chunks stored in the OCM 324 and retrieve one or more rule chunks. The retrieved one or more rule chunks are then passed to one or more RMEs 518. An RME 518, upon receiving a chunk rule, is configured to check whether there is a match between one or more rules in the retrieved rule chunk and the field corresponding to the key.

The RME 518 is also configured to provide a response, to the BWE 514. The response is indicative of a match, no match, or an error. In the case of a match, the response may also include an address of the matched rule in the OCM 324 and information indicative of a relative priority of the matched rule. Upon receiving a response, the BWE 514 decides how to proceed. If the response is indicative of a no match, the BWE 514 continues searching bucket entries and initiating more rule searches. If at some point the BWE 514 receives a response indicative of a match, it stops initiating new rule searches and waits for any outstanding rule searches to complete processing. Then, the BWE 514 provides a response to the host processor through the LUF processor 304, indicating that there is a match between the field corresponding to the key and one or more rules in the retrieved rule chunk(s), e.g., a "match found" response. If the BWE 514 finishes searching buckets without receiving any "match found" response, the BWE 514 reports a response to the host processor through the LUF processor 304 indicating that there is no match, e.g., "no-match found" response. According to at least one example embodiment, the BWE 514 and RWE 516 may be combined into a single processing engine performing both bucket and rule chunk data searches. According to an example embodiment the RWEs 516 and the RMEs 518 may be separate processors. According to another example embodiment, the access and retrieval of rule chunks 420 may be performed by the RMEs 518 which also performs rule matching. In other words, the RMEs and the RWEs may be the same processors.

Access requests from the TWE 512, the BWE 514, or the RWE(s) are sent to the OBS module 520. The OBS module 520 is coupled to the memory banks in the OCM 324 through a number of logical, or access, ports, e.g., M ports. The number of the access ports enforce constraints on the number of access requests that may be executed, or the number of memory banks that may be accessed, at a given clock cycle. For example, over a typical logical port no more than one access request may be executed, or sent, at a given clock cycle. As such, the maximum number of access requests that may be executed, or forwarded to the OCM 324, per clock cycle is equal to M. The OBS module 520 includes a scheduler, or a scheduling module, configured to select a subset of access requests, from multiple access requests received in the OBS module 520, to be executed in at least one clock cycle and to schedule the selected subset of access requests each over a separate access port. The OBS module 520 attempts to maximize OCM usage by scheduling up to M access requests to be forwarded to the OCM 324 per clock cycle. In scheduling access requests, the OBS module 520 also aims at avoiding memory bank conflict and providing low latency for access requests. Memory bank conflict occurs, for example, when attempting to access a memory bank by more than one access request at a given clock cycle. Low latency is usually achieved by preventing access requests from waiting for a long time in the OBS module 520 before being scheduled or executed.

Upon data being accessed in the OCM 324, a response is then sent back to a corresponding engine/entity through a "Read Data Path" (RDP) component 540. The RDP component 540 receives OCM read response data and context, or steering, information from the OBS. Read response data from each OCM port is then directed towards the appropriate engine/entity. The RDP component 540 is, for example, a piece of logic or circuit configured to direct data responses from the OCM 324 to appropriate entities or engines, such as TWE 512, BWE 514, RWE 516, a host interface component (HST) 550, and a cross-bar controller (XBC) 530. The HST 550 is configured to store access requests initiated by the host processor or a respective software executing thereon. The context, or steering, information tells the RDP component 540 what to do with read data that arrives from the OCM 324. According to at least one example embodiment, the OCM 324 itself does not contain any indication that valid read data is being presented to the RDP component 540. Therefore, per-port context information is passed from the OBS module 520 to the RDP component 540 indicating to the RDP component 540 that data is arriving from the OCM 324 on the port, the type of data being received, e.g., tree data, bucket data, rule chunk data, or host data, and the destination of the read response data, e.g., TWE 512, BWE 514, RWE 516, HST 550 or XBC 530. For example, tree data is directed to TWE 512 or XBC 530 if remote, bucket data is directed to BWE 514 or XBC if remote, rule chunk data is directed to RWE 516 or XBC 530 if remote, and host read data is directed to the HST 550.

The search cluster 320 also includes the crossbar controller (XBC) 530 which is a communication interface managing communications, or transport operations, between the search cluster 320 and other search clusters through the crossbar (XBAR) 312. In other words, the XBC 530 is configured to manage pushing and pulling of data to, and respectively from, the XBAR 312.

According to an example embodiment, for rule processing, the processing engines 510 include a tree walk engine (TWE) 512, bucket walk engine (BWE) 514, rule walk engine (RWE) 516 and rule match engine (RME) 518. According to another example embodiment, rule processing is extended to external memory and the BPP 307 also includes a RWE 516 and RME 518, or a RME acting as both RWE 516 and RME 518. In other words, the rules may reside in the on-chip memory and in this case, the RWE or RME engaged by the BWE, e.g., by passing a chunk pointer, is part of the same LUE as BWE. As such, the BWE engages a "local" RWE or RME. The rules may also reside on a memory located external to the search processor 202, e.g., off-chip memory. In this case, which may be referred to as rule processing extended to external memory or, simply, "rule extension," the bucket walk engine does not engage a local RWE or RME. Instead, the BWE sends a request message, via the MWA 303 and MBC 305, to a memory controller to read a portion, or chunk, of rules. The BWE 514 also sends a "sideband" message to the BPP 307 informing the BPP 307 that the chunk, associated with a given key, is stored in external memory.

The BPP 307 starts processing the chunk of rules received from the external memory. As part of the processing, if the BPP 307 finds a match, the BPP 307 sends a response, referred to as a lookup response or sub-tree response, to the LUF processor 304. The BPP 307 also sends a message to the LUEs component 322 informing the LUEs component 322 that the BPP 307 is done processing the chunk and the LUEs component 322 is now free to move on to another request. If the BPP 307 does not find a match and the BPP 307 is done processing the chunk, the BPP 307 sends a message to the LUEs component 322 informing the LUEs component 322 that the BPP 307 is done processing and to send the BPP 307 more chunks to process. The LUEs component 322 then sends a "sideband" message, through the MWA 303 and MBC 305, informing the BPP 307 about a next chunk of rules, and so on. For the last chunk of rules, the LUEs component 322 sends a "sideband" message to the BPP 307 informing the BPP 307 that the chunk, which is to be processed by the BPP 307, is the last chunk. The LUEs component 322 knows that the chunk is the last chunk because the LUEs component 322 knows the total size of the set of rule chunks to be processed. Given the last chunk, if the BPP 307 does not find a match, the BPP 307 sends a "no-match" response to the LUF processor 304 informing the LUF processor 304 that the BPP 307 is done with the set of rule chunks. In turn, the LUEs component 322 frees up the context, e.g., information related to the processed key request or the respective work done, and moves on to another key request.

Figure 6A:
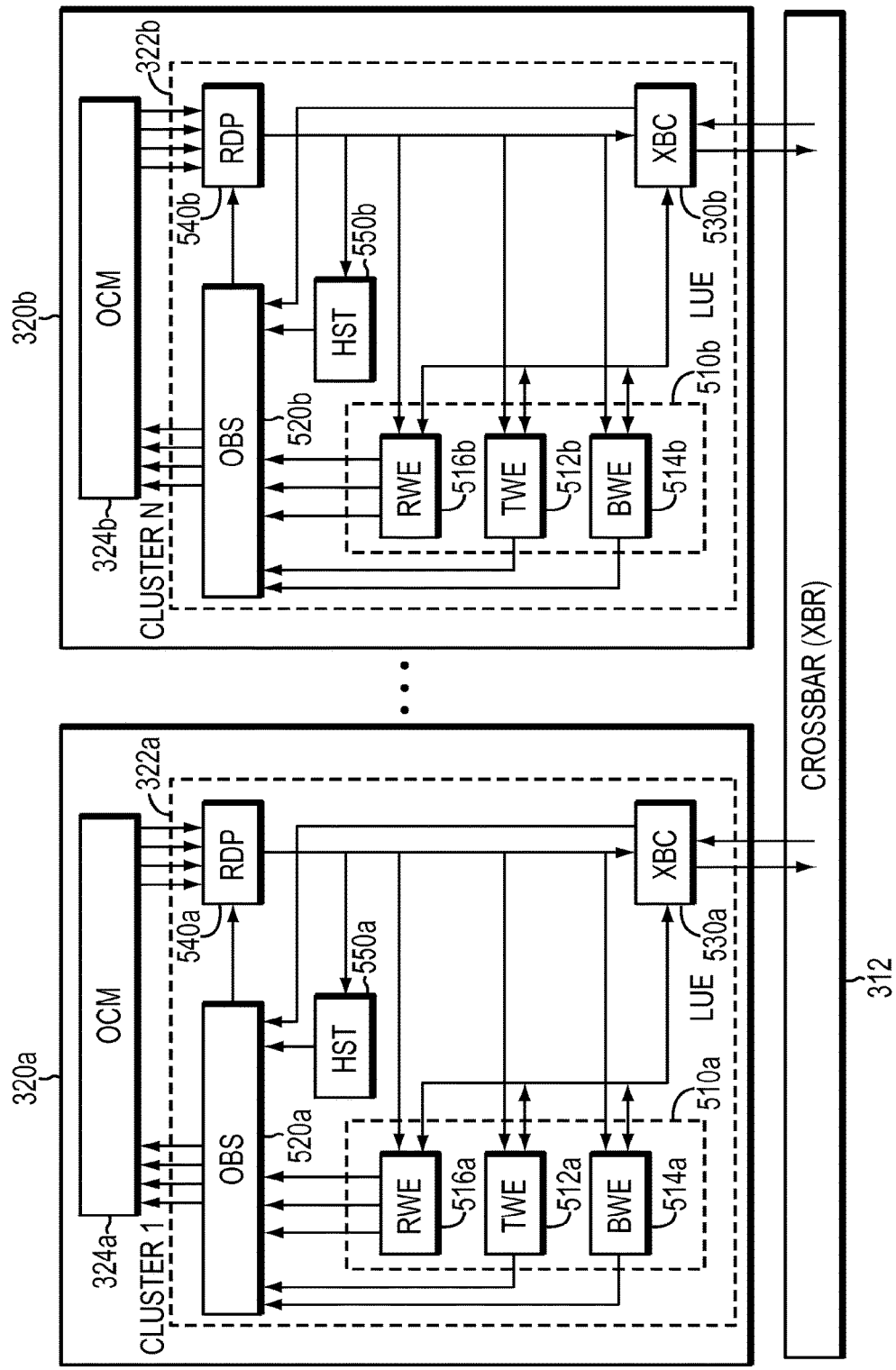
FIGS. 6A-6B show block diagrams illustrating example embodiments of transport operations between two search clusters.

FIG. 6A shows a block diagram illustrating an example embodiment of processing a remote access request between two search clusters. A remote access request is a request generated by an engine/entity in a first search cluster to access data stored in a second search cluster or memory outside the first search cluster. For example, a processing engine in cluster 1, 320*a*, sends a remote access request for accessing data in another cluster, e.g., cluster N 320*b*. The remote access request may be, for example, a tree data access request generated by a TWE 512*a* in cluster 1, a bucket access request generated by a BWE 514*a* in cluster 1, or a rule chunk data access request generated by a RWE 516*a* or RME in cluster 1. The remote access request is pushed by the XBC 530*a* of cluster 1 to the XBAR 312 and then sent to the XBC 530*b* of cluster N. The XBC 530*b* of cluster N then forwards the remote access request to the OBS module 520*b* of cluster N. The OBS module 520*b* directs the remote access request to OCM 324*b* of cluster N and a remote response is sent back from the OCM 324*b* to the XBC 530*b* through the RDP 540*b*. The XBC 530*b* forwards the remote response to the XBC 530*a* through the XBAR 312. The XBC 530*a* then forwards the remote response to the respective processing engine in the LUEs component 322*a*.

Figure 6B:
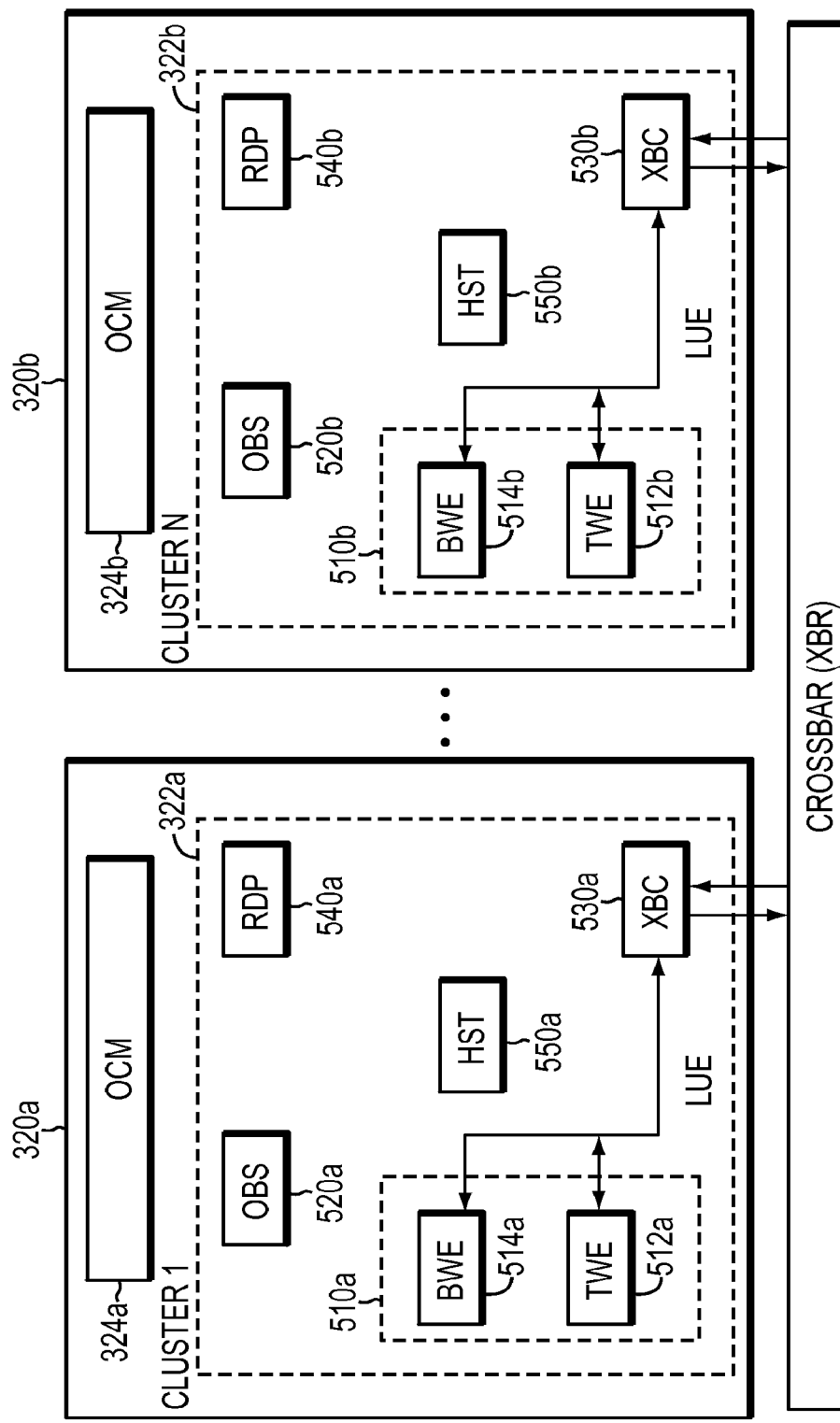

FIG. 6B shows a block diagram illustrating an example embodiment of a processing thread migration between two search clusters. Migration requests originate from a TWE 512 or BWE 514 as they relate mainly to a bucket search/access process or a tree search/access process, in a first cluster, that is configured to continue processing in a second cluster. Unlike remote access where data is requested and received from the second cluster, in processing thread migration the process itself migrates and continues processing in the second cluster. As such, information related to the processing thread, e.g., state information, is migrated to the second cluster from the first cluster. As illustrated in FIG. 6B, processing thread migration requests are sent from TWE 512*a* or BWE 514*a* directly to the XBC 530*a* in the cluster 1, 320*a*. The XBC 530*a* sends the migration request through the crossbar (XBAR) 312 to the XBC 530*b* in cluster N, 320*b*. At the receiving cluster, e.g., cluster N 320*b*, the XBC 530*b* forwards the migration request to the proper engine, e.g., TWE 512*b* or BWE 514*b*. According to at least one example embodiment, the XBC, e.g., 530*a* and 530*b*, does not just forward requests. The XBC arbitrates which, among remote OCM requests, OCM response data, and migration requests, to be sent at a clock cycle.

Figure 7:
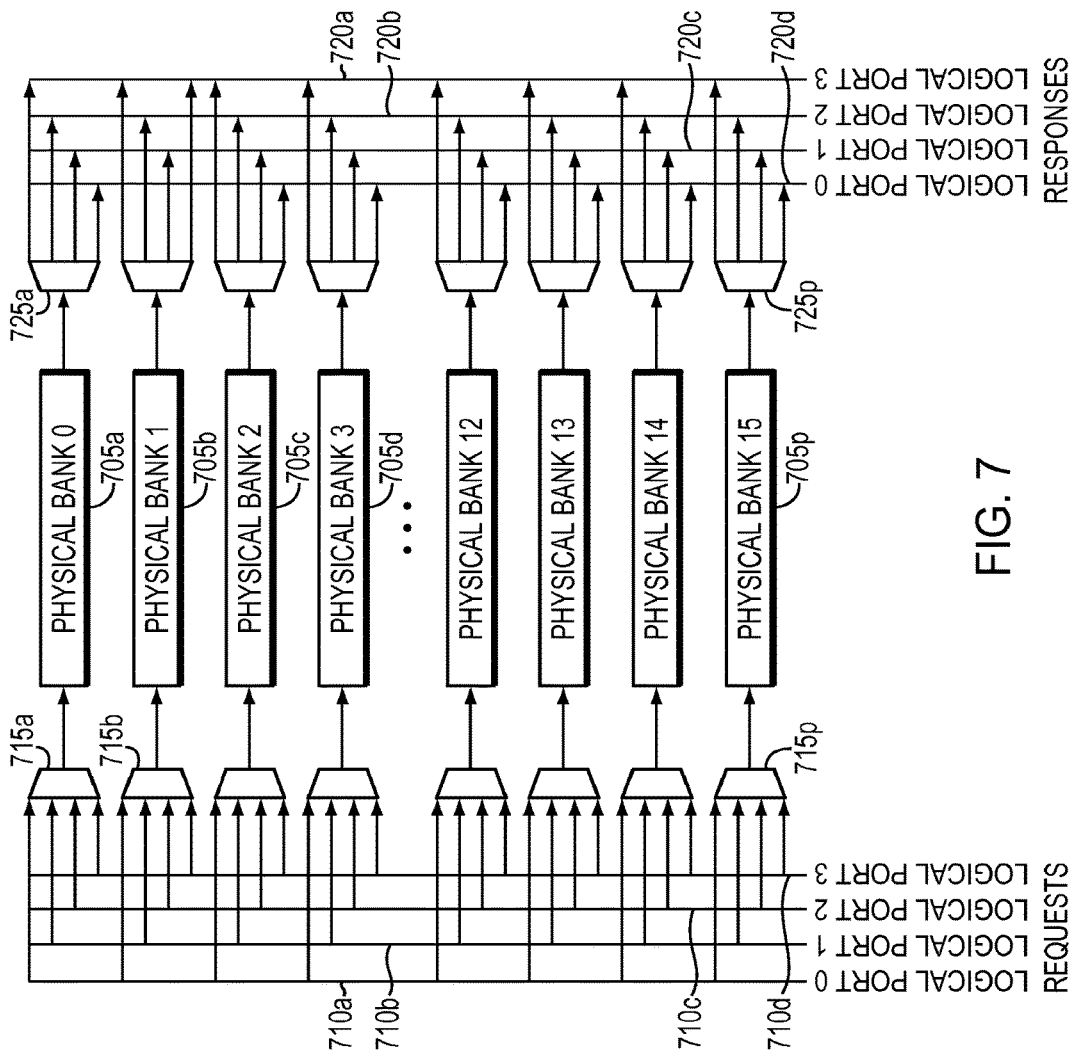
FIG. 7 shows an example hardware implementation of the OCM in a search cluster.

FIG. 7 shows an example hardware implementation of the OCM 324 in a cluster 320. According to the example implementation shown in FIG. 7, the OCM includes a plurality, e.g., 16, single-ported memory banks 705*a*-705*p*. Each memory bank, for example, includes 4096 memory rows, each of 256 bits width. A person skilled in the art should appreciate that the number, e.g., 16, of the memory banks and their storage capacity are chosen for illustration purposes and should not be interpreted as limiting. Each of the memory banks 705*a*-705*p* is coupled to at least one input multiplexer 715*a*-715*p* and at least one output multiplexer 725*a*-725-*p*. Each input multiplexer, among the multiplexers 715*a*-715*p*, couples the input logical ports 710*a*-710*d* to a corresponding memory bank among the memory banks 705*a*-705*p*. Similarly, each output multiplexer, among the multiplexers 725*a*-725*p*, couples the output logical ports 720*a*-720*d* to a corresponding memory bank among the memory banks 705*a*-705*p*.

The input logical ports 710*a*-710*d* carry access requests' data from the OBS module 520 to respective memory banks among the memory banks 705*a*-705*p*. The output logical ports 720*a*-720*d* carry access responses' data from respective memory banks, among the memory banks 705*a*-705*p*, to RDP component 540. Given that the memory banks 705*a*-705*p* are single-ported, at each clock cycle a single access is permitted to each of the memory banks 705a-705p. Also given the fact that there are four input logical/access ports, a maximum of four requests may be executed, or served, at a given clock cycle because no more than one logical port may be addressed to the same physical memory bank at the same clock cycle. For a similar reason, e.g., four output logical/access ports, a maximum of four responses may be sent out of the OCM 324 at a given clock cycle. An input multiplexer is configured to select a request, or decide which request, to access the corresponding physical memory bank. An output multiplexer is configured to select an access port on which a response from a corresponding physical memory bank is to be sent. For example, an output multiplexer may select an output logical port, to send a response, corresponding to an input logical port on which the corresponding request was received. A person skilled in the art should appreciate that other implementations with more, or less, than four ports may be employed.

According to an example embodiment, an access request is formatted as an 18 bit tuple. Among the 18 bits, two bits are used as wire interface indicating an access instruction/command, e.g., read, write, or idle, four bits are used to specify a memory bank among the memory banks 705a-705p, and 12 bits are used to identify a row, among the 4096 rows, in the specified memory bank. In the case of a "write" command, 256 bits of data to be written are also sent to the appropriate memory bank. A person skilled in the art should appreciate that such format/structure is appropriate for the hardware implementation shown in FIG. 7. For example, using 4 bits to specify a memory bank is appropriate if the total number of memory banks is 16 or less. Also the number of bits used to identify a row is correlated to the total number of rows in each memory bank. Therefore, the request format described above is provided for illustration purpose and a person skilled in the art should appreciate that many other formats may be employed.

The use of multi-banks as suggested by the implementation in FIG. 7, enables accessing multiple physical memory banks per clock cycle, and therefore enables serving, or executing, more than one request/response per clock cycle. However, for each physical memory bank a single access, e.g., read or write, is allowed per clock cycle. According to an example embodiment, different types of data, e.g., tree data, bucket data, or rule chunk data, are stored in separate physical memory banks. Alternatively, a physical memory bank may store data from different types, e.g., tree data, bucket data, and rule chunk data. Using single-ported physical memory banks leads to more power efficiency compare to multi-port physical memory banks. However, multi-port physical memory banks may also be employed.

Processing operations, e.g., tree search, bucket search, or rule chunk search, may include processing across memory clusters. For example, a processing operation running in a first memory cluster may require accessing data stored in one or more other memory clusters. In such a case, a remote access request may be generated, for example by a respective processing engine, and sent to at least one of the one or more other memory clusters and a remote access response with the requested data may then be received. Alternatively, the processing operation may migrate to at least one of the one or more other memory clusters and continue processing therein. For example, a remote access request may be generated if the size of the data to be accessed from another memory cluster is relatively small and therefore the data may be requested and acquired in relatively short time period. However, if the data to be accessed is of relatively large size, then it may be more efficient to proceed with a processing thread migration where the processing operation migrates and continue processing in the other memory cluster. The transfer of data, related to a processing operation, between different memory clusters is referred to hereinafter as a transport operation. Transport operations, or transactions, include processing thread migration operation(s), remote access request operation(s), and remote access response operation(s). According to an example embodiment, transport operations are initiated based on one or more instructions embedded in the OCM 324. When a processing engine, fetching data within the OCM 324 as part of a processing operation, reads an instruction among the one or more embedded instructions, the processing engine responds to the read instruction by starting a respective transport operation. The instructions are embedded, for example, by software executed by the host processor, 210, 216, 228, 242, 244, such as the software compiler 404.

The distinction between remote access request/response and processing thread migration is as follows: When a remote request is made, a processing engine is requesting and receiving the data (RCDS) that is on a remote memory cluster to the memory cluster where work is being executed by the processing engine. The same processing engine in a particular cluster executes both local data access and remote data access. For processing thread migrations, work is partially executed on a first memory cluster. The context, e.g., state and data, of the work is then saved, packaged and migrated to a second memory cluster where data (RCDS) to be accessed exists. A processing engine in the second memory cluster picks up the context and continues with the work execution.

Figure 8A:
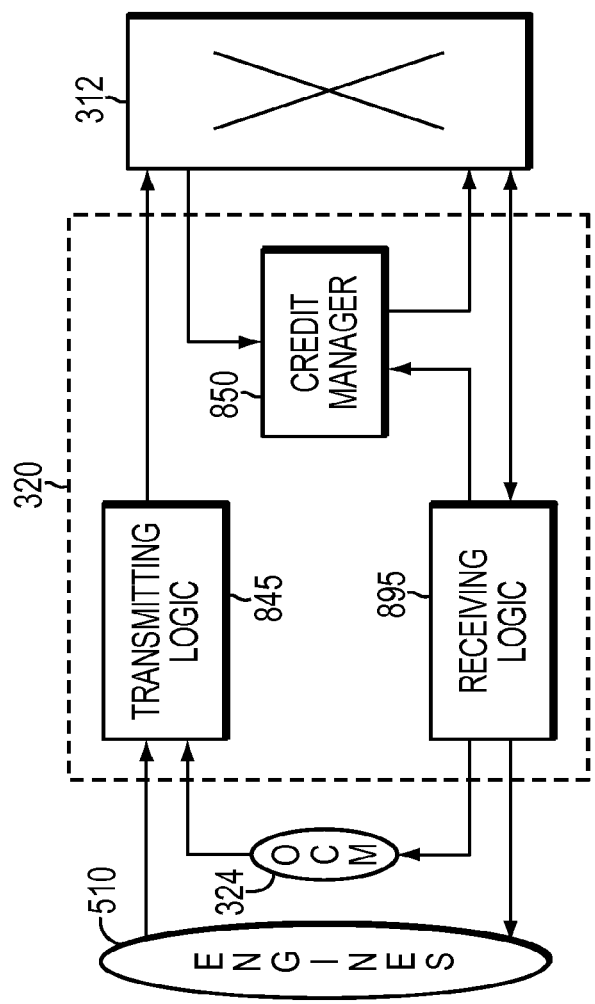
FIGS. 8A to 8E show block and logic diagrams illustrating an example implementation of a crossbar controller (XBC).

FIG. 8A shows a block diagram illustrating an overview of the XBC 530, according to at least one example embodiment. The XBC 530 is an interface configured to manage transport operations between the corresponding memory, or search, cluster and one or more other memory, or search, clusters through the XBAR 312. The XBC 530 includes a transmitting component 845 configured to manage transmitting transport operations from the processing engines 510 or the OCM 324 to other memory, or search, cluster(s) through the XBAR 312. The XBC 530 also includes a receiving component 895 configured to manage receiving transport operations, from other memory, or search, cluster(s) through the XBAR 312, and directing the transport operations to the processing engines 510 or the OCM 324. The XBC 530 also includes a resource, or credit, state manager 850 configured to manage states of resources allocated to the corresponding memory cluster in other memory clusters. Such resources include, for example, memory buffers in the other memory clusters configured to store transport operations data sent from the memory cluster including the resource state manager 850. The transmitting component 845 may be implemented as a logic circuit, processor, or the like. Similarly, the receiving component 895 may be implemented as a logic circuit, processor, or the like.

Figure 8B:
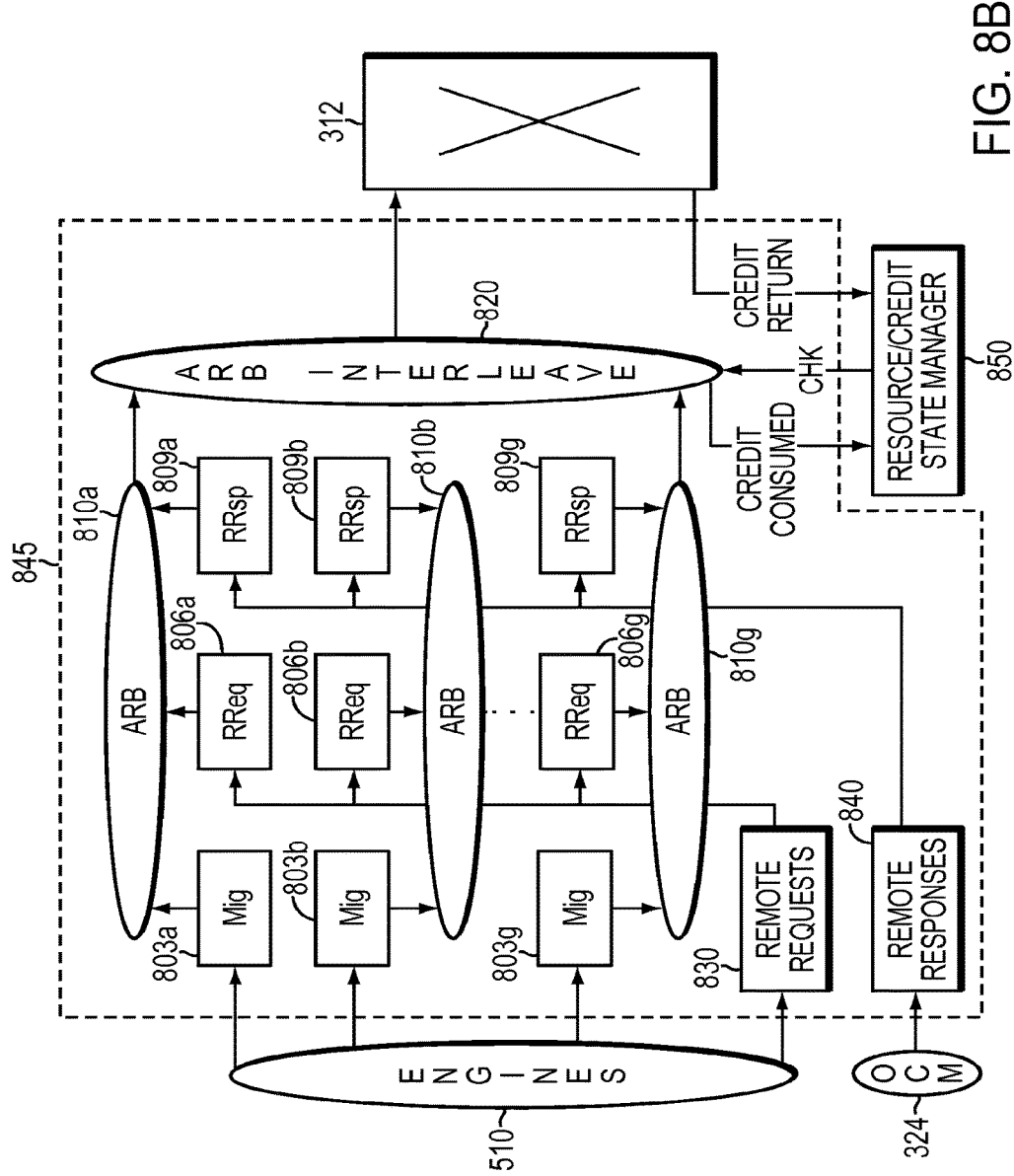
Figure 8C:
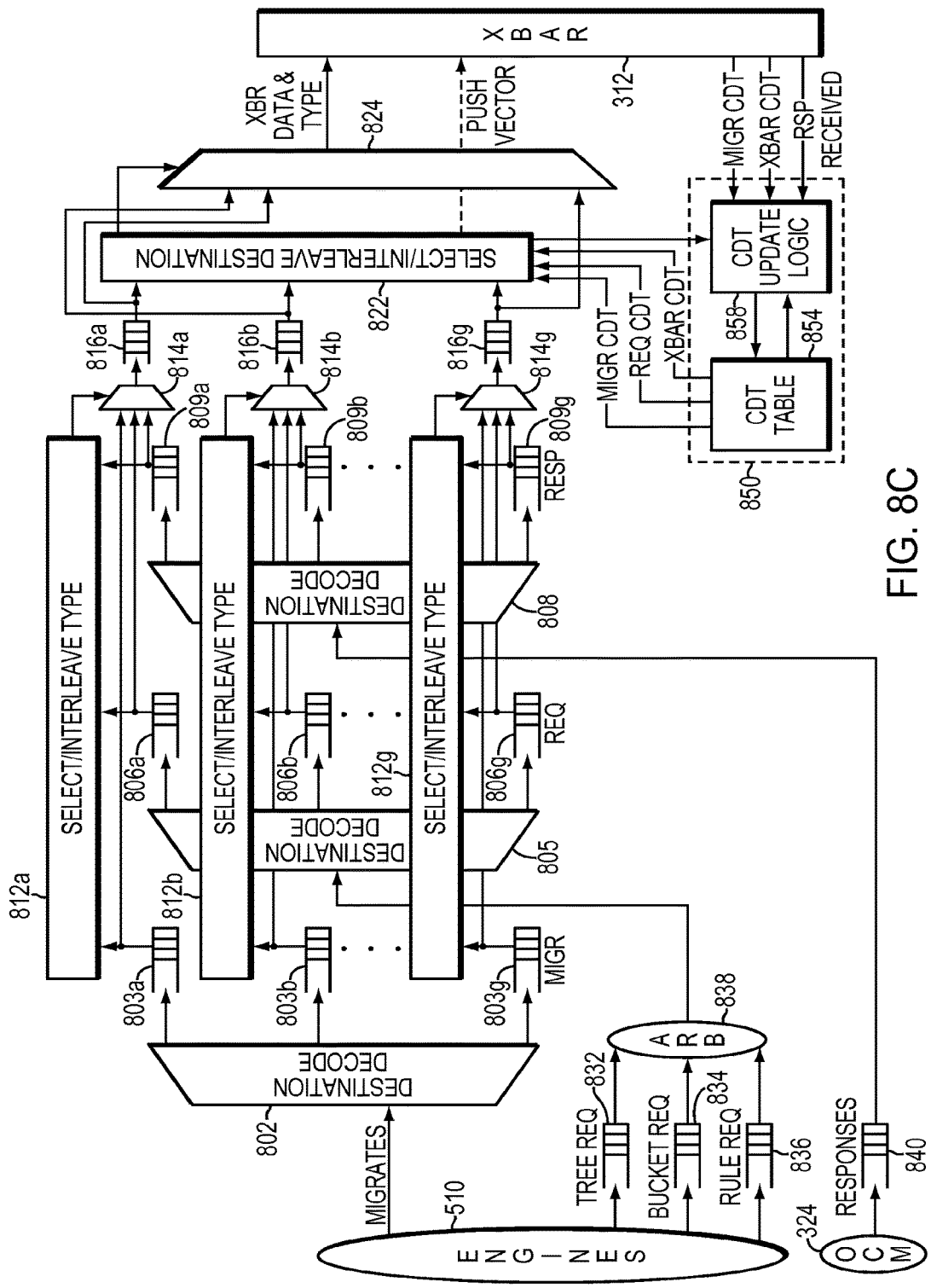

FIGS. 8B and 8C show logical diagrams illustrating an example implementation of the transmitting component 845, of the XBC 530, and the resource state manager 850. The transmitting component 845 is coupled to the OCM 324 and the processing engines 510, e.g., TWEs 512, BWEs 514, and RWEs 516 or RMEs 518, as shown in the logical diagrams. Among the processing engines 510, the TWEs 512 make remote tree access requests, the BWEs 514 make remote bucket access requests, and the RWEs 516 make remote rule access requests. The remote requests are stored in one or more first in first out (FIFO) buffers 834 and then pushed into per-destination FIFO buffers, 806a . . . 806g, to avoid head-of-line blocking. The one or more FIFO buffers 834 may include, for example, a FIFO buffer 832 for storing tree access requests, FIFO buffer 834 for storing bucket access requests, FIFO buffer 836 for storing rule chunk access requests, and an arbitrator/selector 838 configured to select remote requests from the different FIFO buffers to be pushed into the per-destination FIFO buffers, 806a-806g. Similarly, remote access responses received from the OCM 324 are stored in a respective FIFO buffer 840 and then pushed into a per-destination FIFO buffers, 809a-809g, to avoid head-of-line blocking.

The remote requests for all three types of data, e.g., tree, bucket and rule chunk, are executable in a single clock cycle. The remote access responses may be variable length data and as such may be executed in one or more clock cycles. The size of the remote access response is determined by the corresponding remote request, e.g., the type of the corresponding remote request or the amount of data requested therein. Execution time of a transport operation, e.g., remote access request operation, remote access response, or processing thread migration operation, refers herein to the time duration, e.g., number of clock cycles, needed to transfer data associated with transport operation between a memory cluster and the XBAR 312. With respect to a transport operation, a source memory cluster, herein, refers to the memory cluster sending the transport operation while the destination memory cluster refers to the memory cluster receiving the transport operation.

The TWEs 512 make tree processing thread migration requests, BWEs 514 make bucket processing thread migration requests. In the following, processing thread migration may be initiated either by TWEs 512 or BWEs 514. However, according to other example embodiments the RWEs 516 may also initiate processing thread migrations. When TWEs 512 or BWEs 514 make processing thread migration requests, the contexts of the corresponding processing threads are stored in per-destination FIFO buffers, 803a-803g. According to an example embodiment, destination decoders, 802, 805, and 808, are configured to determine the destination memory cluster for processing thread migration requests, remote access requests, and remote access responses, respectively. Based on the determined destination memory cluster, data associated with the respective transport operation is then sent to a corresponding per-destination FIFO buffer, e.g., 803a-803g, 806a-806g, and 809a-809g. The logic diagrams in FIGS. 8B and 8C assume a super cluster 310 including eight memory, or search, clusters 320. As such, each transport operation in a particular memory cluster may be destined to at least one of seven memory clusters referred to in the FIGS. 8B and 8C with the letters a . . . g.

According to an example embodiment, a per-destination arbitrator, 810a-810g, is used to select a transport operation associated with the same destination memory cluster. The selection may be made, for example, based on per-type priority information associated with the different types of transport operations. Alternatively, the selection may be made based on other criteria. For example, the selection may be performed based on a sequential alternation between the different types of transport operations so that transport operations of different types are treated equally. In another example embodiment, data associated with a transport operation initiated in a previous clock cycle may be given higher priority by the per-destination arbitrators, 810a-810g. As shown in FIG. 8C, each per-destination arbitrator, 810a-810g, may include a type selector, 812a-812g, a retriever, 814a-814g, and a destination FIFO buffer, 816a-816g. The type selector, 812a-812g, selects a type of a transport operation and passes information indicative of selected type to the retriever, 814a-814g, which retrieves the data at the head of a corresponding per-destination FIFO buffer, e.g., 803a-803g, 806a-806g, or 809a-809g. The retrieved data is then stored in the destination FIFO buffer, 816a-816g.

The transmitting component 845 also includes an arbitrator 820. The arbitrator 820 is coupled to the resource state manager 850 and receives or checks information related to the states of resources, in destination memory clusters, allocated to the source memory cluster processing the transport operations to be transmitted. The arbitrator 820 is configured to select data associated with at least one transport operation, or transaction, among the data provided by the arbitrators, 810a-810g, and schedule the at least one transport operation to be transported over the XBAR 312. The selection is based at least in part on the information related to the states of resources and/or other information such as priority information. For example, resources in destination memory clusters allocated to the source memory cluster are associated with remote access requests and processing thread migrations but no resources are associated with remote access responses. In other words, for a remote access response a corresponding destination memory cluster is configured to receive the remote access response at any time regardless of other processes running in the destination memory cluster. For example, resources in the destination memory clusters allocated to the source memory cluster include buffering capacities for storing data associated with transport operations received at the destination memory clusters from the source memory cluster. As such no buffering capacities, at the destination memory clusters, are associated with remote access responses.

Priority information may also be employed by the arbitrator 820 in selecting transport operations or corresponding data to be delivered to respective destination memory clusters. Priority information, for example, may prioritize transport operations based on respective types. The arbitrator may also prioritize data associated with transport operations that were initiated at a previous clock cycle but are not completely executed. Specifically, data associated with a transport operation executable in multiple clock cycles and initiated in a previous clock cycle may be prioritized over data associated with transport operations to be initiated. According to at least one example embodiment, transport operations, or transactions, executable in multiple clock cycles are not required to be delivered in back to back clock cycles. Partial transport operations, or transactions, may be scheduled to be transmitted to effectively use the XBAR bandwidth. The arbitrator 820 may interleave partial transport operations, corresponding to different transport operations, over consecutive clock cycles. At the corresponding destination memory cluster, the transport operations, or transactions, are pulled from the XBAR 312 based on transaction type, transaction availability from various source ports to maximize the XBAR bandwidth.

The selection of transport operations, or partial transport operations, by the arbitrator 820 may also be based on XBAR resources associated with respective destination memory clusters. XBAR resources include, for example, buffering capacities to buffer data to be forwarded to respective destination memory clusters. As such, the resource state manager 850 in a first memory cluster keeps track of XBAR resources as well as the resources allocated to the first memory cluster in other memory clusters.

According to an example embodiment, the arbitrator 820 includes a destination selector 822 configured to select a destination FIFO buffer, among the destination FIFO buffers 816a-816g, from which data to be retrieved and forwarded, or scheduled to be forwarded, to the XBAR 312. The destination selector passes information indicative of the selected destination to a retriever 824. The retriever 824 is configured to retrieve transport operation data from the respective destination FIFO buffer, 814a-814g, and forward the retrieved transport operation data to the XBAR 312.

The resource state manager 850 includes, for example, a database 854 storing a data structure, e.g., a table, with information indicative of resources allocated to the source memory cluster in the other clusters. The data structure may also include information indicative of resources in the XBAR 312 associated with destination memory clusters. The resource state manager 850 also includes a resource state logic 858 configured to keep track and update state information indicative of available resources that may be used by the source memory cluster. In other words, the resource state logic 858 keeps track of free resources allocated to the sources memory cluster in other memory clusters as well as free resources in the XBAR 312 associated with the other memory clusters. Resource state information may be obtained by updating, e.g., incrementing or decrementing, the information indicative of resources allocated to the source memory cluster in the other clusters and the information indicative of resources in the XBAR 312 associated with destination memory clusters. Alternatively, state information may be stored in a separate data structure, e.g., another table. Updating the state information is, for example, based on information received from the other memory clusters, the XBAR 312, or the arbitrator 820 indicating resources being consumed or freed in at least one destination resources or the XBAR 312.

According to an example embodiment, a remote access request operation is executed in a single clock cycle as it involves transmitting a request message. A processing thread migration is typically executed in two or more clock cycles. A processing thread migration includes the transfer of data indicative of the context, e.g., state, of the search associated with the processing thread. A remote access response is executed in one or more clock cycle depending on the amount of data to be transferred to the destination memory cluster.

Figure 8D:
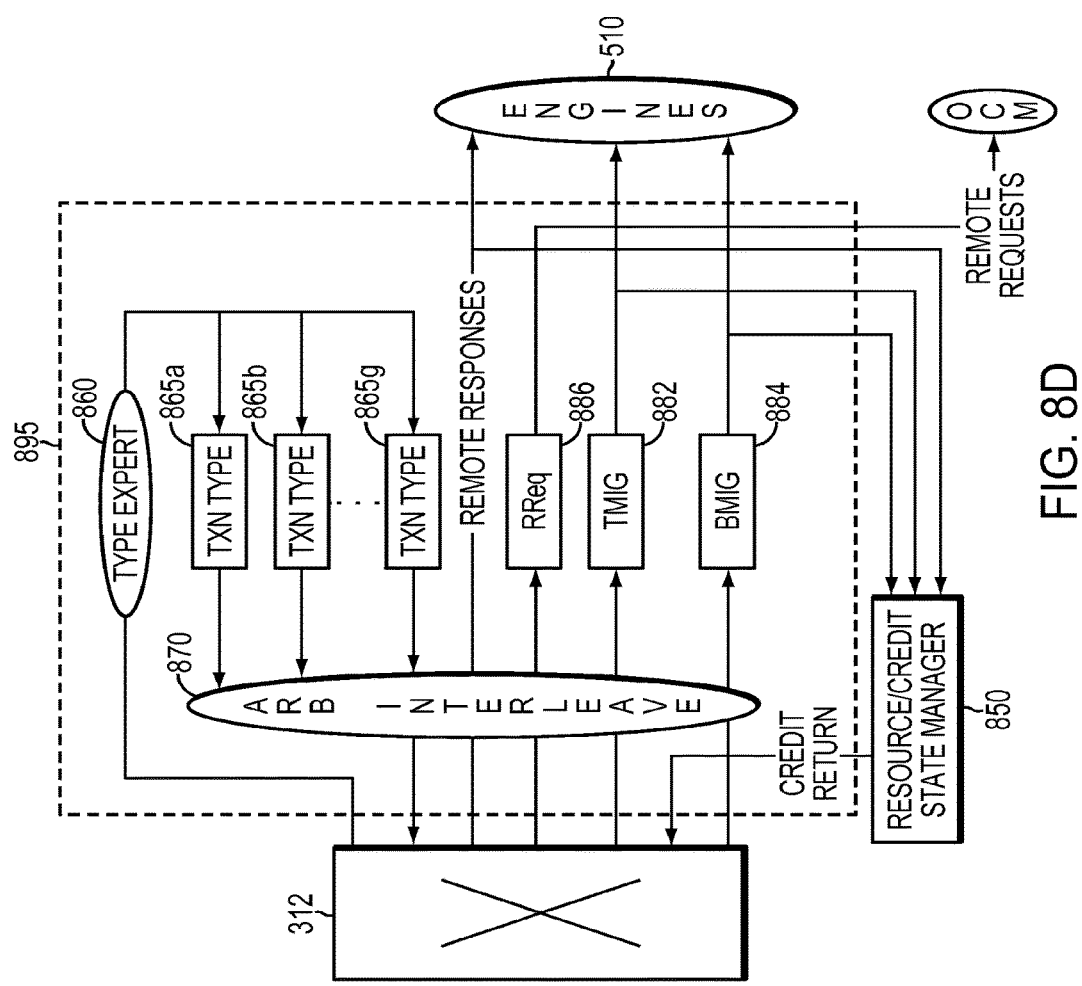
Figure 8E:
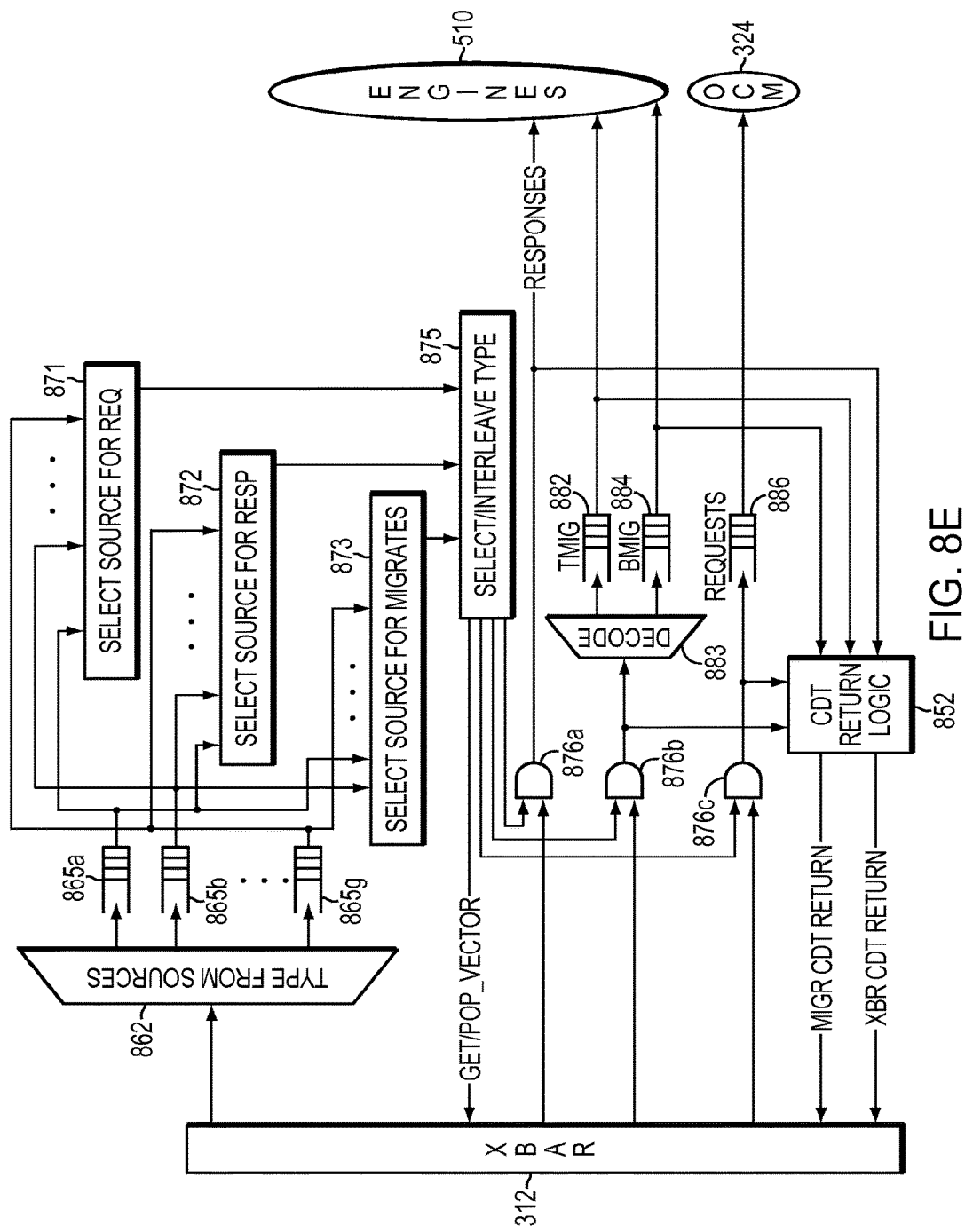

FIGS. 8D and 8E show logical diagrams illustrating an example implementation of the receiving component 895, of the XBC 530. According to at least one example embodiment, the receiving component 895, e.g., in a first memory cluster, includes a type identification module 860. The type identification module 860 receives information related to transport operations destined to the first memory cluster with data in the XBAR 312. The received information, for example, includes indication of the respective types of the transport operations. According to the example implementation shown in FIG. 8E, the type identification module 860 includes a source decoder 862 configured to forward the received information, e.g., transport operation type information, to per-source FIFO buffers 865a-865g also included in the type identification module 860. For example, received information associated with a given source memory cluster is forwarded to a corresponding per-source memory FIFO buffer. An arbitrator 870 then acquires the information stored in the per-source FIFO buffers, 865a-865g, and selects at least one transport operation for which data is to be retrieved from the XBAR 312. Data corresponding to the selected transport operation is then retrieved from the XBAR 312.

If the selected transport operation is a remote access request, the retrieved data is stored in the corresponding FIFO buffer 886 and handed off to the OCM 324 to get the data. That data is sent back as remote response to the requesting source memory cluster. If the selected transport operation is a processing thread migration, the retrieved data is stored in one of the corresponding FIFO buffers 882 or 884, to be forwarded later to a respective processing engine 510. The FIFO buffers 882 or 884 may be a unified buffer managed as two separate buffers enabling efficient management of cases where processing thread migrations of one type are more than processing thread migrations of another type, e.g., more tree processing thread migrations than bucket processing thread migrations. When a processing engine handling processing thread migration of some type, e.g., TMIG or BMIG, becomes available respective processing thread migration context, or data, is pulled from the unified buffer and sent to the processing engine for the work to continue in this first memory cluster. According to at least one example embodiment, one or more processing engines in a memory cluster receiving migration work are reserved to process received migrated processing threads. When a remote access response operation is selected, the corresponding data retrieved from the XBAR 312 is forwarded directly to a respective processing engine 510. Upon forwarding the retrieved data to the OCM or a processing engine 510, an indication is sent to the resource state manager 850 to cause updating of corresponding resource state(s).

In the example implementation shown in FIG. 8E, the arbitrator 870 includes first selectors 871-873 configured to select a transport operation among each type and a second selector 875 configured to select a transport operation among the transport operations of different types provided by the first selectors 871-873. The second selector 875 sends indication of the selected transport operation to the logic operators 876a-876c, which in turn pass only data associated with the selected transport operation. The example receiving component 895 shown in FIG. 8D also includes a logic operator, or type decoder, 883 configured direct processing thread migration data to separate buffers, e.g., 882 and 884, based on processing thread type, e.g., tree or bucket. Upon forwarding a transport operation to the OCM 324 or a respective processing engine 510, a signal is sent to a resource return logic 852. The resource return logic 852 is part of the resource state manager 850 and is configured to cause updating of resource state information.

Figure 9A:
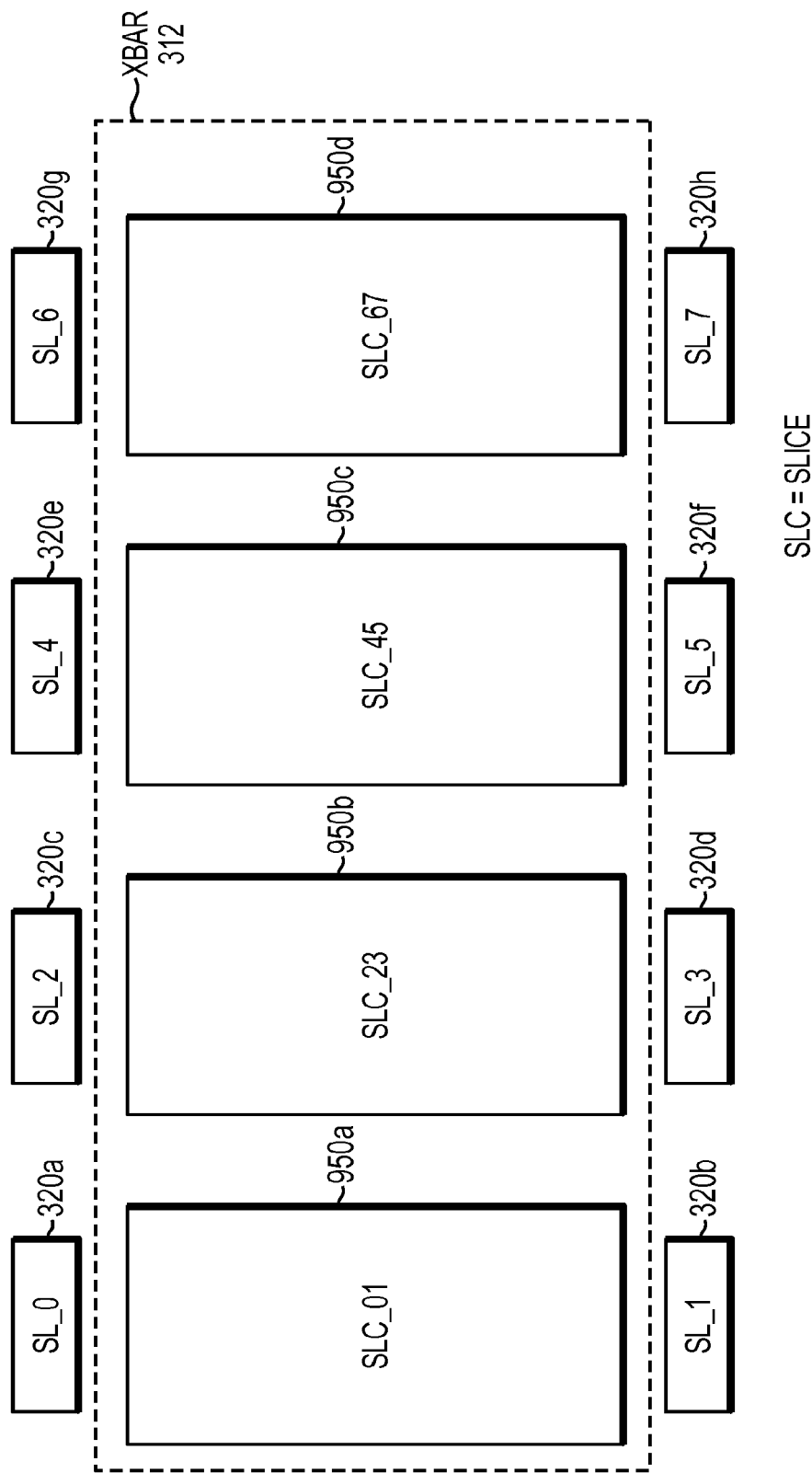
FIGS. 9A to 9D show block and logic diagrams illustrating an example implementation of a crossbar (XBAR) and components therein.

FIG. 9A is a block diagram illustrating an example implementation of the XBAR 312. A person skilled in the art should appreciate that the XBAR 312 as described herein is an example of an interface device coupling a plurality of memory clusters. In general, different interface devices may be used. The example implementation shown in FIG. 9A is an eight port fully-buffered XBAR that is constructed out of modular slices 950a-950d. For example, the memory clusters are arranged in two rows, e.g., north memory clusters, 320a, 320c, 320e, and 320g, are indexed with even numbers and south memory clusters, 320b, 320d, 320f, and 320h, are indexed with odd numbers. The XBAR 312 is constructed to connect these clusters. To match the cluster topology, the example XBAR 312 in FIG. 9A is built as a 2×4 (8-port) XBAR 312. Each slice connects a pair of North-South memory clusters to each other and to its neighboring slice(s).

Figure 9B:
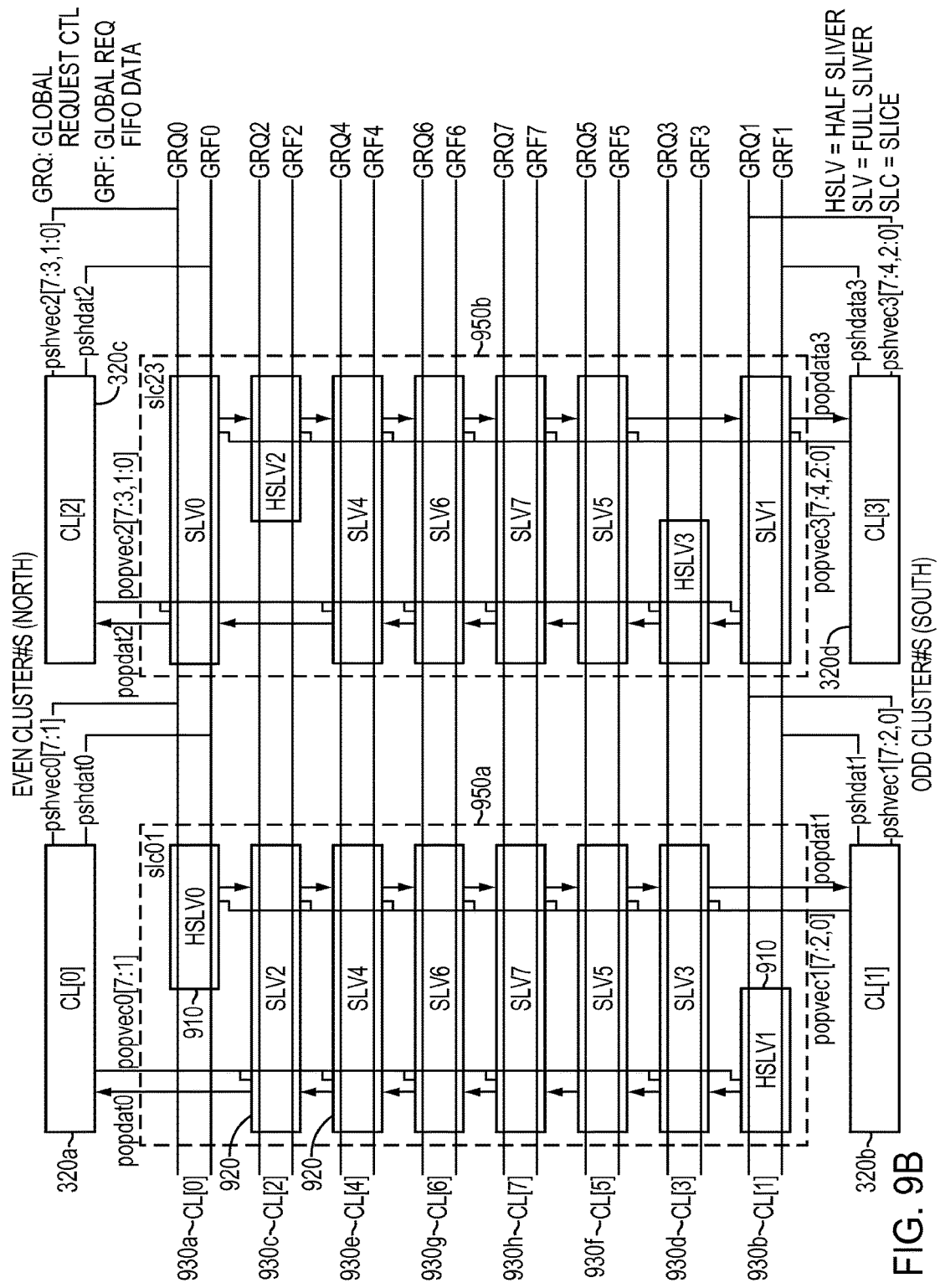

FIG. 9B is a block diagram illustrating implementation of two slices, 950a and 950b, of the XBAR 312. Each slice is built using half-slivers 910 and full-slivers 920. The half-slivers 910 and the full-slivers 920 are, for example, logic circuits used in coupling memory clusters to each other. For an N-port XBAR 312, each slice contains N−2 full-slivers 920 and 2 half-slivers 910. The full-slivers 920 correspond to memory cluster ports that are used to couple memory clusters 320 belonging to distinct slices 950. For the slice 950a, for example, full-slivers 920 correspond to ports 930c to 930h which couple memory clusters in the slice 950a to the memory clusters 950b-950d, respectively, in other slices 950. For the memory cluster ports coupling memory cluster within the same slice, the slivers are optimized to half-slivers 910. For the slice 950a, for example, half-slivers correspond to ports 930a and 930b.

Figure 9C:
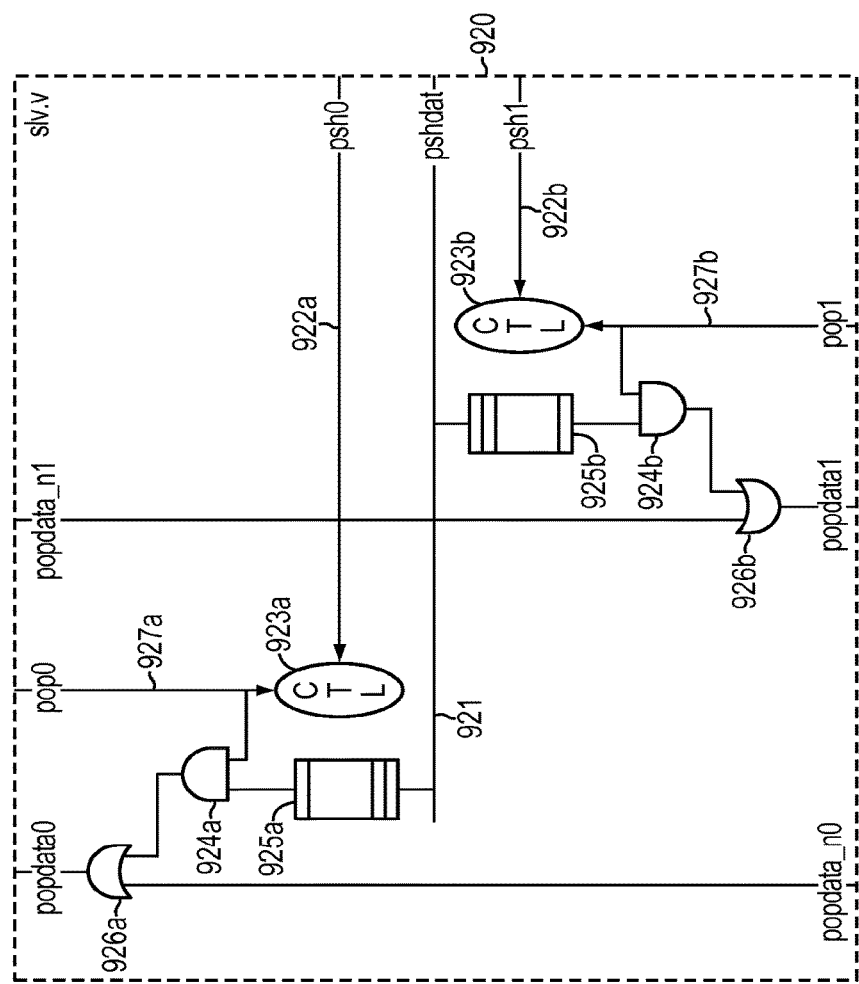

FIG. 9C shows an example logic circuit implementation of a full-sliver 920. The full-sliver 920 contains two FIFO buffers, 925a and 925b, for storing data from other ports through a neighboring slice. One FIFO buffer, e.g., 925a, is for storing data destined to the north memory cluster and one FIFO buffer, e.g., 925b, is for storing the data destined to the south memory cluster. The control (GRQs) signals 922a and 922b identify which port the data is destined to. The data (GRFs) 921 is pushed into the appropriate full-sliver FIFO 925a or 925b. For example, when data from the memory cluster_320c is destined to the memory cluster_320b, GRQ2 and GRF2 will signal to the south FIFO buffer 925b of the full sliver SLV2 in slice 950a to capture and keep the data until it is demanded by the memory cluster 320b. Continuing with the same example, if data was destined to the memory cluster_320a, GRQ2 will signal the north FIFO buffer 925a the full sliver SLV2 in slice 950a to capture and keep the data until demanded by the memory cluster_320a.

Figure 9D:
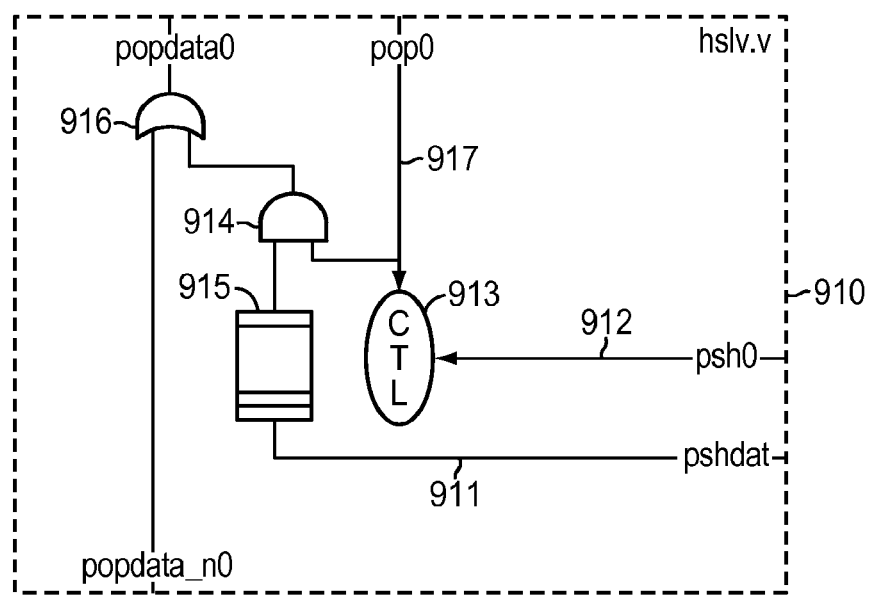

FIG. 9D shows an example logic circuit implementation of a half-sliver 910. Each half-sliver 910 contains one FIFO buffer 925 for storing data from one of two memory clusters within a given slice. The data in each half-sliver 910 is meant for the opposite memory cluster in the same slice. For example, in the slice 950a, the half-sliver HSLV0 gets data (GRF0) from the memory cluster_320a and is destined to the memory cluster_950b.

When a memory cluster decides to fetch the data from a particular FIFO buffer, e.g., 925, 925a, or 925b, it sends a pop signal, 917, 927a, or 927b, to that FIFO buffer. When the FIFO buffer, e.g., 925, 925a, or 925b, is not selected by the memory cluster the logic AND operator 914, 924a, or 924b, outputs zeros. An OR operator, e.g., 916, 926a, or 926b, in each sliver is applied to the data resulting in a chain of OR operators either going north or going south. According to an example embodiment, one clock cycle delay between pop signal and data availability at the memory cluster that's pulling the data.

The XBAR 312 is the backbone for transporting various transport transactions, or operations, such as remote requests, remote responses, and processing thread migrations. The XBAR 312 provides the transport infrastructure, or interface. According to at least one example embodiment, transaction scheduling, arbitration and flow control is handled by the XBC 530. In any given clock cycle multiple pairs of memory clusters may communicate. For example, the memory cluster 320a communicates with the memory cluster 320b, the memory cluster 320f communicates to the memory cluster 320c, etc. The transfer time for transferring a transport operation, or a partial transport operation, from a first memory cluster to a second memory cluster is fixed with no queuing delays in the XBAR 312 or any of the XBCs of the first and second memory clusters. However, in the case of queuing delays, the transfer time, or latency, depends on other transport operations, or partial transport operations, in the queue and the arbitration process.

Resources are measured in units, e.g., "credits." For example, a resource in a first memory cluster, e.g., destination memory cluster, allocated to a second memory cluster, e.g. source memory cluster, represented by one credit corresponds to one slot in a respective buffer, e.g., 882, 884, or 886. According to another example, one credit may represent storage capacity equivalent to the amount of data transferrable in a single clock cycle. XBAR resources refer, for example, to storage capacity of FIFO buffers, e.g., 915, 925a, 925b, in the XBAR. In yet another example, one credit corresponds to storage capacity for storing a migration packet or message.

The XBAR 312 carries single- and multi-cycle packets, and/or messages, from one cluster to another over, for example, a 128 bit crossbar. These packets, and/or messages, are for either remote OCM access or processing thread migration. Remote OCM access occurs when a processing thread, e.g., the TWE and/or BWE, on one cluster encounters Rule Compiled Data Structure (RCDS) image data that redirects a next request to a different memory cluster within the same super-cluster. Processing thread migration occurs for two forms of migration, namely, a) Tree-Walk migration and b) Bucket-Walk migration. In either case, the processing thread context, e.g., details of the work done so far and where to start working, for the migrated thread is transferred to a different memory cluster within the same super-cluster, which continues processing for the thread.

FIGS. 10A and 10B show two example tables storing resource state information in terms of credits. The stored state information is employed in controlling the flow of transport transactions. Both tables, in FIGS. 10A and 10B, illustrate two examples of resource credits allocated to the memory cluster indexed with 0 in the memory clusters indexed with 1 through 7. In FIG. 10A, the first column shows unified migration, the second column shows remote request credits and the third column shows XBAR credits allocated to the memory cluster indexed with 0. In FIG. 10B, the migration credits are separated based on the type of processing thread migration, e.g., tree processing thread migration and bucket processing thread migration. Migration credits track the migration buffer(s) availability at a particular destination. Remote request credits track the remote request buffer(s) availability at the destination. XBAR credit tracks the resources inside the XBAR to a particular destination. There are no separate credits for responses. The response space is pre-allocated in the respective engine.

When a remote access request is sent from a first memory cluster, e.g., a source cluster, to a second memory cluster, e.g., destination cluster, the resource state manager 850 of the first memory cluster decrements, e.g., by a credit, the credits defining the remote request resources allocated to the first memory cluster in the second memory cluster. The resource state manager 850 may also decrement, e.g., by a credit, the credits defining the state of XBAR resources associated with the second memory cluster and allocated to the first memory cluster. When the remote access request is passed from the XBAR 312 to the destination memory cluster, the resource state manager 850, at the source memory cluster, receives a signal from the XBAR 312 indicating the resource represented by the decremented credit is now free. The resource state manager 850, in the first cluster, then increments the state of the XBAR resources associated with the second memory cluster and allocated to the first memory cluster by a credit. When the corresponding remote access response is received from the second memory cluster and is passed to a corresponding engine in the first cluster, a signal is sent to the resource return logic 852 which in turn increments, e.g., by a credit, the state of resources allocated to the first memory cluster in the second memory cluster.

When a processing thread is migrated from the first memory cluster to the second memory cluster, the resource state manger 850 of the first memory cluster decrements, e.g., by a credit, the credits defining the migration resources allocated to the first memory cluster in the second memory cluster. The resource state manager 850 of the first memory cluster may also decrement, e.g., by a credit, the credits defining the state of XBAR resources associated with the second memory cluster and allocated to the first memory cluster. When the migrated processing thread is passed from the XBAR 312 to the destination memory cluster, the resource state manager 850 of the first memory cluster receives a signal from the XBAR 312 indicating the resource represented by the decremented credit is now free. The resource state manager 850, in the first memory cluster, then increments the state of the XBAR resources associated with the second memory cluster and allocated to the first memory cluster by a credit. When the migrated processing thread is passed to a corresponding engine, a signal is sent to the resource return logic 852 of the second memory cluster, which in turn forwards the signal to the resource state manager 850 of the first memory cluster. The resource state manager 850 of the first memory cluster then increments, e.g., by a credit, the migration resources allocated to the first memory cluster in the second memory cluster. Decrementing or incrementing migrations credits may be performed based on the type of processing thread being migrated, e.g., tree processing thread or bucket processing thread, as shown in FIG. 10B.

FIGS. 11A to 11C illustrate examples of interleaving transport operations and partial transport operations over consecutive clock cycles. In FIG. 11A, a processing thread migration is executed in at least four non-consecutive clock cycles with remote access requests executed in between. Specifically, the processing thread migration is executed over the clock cycles indexed with 0, 2, 3 and 5 while two remote access requests are executed, respectively, over the clock cycles indexed with 1 and 4. The interleaved transport operations in FIG. 11A are executed by a source memory cluster destined to the same memory cluster. FIG. 11B shows an example of interleaving transport operations executed by a source memory cluster destined to two destination memory clusters, e.g., indexed with 0 and 1. FIG. 11C shows an example of interleaving transport operations and partial transport operations executed by a destination memory cluster. Specifically, a remote access response, received from the memory cluster indexed with 0, is executed over the clock cycles indexed with 0, 1, and 3, while two remote access requests destined to two distinct memory clusters over the clock cycles indexed with 2 and 4.

Figure 12A:
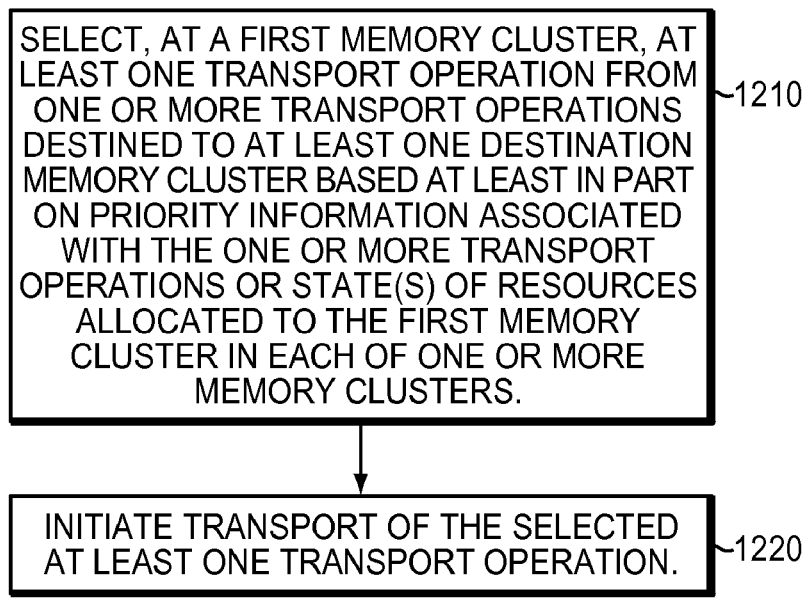
FIGS. 12A and 12B show flowcharts illustrating methods of managing transport operations between a first memory cluster and one or more other memory clusters performed by the XBC.

FIG. 12A shows a flowchart illustrating a method of managing transport operations between a source memory cluster and one or more other memory clusters performed by the XBC 530. Specifically the method is performed by the XBC in a source memory cluster. At block 1210 at least one transport operation from one or more transport operations is selected, at a clock cycle in the source memory cluster, the at least one transport operation is destined to at least one destination memory cluster based at least in part on priority information associated with the one or more transport operations or current states of available processing resources allocated to the source memory cluster in each of a subset of the one or more other clusters. At block 1220, the transport of the selected at least one transport operation is initiated.

The one or more transport operations are received from processing engines 510 and/or OCM 324. The method may be implemented through an implementation of the XBC as shown in FIGS. 8B and 8C. However, a person skilled in the art should appreciate that the method may be implemented a different implementation of the XBC. For example, the priority information may be based on the type, latency, or destination, of the one or more transport operations. The selection may further be based on XBAR resources associated with the destination memory cluster.

Figure 12B:
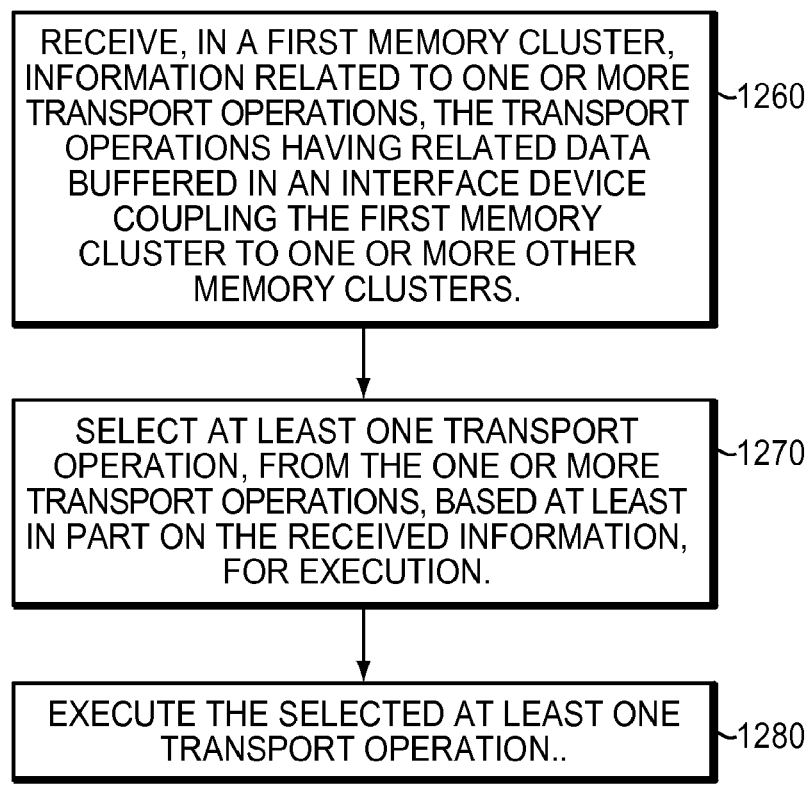

FIG. 12B shows a flowchart illustrating another method of managing transport operations between a destination memory cluster and one or more other memory clusters performed by the XBC 530. Specifically the method is performed by the XBC in a destination memory cluster. At block 1260, information related to one or more transport operations with related data buffered in an interface device is received, in the source memory cluster, the interface device coupling the destination memory cluster to the one or more other memory clusters. At block 1270, at least one transport operation, from the one or more transport operations, is selected to be transported to the destination memory cluster based at least in part on the received information. At block 1280 the transport of the selected at least one transport operation is initiated.

According to at least one example embodiment, resource credits are assigned to memory clusters by software of the host processor, e.g., 204, 214, 228, 242, or 244. The software may be, for example, the software compiler 404. The assignment resource credits may be performed, for example, when the search processor 202 is activated or reset. The assignment of the resource credits may be based on the type of data stored in each memory cluster, the expected frequency of accessing the stored data in each memory cluster, or the like.

Figure 13:
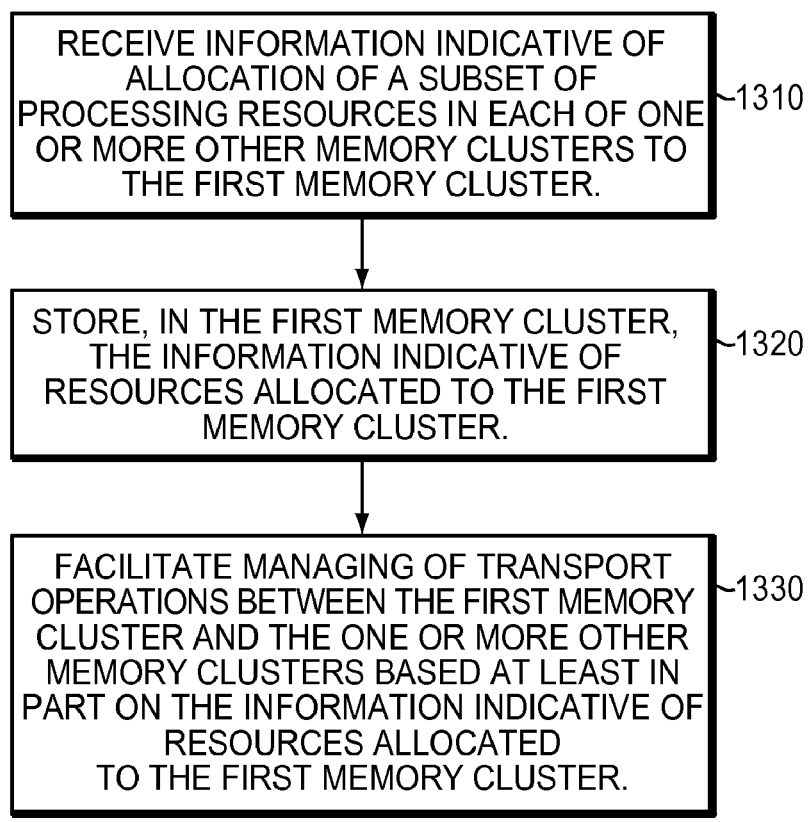
FIG. 13 shows a flowchart illustrating a method of assigning resources used in managing transport operations between a first memory cluster and one or more other memory clusters.

FIG. 13 shows a flowchart illustrating a method of assigning resources used in managing transport operations between a first memory cluster and one or more other memory clusters. At block 1310, information indicative of allocation of a subset of processing resources in each of the one or more other memory clusters to the first memory cluster is received, for example, by the resource state manager 850 of the first memory cluster. At block 1320, information indicative of resources allocated to the first cluster is stored in the first memory cluster, specifically in the respective resource state manager 850. The allocated processing resources may be stored as credits. The processing resources may be allocated per type of transport operations as previously shown in FIGS. 10A and 10B. The allocated processing resources may be stored in the form of a table or any other data structure. At block 1330, the information indicative of resources allocated to the first memory cluster, stored in the resource state manager 850, is then used to facilitate managing of transport operations between the first memory cluster and the one or more other memory clusters. For example, the stored information is used as resource state information indicative of availability of the allocated processing resources to the first memory cluster and is provided to the arbitrator 820 to manage transport operations between the first memory cluster and the one or more other memory clusters. The resource state information is updated in real time, as described above, to reflect which among the processing resources are free and which are in use. The processing resources represent, for example, buffering capacities in the each memory cluster, and as such the sum of processing resources in a given memory cluster allocated to other memory clusters is equal to or less than the total number of respective processing resources of the given memory cluster.

The host processor, e.g., 204, 214, 228, 242, or 244, may modify allocation of processing resources to the first memory cluster on the fly. For example, the host processor may increase or decrease the processing resources, or number of credits, allocated to the first memory cluster in a second memory cluster. In reducing processing resources, e.g., number of migration resources, allocated to the first memory cluster in the second memory cluster, the host processor indicates to the search processor a new value of processing resources, e.g., number of credits, to be allocated to the first memory cluster in the second memory cluster. The search processor determines, based on the state information, whether a number of free processing resources allocated to the first memory cluster in the second memory cluster is less than a number of processing resources to be reduced. Specifically, such determination may be performed by the resource state manager 850 in the first memory cluster. For example, let 5 credits be allocated to the first memory cluster in the second memory cluster, and the host processor, e.g., 204, 214, 228, 242, or 244, decides to reduce the allocated credits by 3 so that the new allocated credits would be 2. The host processor sends the new credits value, e.g., 2, to the search processor 202. The resource state manager 850 in the first memory cluster checks whether the current number of free credits, e.g., m, that are allocated to the first memory cluster from the second memory cluster is less than the number of credits to be reduce, e.g., 3. Upon determining that the number of free processing resources, e.g., m, is less than the number of processing resources to be reduced, e.g., 3, The XBC 530 in the first memory cluster blocks, initiation of new transport operations between the first memory cluster and the second memory cluster until the number of free processing resources, e.g., m, allocated to the first memory cluster in the second memory cluster is equal to or greater than the number of resource to be reduced. That is, the transfer of transport operations between the first and second memory clusters are blocked until, for example, m≥3. According to one example, only initiation of transport of new transport operations is blocked. According to another example, initiation of transport of new transport operations and partial transport operation is blocked. Once the number of free processing resources, e.g., m, allocated to the first memory cluster in the second memory cluster is equal to or greater than the number of resource to be reduced, the information indicative of allocated processing resources is updated, for example, by the resource state manager 850 in the first memory cluster to reflect the reduction, e.g., changed from 5 to 2. In another example, the checking may be omitted and the blocking of transport operations and partial transport operations may be applied until all allocated credits are free and then the modification is applied.

In increasing the number of processing resources allocated to the first memory cluster from the second memory cluster, the host processor determines whether a number of non-allocated processing resources, in the second memory cluster, is larger than or equal to a number of processing resources to be increased. For example if the number of allocated processing resources is to be increased from 5 to 8 in the first memory cluster, the number of non-allocated resources in the second memory cluster is compared to 3, i.e., 8-5. Upon determining that the number of non-allocated processing resources, in the second memory cluster, is larger than or equal to the number of processing resources to be increased, the host processor sends information, to the search processor 202, indicative of changes to be made to processing resources allocated to the first memory cluster from the second memory cluster. Upon the information being received by the search processor 202, the resource state manager 850 in the first memory cluster modifies the information indicative of allocated processing resources to reflect the increase in processing resources, in the second memory cluster, allocated to the first memory cluster. The resource state manager then uses the updated information to facilitate management of transport operations between the first memory cluster and the second memory cluster. According to another example, the XBC 530 of the first memory cluster may apply blocking of transport operations and partial transport operations both when increasing or decreasing allocated processing resources.

Figure 14:
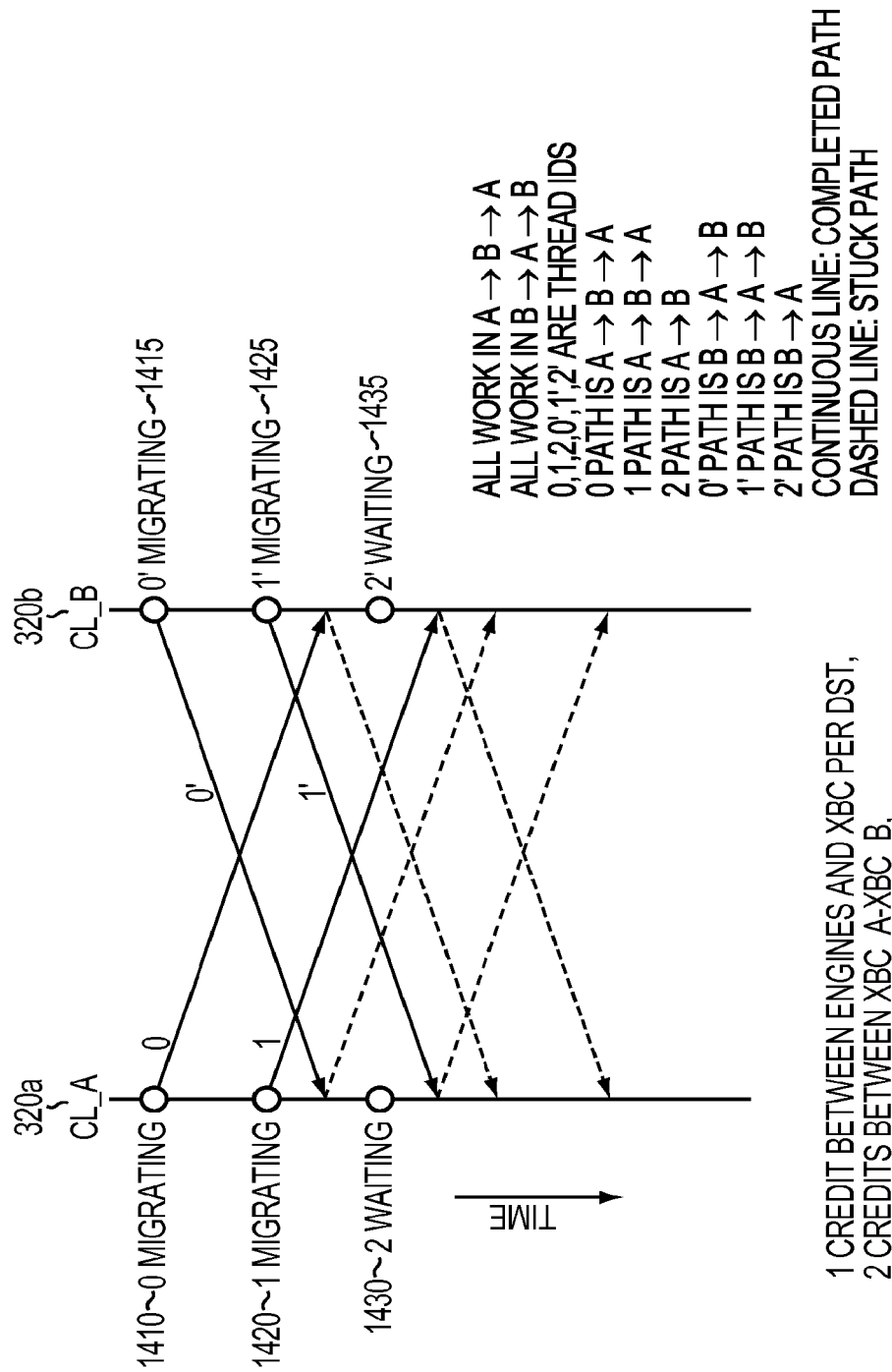
FIG. 14 shows a flow diagram illustrating a deadlock scenario in processing thread migrations between two memory clusters.

FIG. 14 shows a flow diagram illustrating a deadlock scenario in processing thread migrations between two memory clusters. Assume two migration credits are allocated to memory cluster 320a from memory cluster 320b and two migration credits are allocated to the memory cluster 320b from the memory cluster 320a. Also assume that a single processing engine is handling migration work in each of the memory clusters 320a and 320b. Two processing threads, 1410 and 1420, are migrated from the memory cluster 320a to 320b and two other processing threads, 1415 and 1425, are migrated from the memory cluster 320b to 320a. The processing threads 1410 and 1420 want to migrate back to the memory cluster 320a, while the processing threads 1415 and 1425 want to migrate back to the memory cluster 320b. Also the processing thread 1430 wants to migrate to the memory cluster 320b and the processing thread 1435 wants to migrate to the memory cluster 320a. However each memory cluster, 320a or 320b, can handle a maximum of three processing threads at any point in time, e.g., one by the processing engine and two in the buffers indicated by the credits. Given that there are three processing threads in each memory cluster, none of the processing threads, 1410, 1415, 1420, 1425, 1430, or 1435, can migrate. As such, a deadlock occurs with none of the migration works proceeding. The deadlock is mainly caused by allowing migration loops where a processing may migrate back to memory cluster that it migrated from previously.

According to an example embodiment, the deadlock may be avoided by limiting the number of processing threads, of a given type, being handled by a super cluster at any given point of time. Regardless of the number of memory clusters, e.g., N, in a super cluster, if a processing thread may migrate to any memory cluster in the super cluster, or in group of memory clusters, then there is a possibility that all processing threads in the super cluster may end up in two memory clusters of the super cluster, that is similar to the case of FIG. 14. Consider that each memory cluster has k processing engines for processing migration work of the given type and that each destination memory cluster has M migration credits, e.g., for migration work of the given type, to be distributed among N−1 memory clusters. The maximum number of processing threads, of a given type, that may be handled by the super cluster without potential deadlock is defined as:

$$W_{max} = \left(\text{Int}\left(\frac{M}{N-1}\right) + k\right) * 2 - 1,$$

where "Int" is a function providing the integer part of a number.

For example, let the number of processing engines for processing migration work of the given type per memory cluster be k=16. Let the number of total credits, for migration of the given type, in any destination memory cluster be M=15 and the total number of memory cluster in the super cluster, or the group of clusters, be N=4. As such the number of migration credits allocated to any source memory cluster in any destination memory cluster is 15 divided by (4-1), which is equal to 5. According to the equation above, the maximum number of processing threads that the super cluster may handle is 41. Applying the example of processing thread ending up distributed between only two memory clusters as in FIG. 14, then a first memory cluster, having 16 processing engines and 5 migration credits, may end up with 21 processing threads. That is, the 16 processing engines and the buffering capacity represented by the 5 credits are being consumed. A second memory cluster, having 16 processing engines and 5 migration credits, then ends up with the 20 other processing threads. As such a processing thread may migrate from the first memory cluster to the second memory. Given that any processing thread may either finish processing, migrate, or transforms into a different type of processing thread, e.g., from tree processing thread to bucket processing thread, then at a given point of time a processing thread in the first memory cluster would either transform into a processing thread of different type, finish processing completely and vanish, or migrate to the second memory cluster. In each of these cases it would become possible for a processing thread in the second memory cluster to migrate to the first memory cluster. Therefore, with such deadlock is avoided. However, if the total number of migration thread is more than the maximum indicated by the equation above, a potential deadlock may occur if the total processing threads end up being distributed between two clusters with all the engines and the migration credits therein being consumed.

Figure 15:
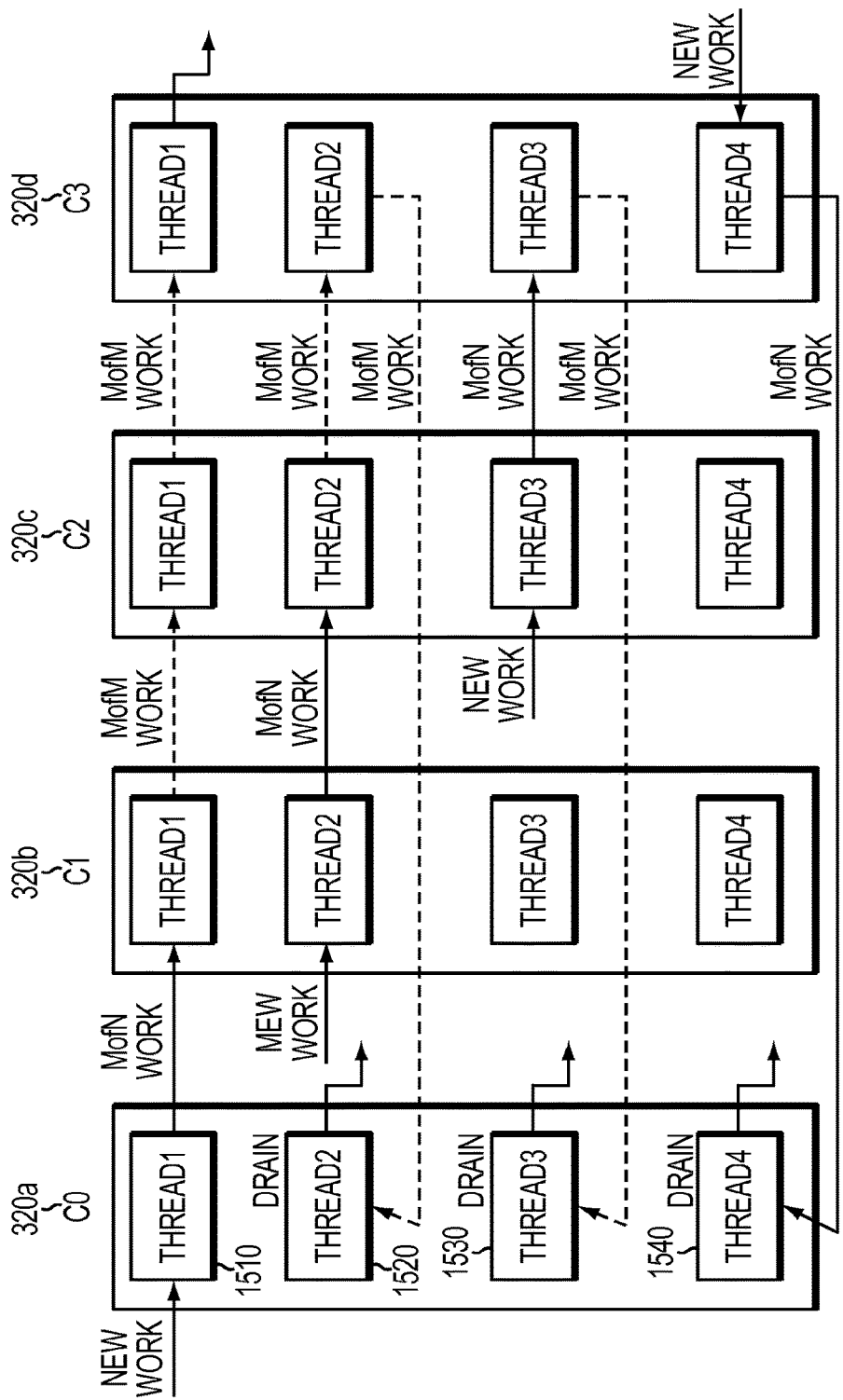
FIG. 15 shows a graphical illustration of an approach to avoid deadlock in processing thread migrations.

FIG. 15 shows graphical illustration of another approach to avoid deadlock. The idea behind approach to avoid deadlocks is to prevent any migrations loops where a migrating processing thread may migrate to a memory cluster from which it previously migrated. In the example shown in FIG. 15, migration of four different processing threads, 1510, 1520, 1530, and 1540, across the memory clusters 324a-324d are illustrated, with the memory cluster 324a assigned as a drain, or sink, memory cluster. A sink, or drain, memory cluster prevents a processing thread that migrated to it from another memory cluster to migrate out. In addition, a processing thread that migrated to a particular memory cluster may not migrate to another memory cluster from which other processing threads, e.g., of the same type, migrate to the particular memory cluster and therefore preventing migration loops. In other words, migrated processing threads may migrate to a sink memory cluster or memory cluster in a path to a sink memory cluster. A path to a sink memory cluster may not have structural migration loops. As illustrated in FIG. 15, such design, of migrations, prevent structural migration loops from occurring.

Contrary to migrated work, new work that originated in a particular memory cluster but did not migrate yet, may migrate to any other memory cluster even if the particular memory cluster is a sink memory cluster. Further, at least one processing engine is reserved to handle migration work in memory clusters receiving migration work.

Figure 16:
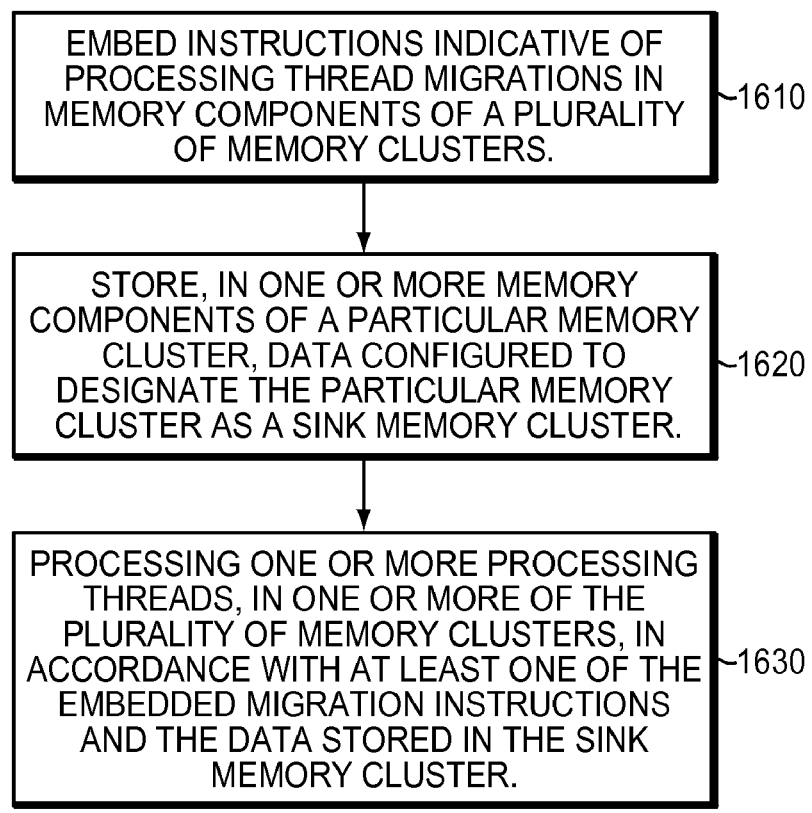
FIG. 16 is a flowchart illustrating a method of managing processing thread migrations within a plurality of memory clusters.

FIG. 16 is a flowchart illustrating a method of managing processing thread migrations within a plurality of memory clusters. According to at least one example embodiment, instructions indicative of processing thread migrations are embedded at block 1610, in memory components of the plurality of memory clusters. Such instructions are, for example, received from the host processor in the search processor 202 and embedded by the latter in memory components of the plurality of memory clusters of the same search processor. When a processing thread, fetching data in the OCM of a first memory cluster encounters one of such instructions, the corresponding processing engine make a migration request to migrate to a second memory cluster indicated in the encountered instruction. At block 1620, data, configured to designate a particular memory cluster as a sink memory cluster, is stored in one or more memory components of the particular memory cluster. The particular memory cluster is one among the plurality of memory clusters of the search processor 202.

A sink memory cluster may be designed, for example, through the way the data to be fetched by processing engines is stored across different memory clusters and by not embedding any migration instructions in any of the memory components of the sink memory cluster. In other words, by distributing data to be fetched in a proper way between the different memory clusters, a sink memory cluster stores all the data that is to be accessed by a processing thread that migrated to the sink memory cluster. Alternatively, if some data, that is to be accessed by a processing thread that migrated to the sink memory cluster, is not stored in the sink memory cluster, then such data is accessed from another memory cluster through remote access, but no migration is instructed. In another example, the data stored in the sink memory cluster is arranged to be classified into two parts. A first part of the data stored is to be searched or fetched only by processing threads originating in the sink memory cluster. A second part of the data is to be searched or fetched by processing threads migrating to the sink memory cluster from other memory clusters. As such, the first part of the data may have migration instructions embedded therein, while the second part of the data does not include any migration instructions. At block 1630, one or more processing threads executing in one or more of the plurality of memory clusters, are processed, for example, by corresponding processing engines, in accordance with at least one of the embedded migration instructions and the data stored in the sink memory cluster. For example, if the processing thread encounters migration instruction(s) then it is caused to migrate to another memory cluster according to the encountered instruction(s). Also if the processing thread migrates to the sink memory cluster, then the processing thread does migrate out of the sink memory cluster.

According to at least one aspect, migrating processing threads include at least one tree search thread or at least one bucket search thread. With regard to the instructions indicative of processing thread migrations, such instructions are embedded in a way that would cause migrated processing threads to migrate to a sink memory cluster or to a memory cluster in the path to a sink memory cluster. A path to a sink memory cluster is a sequence of memory clusters representing a migration flow path and ending with the sink memory cluster. The embedded instructions are also embedded in a way to prevent migration of a processing thread to a memory cluster from which the processing thread migrated previously. The instructions may further be designed to prevent a migrating processing thread arriving to a first memory cluster to migrate to a second memory cluster from which other migration threads migrate to the first memory cluster.

A person skilled in the art should appreciate that the RCDS 410, shown in FIG. 4, may be arranged according to another example of nested data structures. As such the processing engines 510 are defined in accordance with respective fetched data structures. For example, if the nested data structures include a table, a processing engine may defined as, for example, table fetching engine or table walk engine. Processing engines 510, according to at least one example, refer to separate hardware processors such as single-core processors or specialized processors included in the XBC 530. Alternatively, processing engines 510 may be functions performed by one or more hardware processors included in the XBC 530.

Figure 17:
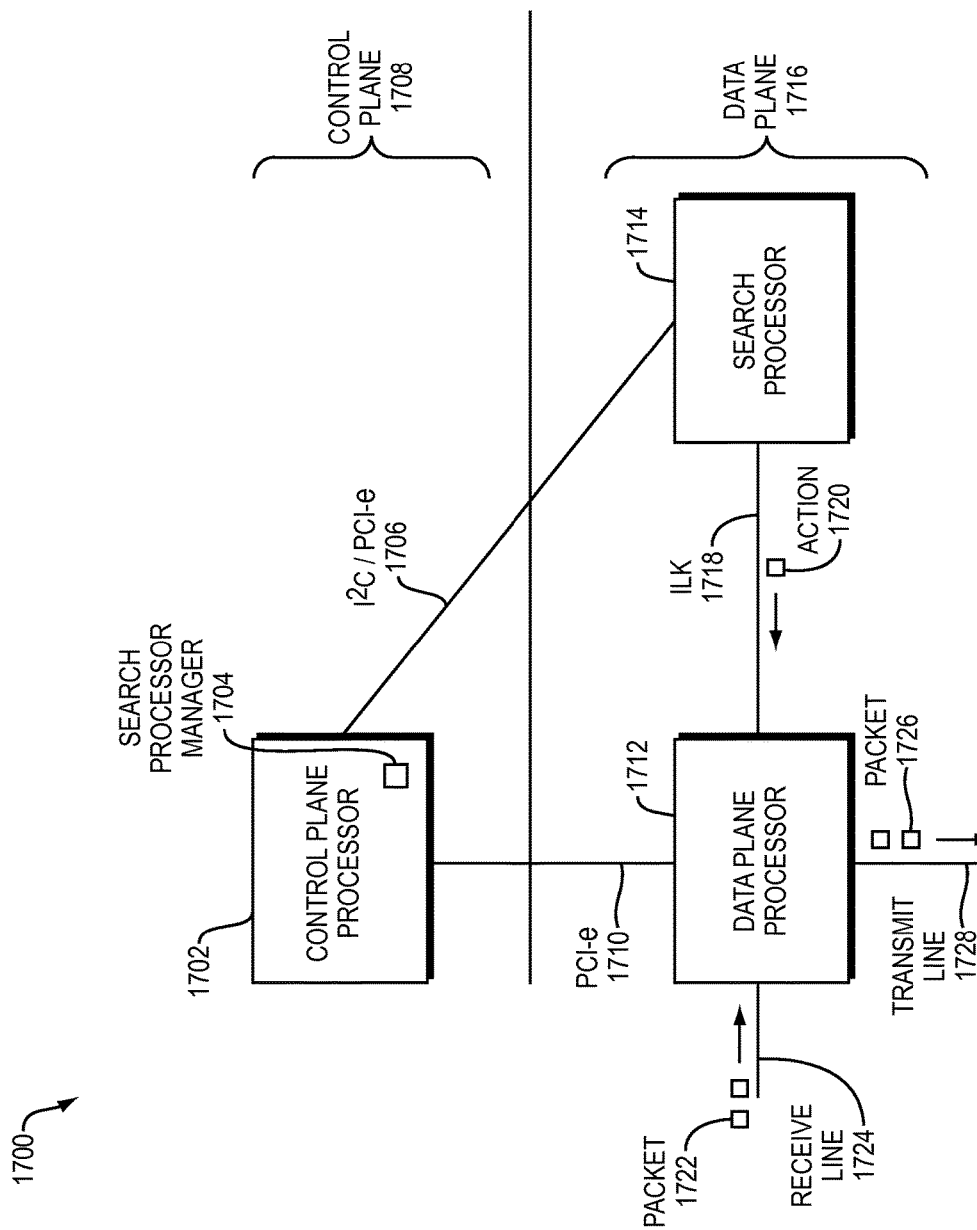
FIG. 17 is a block diagram illustrating an example embodiment of a search processor manager employed with a search processor.

FIG. 17 is a block diagram 1700 illustrating an example embodiment of a search processor manager 1704 employed with a search processor 1714. The search processor 1714 is coupled with a control plane processor 1702, in a control plane 1708, and also with a data plane processor 1712, in a data plane 1716. The search processor 1714 is also in the data plane 1716. The search processor 1714 is coupled to the control plane processor 1702 by an I$^2$C/PCI-E 1706 connection, and also to the data plane processor 1712 over an Interlaken 1718 connection. The search processor manager 1704 is a module within the control plane processor 1702 in the control plane 1708. The data plane processor 1712 is connected to the control plane processor 1702 over a PCI-E connection 1710.

The data plane processor 1712 receives packets 1722 over a receive line 1724. The data plane processor communicates with the control plane processor 1702 and the search processor 1714 to determine how to process the received packets. The control plane processor 1702 and search processor manager 1704 assist the search processor 1714. The search processor manager 1704 provides an instant view of the storage within the memory (e.g., clusters) of the search processor 1714. The search processor manager 1704 also provides a knowledge base, or guidelines, on processing data. For example, the search processor manager 1704 organizes the memory of the search processor 1714 to avoid migration deadlock of the processors (e.g., TWE, BWE, and RME) within the cluster of the search processor 1714. The search processor manager 1704 can also organize the memory to avoid remote accesses of other clusters within the search processor 1714. Further, the search processor manager 1704 can help better and more efficiently utilize hardware resources of the search processor 1714, such as the memory within, and the processing resources, such as tree walk engines, bucket walk engines, and rule match engines. The search processor manager 1704 can also help avoid bank conflicts in the memory of the search processor 1714. The search processor manager 1704 can also help avoid rule replication in the memory of the search processor 1714.

In one embodiment, the search processor manager 1704 organizes the memory by using a database packer. The database packer can include a tree packer (e.g., tree packing module), a bucket packer (e.g., a bucket packing module) and a rule packer (e.g., a rule packing module). While the database packer 1704 can reside in the search process manager 1704, in other embodiments it could reside in the search processor 1714 or within another processor or module.

The tree packer is configured to pack the nodes of the tree in each of the clusters so that, when the search processor walks the tree in its memory, it does not perform a migration or a remote cluster access, or if it does, it performs as few migrations and as few remote accesses as possible. The tree packer is also configured to prevent the search processor from performing a migration loop during a tree walk, that is, migrating from a first cluster to any number of clusters before migrating back to the first cluster.

The bucket packer is configured to pack a particular number of bucket chunks per bucket and a particular number of rule pointers per bucket chunk based on addresses of the rules. The bucket packer can also allocate the rules in the memory in a same order as an order of allocation of the buckets. The bucket packer can also replicate a rule (or a chunk of rules) across multiple banks, such as a first and second bank, in the clusters to improve the performance of the search processor when the search processor runs. The pre-runtime replication of rules by the bucket packer prevents bank conflict(s) by allowing the search processor to access the rule or a chunk of rules on the second bank when the first bank has a memory access conflict during a particular clock cycle. The bucket packer can also distribute rules across a first cluster and a second cluster within the memory to enable processing of the rules by a rule match engine within the first cluster and a rule match engine within the second cluster. The bucket packer can also store a first rule of a particular bucket of the plurality of buckets in a first cluster of the plurality of clusters, and then store any other rules of the particular bucket in a second cluster. The bucket packer can also allocate a bucket in the same memory cluster as the node of the tree which points to it.

The rule packer can be configured to allocate rules in a particular cluster of the memory. Then, it can allocate a rule associated with the bucket in the particular cluster storing the bucket. The rule packer can further allocate the rules in chunks according to an order of the buckets, determine a need to replicate the rules across the plurality of banks/clusters, and replicating the rules across the plurality of banks/clusters, if necessary.

Figure 18:
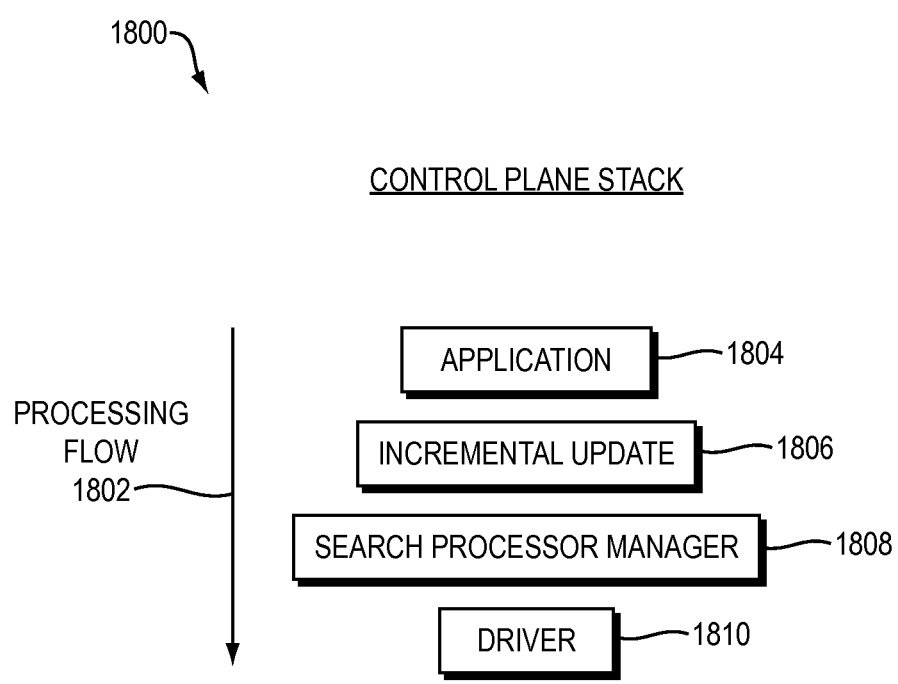
FIG. 18 is a flow diagram illustrating an example embodiment of a control plane stack.

FIG. 18 is a flow diagram 1800 illustrating an example embodiment of a control plane stack. The control plane stack has a processing flow 1802 flowing from an application layer 1804 to an incremental update layer 1806 to a search processor manager 1808 to a driver layer 1810. The application layer can create incremental updates 1806. When an incremental update 1806 needs to be applied to the search processor, the search processor manager 1808 can process the update and apply it to the search processor in a more efficient manner. Upon determining the most efficient manner to apply the update, based on hardware resources of the search processor, the control plane sends the instructions to the drivers 1810.

Figure 19:
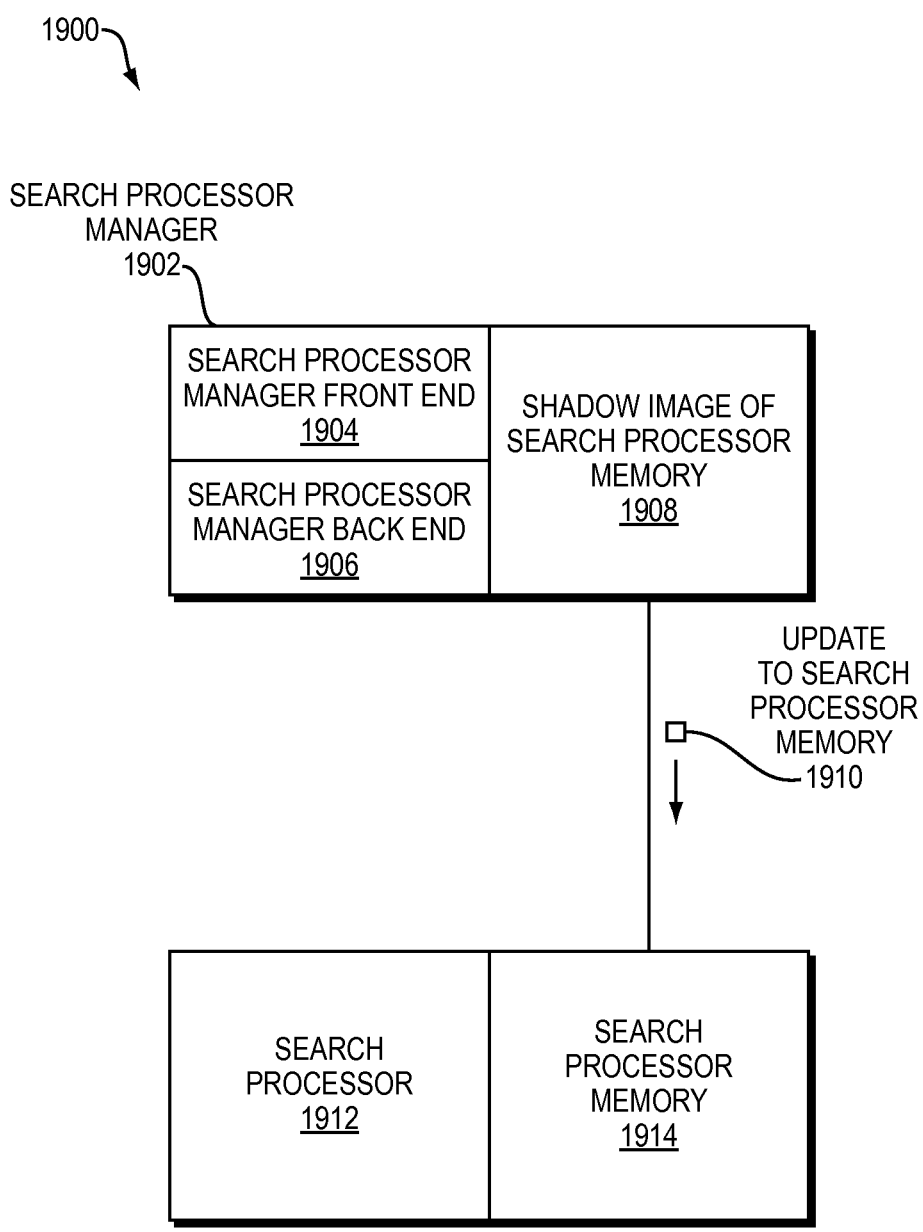
FIG. 19 is a block diagram illustrating an example embodiment of incremental update as managed by a search processor manager for a search processor.

FIG. 19 is a block diagram 1900 illustrating an example embodiment of incremental update as managed by a search processor manager 1902 for a search processor 1912. The search processor manager 1902 includes a search processor manager front end 1904 and a search processor manager back end 1906. The search processor manager front end 1904 interfaces with the application layer to create a new set of rules. The search processor manager back end 1906 receives the set of new rules and interfaces with a shadow image of the search processor memory 1908. The shadow image of the search processor memory 1908 is a copy of the memory that is on the search processor 1914. The shadow image 1908 has the same format as the search processor memory 1914, such as the number of lines the memory has and the width of each line. In addition, the banks and the format of clusters within the shadow image 1908 are identical so that the search processor manager can detect any errors that may occur from the memory being divided into clusters or different banks.

The search processor manager 1902 first creates a full set of memory instructions to write the incremental update to the memory. The series of writes to the memory are typically a series of writes to individual lines within the memory. A given line within the memory can be written to multiple times. Many of the sequential writes to the same line can be either independent of each other or dependent of each other. If a write is independent of another write, the search processor manager 1902 can merge the two writes into one write command. However, if the writes are dependent on each other, the search processor manager cannot merge the writes after the dependency. However, merging independent writes up to any dependency can reduce the total number of writes and improve the speed of writing the incremental update to the memory. Further, independent writes can be issued sequentially, one after another, without waiting for previous writes to complete. Once the independent writes are complete, the dependent writes are issued.

Further, the search processor manager 1902 can determine whether the incremental update has any errors being written to memory, by including a shadow image 1908 and initially writing to the shadow image 1908. Such an error could be running out of memory in a particular cluster or in memory in general. If there is such an error, the search processor manager can revert the shadow image 1908 to the original search processor memory 1914, (or a copy thereof). This way, the search processor 1912 and search processor memory 1914 remain undisturbed and receive no error. Further, the search processor 1912 does not employ a procedure to restore the search processor memory 1914.

In addition, the search processor manager writes data to the clusters in a manner that is optimized for the fact that during each clock cycle, no two ports can access the same bank. Such optimization guarantees the atomicity of write operations. Therefore, the search processor manager writes the rules to the memory first, then the buckets, and then the tree during an incremental update. The search processor manager can write buckets and rules simultaneously if the bucket that points to the rule is stored on the same line as the rule.

Figure 20A:
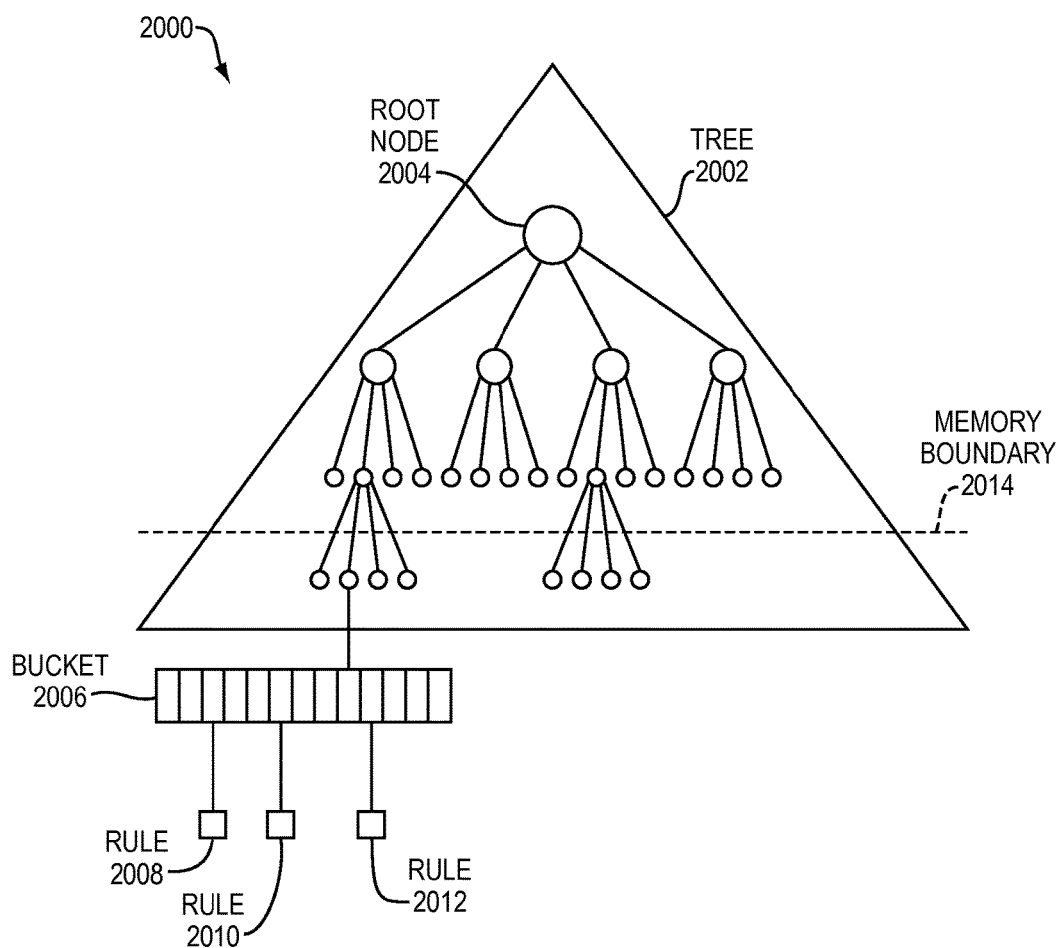
FIG. 20A is a block diagram illustrating an example embodiment of a tree, a bucket and rules.

FIG. 20A is a block diagram 2000 illustrating an example embodiment of a tree 2002, a bucket 2006 and rules 2008, 2010 and 2012. The database, including the tree 2002, bucket 2006, and rules 2008, 2010, and 2012, often cannot be stored in a single cluster of memory of the search processor. The database therefore should be divided into multiple clusters and memory banks. The search processor manager determines how to divide the database into these multiple clusters. In the embodiment shown in the block diagram 2000, the tree 2002 is divided by a horizontal memory boundary 2014. The search processor manager therefore directs all of the tree nodes above the memory boundary 2014 to be stored in a first cluster, and the remainder of the tree, the bucket 2006 and the rules 2008, 2010 and 2012 to be stored in a second cluster. More than two clusters can be employed in the search processor, and the database can be stored in any number of clusters. Two clusters are used in this example embodiment for simplicity.

Figure 20B:
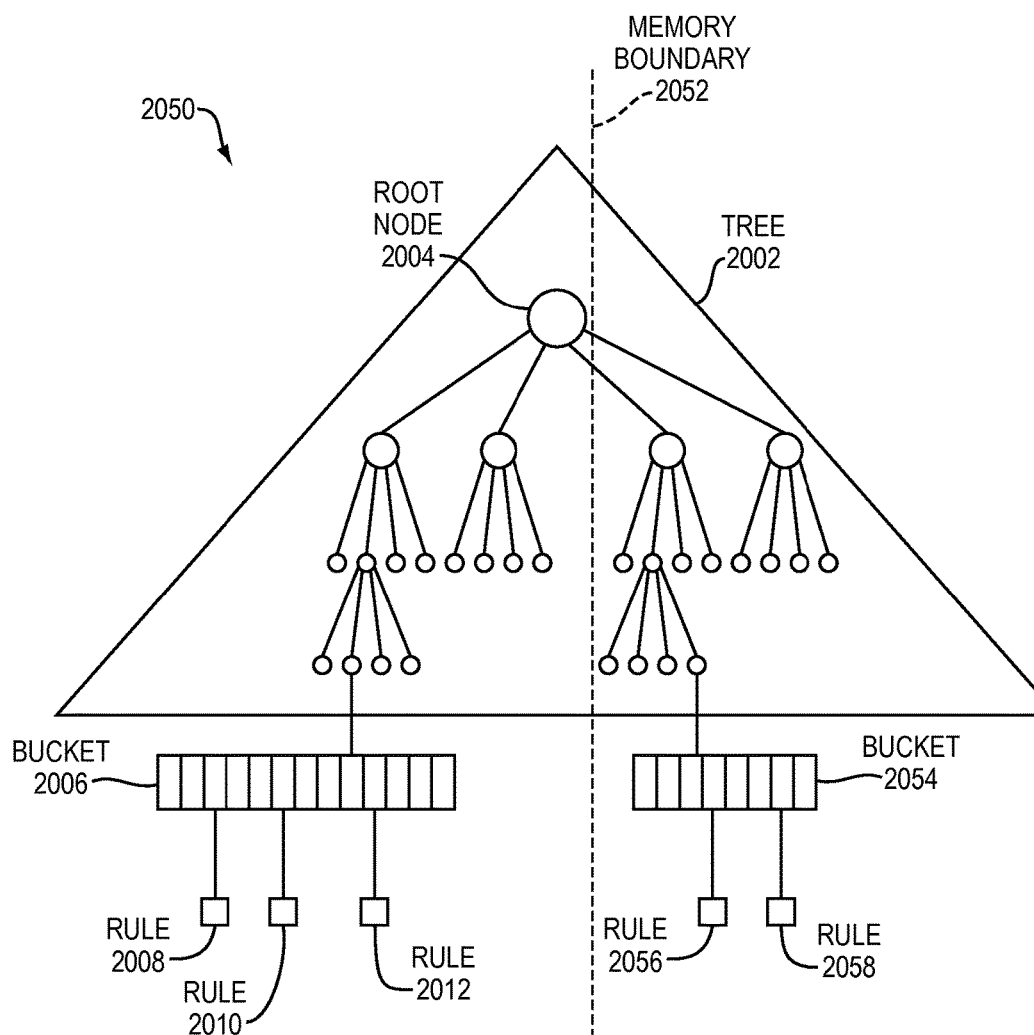
FIG. 20B is a block diagram illustrating an example embodiment of storing the tree, buckets and rules in multiple clusters in the memory.

FIG. 20B is a block diagram 2050 illustrating an example embodiment of storing the tree 2002, buckets 2006 and 2054 and rules 2008, 2010, 2012, 2056 and 2058 in multiple clusters in the memory. In FIG. 20A, one cluster had only tree nodes, while a second cluster had tree nodes, a bucket, and rules. Such a setup can reduce the efficiency of hardware resources of the first cluster because the bucket walk engines and rule match engines of the first cluster either are not used or have to remotely access another cluster, which is a costly operation. In FIG. 20B, the memory boundary 2052 is "vertical." The tree 2002, divided by the memory boundary 2052 is stored in both a first cluster and a second cluster, with the first cluster being on the left, and the second cluster being on the right. However, because the memory boundary 2052 is vertical, the first cluster includes a bucket 2006, and rules 2008, 2010, and 2012. Similarly, the second cluster includes the right side of the tree 2002, and a bucket 2054, and corresponding rules 2056 and 2058. This setup allows the tree walk engines, bucket walk engines, and rule match engines of both the first and second cluster to be utilized without having to remotely read from another cluster. This maximizes the hardware resources of each cluster. The search processor manager is configured to store the database in the clusters in a manner such that the resources of each cluster can be maximized for each clock cycle in this manner.

As described herein, the tree can be stored across a plurality of clusters. In addition, each cluster can store bucket data and rule data. Further, the search processor manager considers distributing data across multiple banks within a cluster. Such a distribution can improve efficiency because each bank can be read by a separate port. Ideally, the search processor manager distributes data such that each port is performing a read from its respective bank on every clock cycle to maximize the throughput of the memory. For this reason, rules can be replicated across multiple banks, so that if there is a bank conflict for a particular bank, another bank may store the same rule and be able to service the request.

For example, consider the example in FIG. 25, which is a diagram 2500 illustrating an example embodiment of memory replication using a Bucket $B_1$ 2502 and a Bucket $B_2$ 2504. Each Bucket $B_1$ 2502 and $B_2$ 2504 points to respective bucket chunks 2506 and 2508. Each bucket chunk 2506 and 2508 includes bucket chunks storing rules, which are to be stored in memory banks 2510 ($b_1$-$b_8$). For example, a first bucket chunk of a first bucket (Bucket $B_1$ 2502) may include Rules 1, 2, and 3 and is stored in memory bank 2510 $b_1$. Other bucket chunks 2506 store rules 4, 5, and 6 (to be stored in memory bank $b_2$), rules 7 and 8 (to be stored in memory bank $b_3$) and rule 9 (to be stored in memory bank $b_4$). Bucket chunks 2508 of the Bucket $B_2$ 2504 may also have some rules which are also part of the Bucket $B_1$ 2502. For example, a second bucket chunk of a second bucket (Bucket $B_2$ 2504) may include rules 1 and 2, which are already stored as part of Bucket $B_1$ in memory bank 2510 $b_1$. A scheme to save memory would only store Rules 1, 2, and 3 with the first bucket chunk of Bucket Chunks 2506, and would not store a separate copy of the second bucket chunk of Bucket Chunks 2508. However, this can lead to memory conflicts while processing bucket chunks of Bucket $B_2$, 2504. As shown in FIG. 25, if the first bucket chunk (containing rules 10 & 11) of Bucket $B_2$, 2504 is stored in memory bank 2510 $b_1$, rules 1 & 2 of second bucket chunk of bucket $B_2$, 2504 may also need to be accessed in the same clock cycle as first bucket chunk (containing rules 10 & 11) and this leads to a bank conflict because both are stored in the same memory bank 2510 $b_1$. Therefore, the second bucket chunk of bucket $B_2$, 2504 containing rules 1 and 2 is replicated and stored in memory bank 2510 $b_4$. This eliminates any possible future memory conflict. However, if there is no potential for a memory conflict, a pointer can point to an already stored rule. Memory replication, if no memory conflict is possible, is not necessary. Therefore, before memory replication, the system determines if storing a pointer would create a memory conflict. The system determines this by determining whether a bucket chunk of the current bucket is stored in the same bank where the pointer would point to. If so, a memory conflict is possible and replication is needed. If not, replication is not needed and a pointer can point to the rules and save memory.

Further, the search processor manager maintains an instant view of each bank of memory in each cluster by maintaining an allocation list and a free list. The allocation list is a list of all of the addresses in memory that have been allocated, and can be represented by a balanced tree or hash. The free list is a list of all of the addresses in memory that are free and can be represented by a linked list sorted by address and free space length. In one embodiment, each bank of memory is 4096 (4K) rows of 256-bit width. The allocation list begins as an empty list because the memory is empty, while the free list begins by designating the first free memory address of the bank (i.e., zero) and the length of the free space (i.e., the size of the bank (4096×256)). Providing a view of the memory in such a manner also allows the search processor manager to defrag the memory, for example, upon an allocation request to a cluster not having enough room. Alternatively, if defragmentation of the cluster is unsuccessful, the search processor manager can move data to another cluster.

Further, each memory allocation request can include a designation of the type of data to be stored (e.g., tree data, bucket data, or rule data). The search processor manager is aware of the data type of each allocation. The manager therefore knows the type of data stored, the cluster number, and bank number of each allocation. For example, when a child node in the tree is allocated, the child being pointed to by a respective parent node, the search processor manager is aware of the child-parent relationship as well. The search processor manager's employs its awareness of tree relationships during allocation to avoid migrations, remote reads, and bank conflicts.

The search processor manager optimizes the memory based on the following guidelines and principles. The RMEs can process rules faster when there are more rules per chunk. However, in search processors with different numbers of cache lines, the optimal number of rules per chunk may be increased or decreased. Therefore, a bucket packer in the search processor manager organizes the buckets to be optimally sized.

The optimization of memory helps prevent the search processor from performing migrations and bank conflicts. Reading from a same cluster in a same bank can take up to four clock cycles. Migrating work from one cluster to another cluster takes 10 clock cycles. However, reading from the same cluster in a different bank only takes one clock cycle. This is the ideal efficiency, and the search processor places tree nodes, buckets and rules within cluster to make this the most likely scenario. Other implementations use more or fewer clock cycles for reading from a same cluster in a same bank, migrating work from one cluster to another cluster, and reading from the same cluster in a different bank. However, even in other implementations, reading from the same cluster in a different bank is the most efficient operation and should therefore be used most often.

Further, within the memory, the search processor manager determines where to place rules and buckets. For example, consider a bucket containing a "Rule 0," "Rule 30," and "Rule 45." If none of the rules are allocated in memory, the search processor manager finds three contiguous memory slots and stores them all in order. However, suppose "Rule 0" is already stored in memory while "Rule 30" and Rule 45" are not stored. If "Rule 30" and "Rule 45" can be stored after "Rule 0," the search processor manager stores them in those locations. However, if there is no room after "Rule 0" to store "Rule 30" and "Rule 45," the search processor manager copies (e.g., replicates) "Rule 0" to another location where "Rule 30" and "Rule 45" can be stored afterwards. The above is one example of one scheme for determining where to place rules and buckets. Other schemes may be employed to place rules and buckets in memory.

Figure 21:
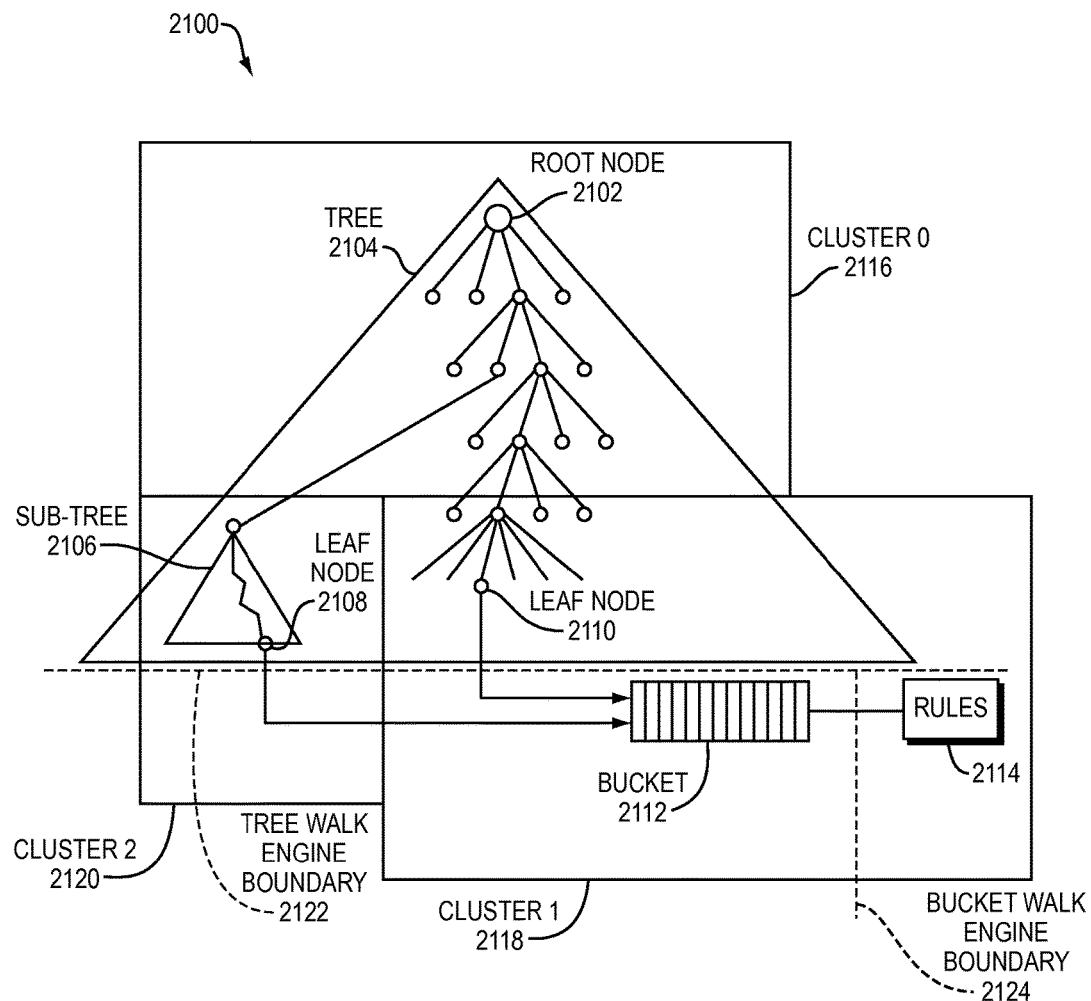
FIG. 21 is a block diagram illustrating an example embodiment of storing the database in a plurality of clusters.

FIG. 21 is a block diagram 2100 illustrating an example embodiment of storing the database in a plurality of clusters 2116, 2118 and 2120. A tree 2104 is stored across cluster 0 2116, cluster 1 2118, and cluster 2 2120. Cluster 0 2116 stores only tree nodes of the tree 2104. Cluster 0 2116, therefore, has the same problem as that shown in FIG. 20A. With reference to FIG. 21, cluster 1 2118 includes tree nodes, including leaf node 2110, pointing to a bucket 2112, which subsequently points to rules 2114. Cluster 1 2118 includes tree nodes, bucket nodes and rules. Therefore, the tree walk engines can pass work to the bucket walk engines once they pass the tree walk engine boundary 2122, and the bucket walk engines can pass work to the rule match engines once a pass the bucket walk engine boundary 2124, all within the same cluster (cluster 1 2118). This is the ideal setup for a cluster.

Cluster 2 2120 includes subtree 2106 with a leaf node 2108 pointing to the bucket 2112. The subtree 2106, for example, can be added to the database as an incremental update. The cluster 2 2120 includes only tree nodes, and therefore has the same problem as cluster 0 2116.

Figure 22A:
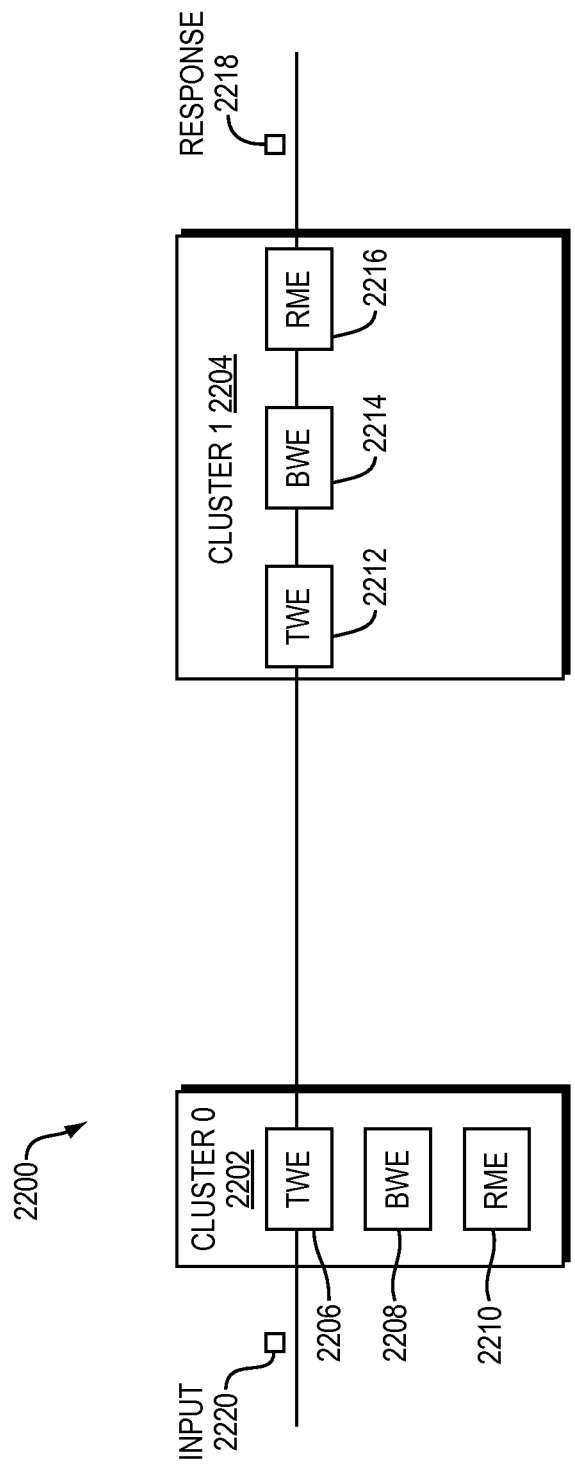
FIG. 22A is a block diagram illustrating an example embodiment of two clusters receiving work in generating a response.

FIG. 22A is a block diagram 2200 illustrating an example embodiment of two clusters 2202 and 2204 receiving work in generating a response 2218. Cluster 0 2202 receives an input 2220 at a tree walk engine 2206. Cluster 0 2202 also has a bucket walk engine 2208 and a rule match engine 2210. The bucket walk engine 2208 and rule match engine 2210 go underutilized because cluster 0 2202 only includes tree nodes and can only utilize the tree walk engine 2206. The tree walk engine 2206 passes the output of its work to the cluster 1 2204 via a migration. The cluster 1 2204 tree walk engine 2212 receives the output of the tree walk engine 2206 and finishes walking the tree. The tree walk engine 2212 then passes its output to a bucket walk engine 2214 which walks the buckets to find a rule, which is passed to a rule match engine 2216, which outputs a response 2218. Even though a response is generated 2218, each clock cycle for the bucket walk engine 2208 and rule match engine 2210 go unused. The search processor manager is designed to make sure that all of the engines, or at least an optimal amount of engines, are being used every clock cycle.

Figure 22B:
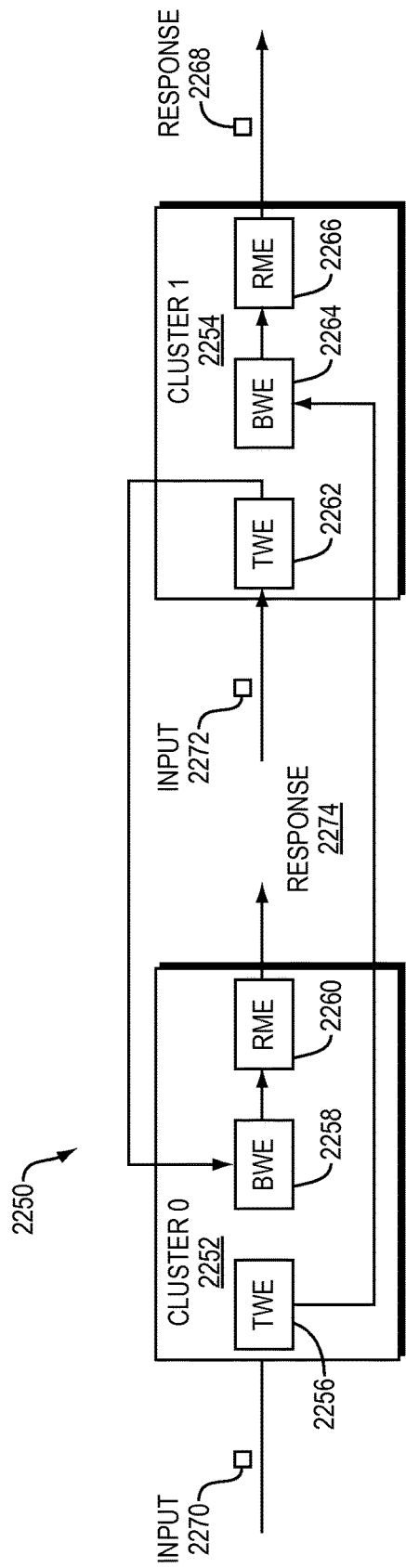
FIG. 22B is a block diagram illustrating a more optimal setup for two clusters.

FIG. 22B is a block diagram 2250 illustrating a more optimal setup for two clusters 2252 and 2254. Cluster 0 2252 receives an input 2270 at its tree walk engine 2256. While the tree walk engine 2256 has to migrate to the cluster 1 2254, it passes work to the bucket walk engine 2264 after finishing walking the tree. Although migrations are not optimal, the cluster 0 2252 also includes buckets and rules which it can do work on while the tree is being walked through. Cluster 1 2254 then processes the bucket at its bucket walk engine 2264 and then processes the rules at the rule match engine 2266 to produce a response 2268. In parallel, cluster 1 also receives an input 2272 at its tree walk engine 2262. The tree walk engine 2262 migrates the work to the bucket walk engine 2258 of cluster 0 after walking through its tree. The bucket walk engine 2258 walks to the bucket, and passes a rule or chunk of rules to the rule match engine 2260. The rule match engine then issues a response 2274. Both cluster 0 2252 and cluster 1 2254 utilize their tree walk engines, bucket walk engines and rule match engines. Further, new work can be pipelined through the clusters, such that when the tree walk engines finish their work, new work comes in and the tree work engines stay utilized.

FIG. 23A is a block diagram 2300 illustrating an example embodiment of migration from cluster to cluster. Cluster 0 2302 receives new work 2310 and performs a migration ($M_{0,1}$) 2312 to cluster 1 2304. Cluster 1 2304 then migrates work to cluster 2 2306 by performing migration ($M_{1,2}$) 2314. Then clustered 2 performs a migration 2316 ($M_{2,3}$) to cluster 3 2308. Cluster 3 then issues a response 2318. While migration is not ideal, the migration shown in FIG. 23A does not include any loops and is therefore acceptable. The job of the search processor manager is to allocate the memory such that loops between clusters do not form during migration.

FIG. 23B is a block diagram 2350 illustrating an example embodiment of a loop formed during migration. Cluster 0 2352 initially migrates work via migration ($M_{0,1}$) 2356 to cluster 1 2354. After performing work, cluster 1 2254 then migrates work via migration ($M_{1,0}$) 2358 back to cluster 0 2352. In this way, a loop is formed between cluster 0 2352 and cluster 1 2354. The job of the search processor manager is to avoid such a loop by configuring the memory in such a way that the loop never forms. This can be performed by confirming that a pointer from one cluster to another cluster does not point to any other nodes in the tree that eventually point back to the original cluster.

Figure 24:
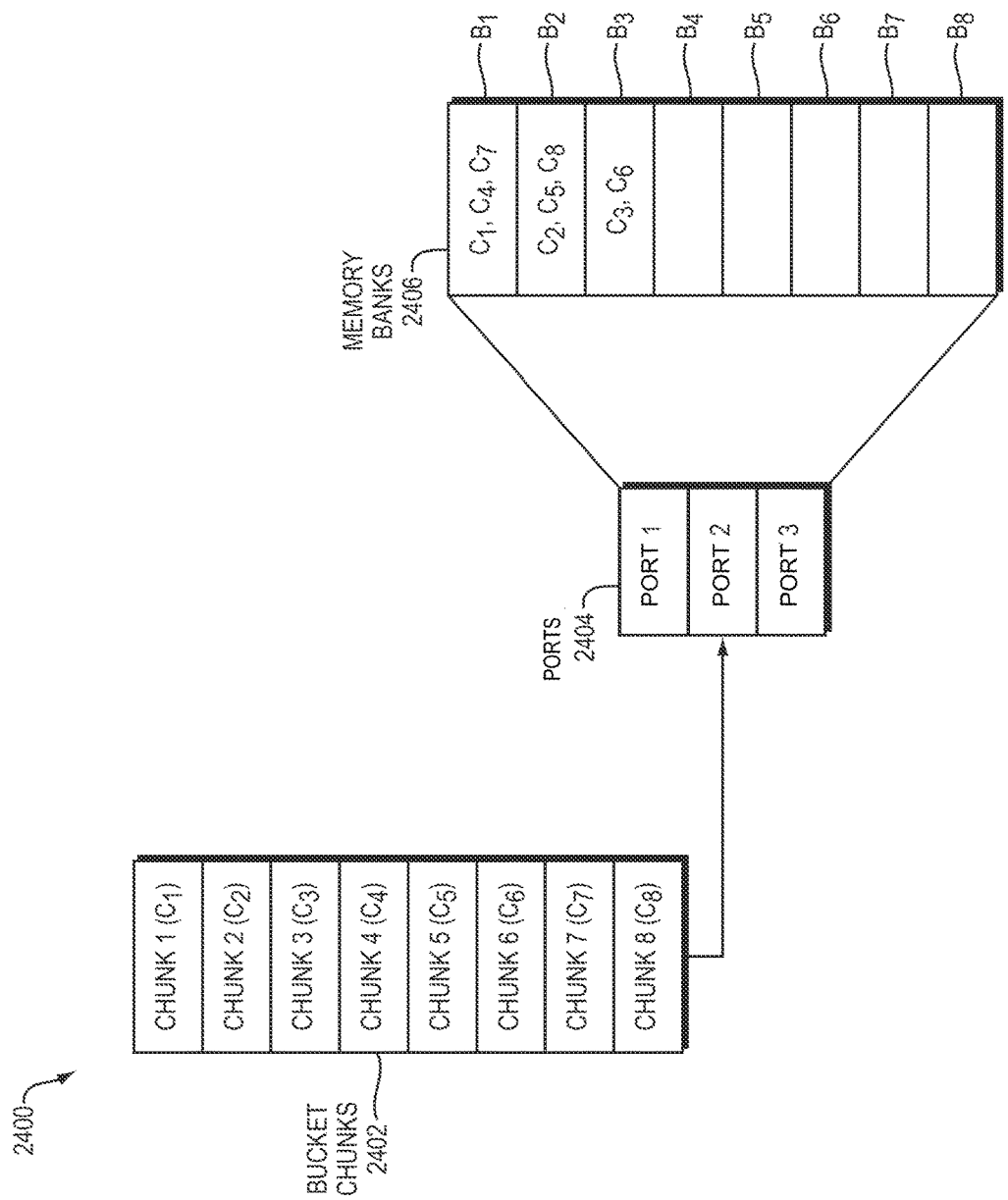
FIG. 24 is a diagram illustrating an example embodiment of writing bucket chunks to memory banks using access ports.

FIG. 24 is a diagram 2400 illustrating an example embodiment of writing bucket chunks 2402 to memory banks 2406 using access ports 2404. After a write request to write bucket chunks 2402 ($C_{1-8}$) to memory banks 2406 ($B_{1-8}$), the system determines a distribution of bucket chunks 2402 over the memory banks 2406 to eliminate memory conflicts over the access ports 2404 (Ports 1-3). Most memory accesses request the buckets 2402 in the order in which they are addressed in the database, such that they are accessed according to the order in which they are stored/addressed. For example, a memory request to access the buckets accesses $C_1$, $C_2$, $C_3$, then $C_4$, and so on. Therefore, ideally any group of consecutive bucket chunks of at most the number of access ports 2404 can be accessed during one clock cycle. Each respective access port 2404 cannot access the same bank twice during one clock cycle, so the bucket chunks 2402 should be distributed in the memory banks 2406 carefully.

FIG. 24 illustrates an example embodiment of distributing the bucket chunks 2402 in the memory banks 2406. In this example, the bucket chunks 2402 are distributed among memory banks 2406 $B_{1-3}$. Bucket chunks $C_1$, $C_4$, and $C_7$ are stored in memory bank $B_1$, bucket chunks $C_2$, $C_5$, and $C_8$ are stored in memory bank $B_2$, and bucket chunks $C_3$ and $C_6$ are stored in memory bank $B_3$. This distribution scheme is a round-robin distribution scheme, but other distribution schemes can be employed, so long as no bucket chunks 2402 that can be accessed in the same clock cycle based on the number of ports (e.g., bucket chunks that are separated by a number of chunks that is less than the number of ports) are stored in the same memory bank 2406. The bucket chunks 2402 are distributed such that the three access ports 2404 can access any three consecutive bucket chunks 2402 in one clock cycle. For example, accessing $C_1$, $C_2$, and $C_3$ can be performed on one clock cycle by utilizing all three ports 2404, each respective port accessing a respective memory bank $B_1$, $B_2$, and $B_3$, where one respective chunk ($C_1$, $C_2$, or $C_3$) are stored. Likewise, accessing $C_5$, $C_6$ and $C_7$ can be performed on one cycle by utilizing all three ports 2404, each respective port accessing a respective memory bank $B_2$, $B_3$, and $B_1$. Other distributions of the bucket chunks 2402 are possible. For example, the bucket chunks 2402, in a system with three ports 2404 can be distributed over three, four, or any number of banks, as long as consecutively addressed chunks are assigned respectively unique memory banks, such that every memory access is able to access consecutively addressed bucket chunks 2402 stored in the memory banks 2406. Different numbers of bucket chunks 2402, ports 2404, and memory banks 2406 can be employed. For example, the number of available access ports 2404 dictates the number of consecutively addressed bucket chunks that can be accessed during one clock cycle. For example, with four access ports 2404, bucket chunks 2402 are distributed over at least four memory banks 2406.

Embodiments may be implemented in hardware, firmware, software, or any combination thereof. It should be understood that the block diagrams may include more or fewer elements, be arranged differently, or be represented differently. It should be understood that implementation may dictate the block and flow diagrams and the number of block and flow diagrams illustrating the execution of embodiments of the invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of managing a database including a tree, a plurality of buckets, and a plurality of rules, the method comprising:
    managing a memory with a plurality of cluster memories, the managing including storing the database across the plurality of cluster memories of the memory and designating a given cluster memory of the plurality of cluster memories as a sink memory cluster; and
    improving performance, of a search processor configured to walk the tree, by packing nodes of the tree in each of the plurality of cluster memories, such that walking the tree by the search processor accesses a minimal amount of cluster memories in the memory and walking the tree by the search processor accesses each particular cluster memory no more than once by configuring the memory in such a way that prevents a migration loop from forming, the configuring including embedding one or more migration instructions in the memory that cause a migrated processing thread of the search processor to migrate to the sink memory cluster, the sink memory cluster configured to end migration of the migrated processing thread.

2. The method of claim 1, further comprising packing a first particular number of bucket chunks per bucket and a second particular number of rule pointers per bucket chunk based on addresses of the rules.

3. The method of claim 1, further comprising allocating the rules in the memory in a same order as an order of the rules in bucket chunks of the buckets.

4. The method of claim 1, further comprising:
    replicating a rule or a chunk of rules across a first and second bank in a particular cluster memory such that the rule or chunk of rules can be accessed on the second bank when the first bank has a memory access conflict during a particular clock cycle.

5. The method of claim 1, further comprising:
distributing rules and buckets across a first cluster memory and a second cluster memory within the memory; and
enabling processing of the rules by a rule match engine within the first cluster memory and a rule match engine within the second cluster memory.

6. The method of claim 1, further comprising:
storing a first rule of a particular bucket of the plurality of buckets in a particular cluster memory of the plurality of cluster memories; and
storing any other rules of the particular bucket in the particular cluster memory.

7. The method of claim 1, further comprising:
allocating a node of the tree in a particular cluster memory of the memory; and
allocating a bucket in the memory that the node of the tree points to in the particular cluster memory.

8. The method of claim 1, further comprising:
allocating a bucket in a particular cluster memory of the memory; and
allocating a rule associated with the bucket in the particular cluster memory storing the bucket.

9. The method of claim 1, further comprising:
allocating the rules in chunks according to an order of the buckets;
determining a need to replicate the rules across the plurality of cluster memories; and
replicating the rules across the plurality of cluster memories, if necessary.

10. The method of claim 1, further comprising:
determining at least one division of the database, the database including the tree, the plurality of buckets, and the plurality of rules, the division based on either a horizontal division, the horizontal division separating the tree based on a depth of data of the tree or a vertical division, the vertical division separating the tree based on sub-trees of the tree; and
generating at least one memory request to store each division of the database in a respective cluster memory.

11. A system for managing a database including a tree, a plurality of buckets, and a plurality of rules, the system comprising:
a search processor configured to walk the tree;
a memory with a plurality of cluster memories, the memory configured to store the database across the plurality of cluster memories, a given cluster memory of the plurality of memories designated as a sink memory; and
a tree packing module configured to improve performance of the search processor by packing nodes of the tree in each of the plurality of cluster memories such that walking the tree by the search processor accesses a minimal amount of cluster memories in the memory and walking the tree by the search processor accesses each particular cluster memory no more than once by configuring the memory in such a way that prevents a migration loop from forming, wherein configuring the memory includes embedding one or more migration instructions in the memory that cause a migrated processing thread of the search processor to migrate to the sink memory cluster, the sink memory cluster configured to end migration of the migrated processing thread.

12. The system of claim 11, further comprising a bucket packing module configured to pack a first particular number of bucket chunks per bucket and a second particular number of rule pointers per bucket chunk based on addresses of the rules.

13. The system of claim 11, wherein a bucket packing module is configured to allocate the rules in the memory in a same order as an order of the rules in bucket chunks of the buckets.

14. The system of claim 11, further comprising:
a bucket packing module configured to replicate a rule or a chunk of rules across a first and second bank in a particular cluster memory such that the rule or chunk of rules can be accessed on the second bank when the first bank has a memory access conflict during a particular clock cycle.

15. The system of claim 11, further comprising a bucket packing module configured to distribute rules and buckets across a first cluster memory and a second cluster memory within the memory and enable processing of the rules by a rule match engine within the first cluster memory and a rule match engine within the second cluster memory.

16. The system of claim 11, further comprising a bucket packing module configured to store a first rule of a particular bucket of the plurality of buckets in a particular cluster memory of the plurality of cluster memories and store any other rules of the particular bucket in the particular cluster memory.

17. The system of claim 11, further comprising a bucket packing module configured to allocate a node of the tree in a particular cluster memory of the memory and allocate a bucket in the memory that the node of the tree points to in the particular cluster memory.

18. The system of claim 11, further comprising a bucket packing module configured to allocate a bucket in a particular cluster memory of the memory, and allocate a rule associated with the bucket in the particular cluster memory storing the bucket.

19. The system of claim 11, further comprising a bucket packing module configured to allocate the rules in chunks according to an order of the buckets, determine a need to replicate the rules across the plurality of cluster memories, replicate the rules across the plurality of cluster memories, if necessary.

20. The system of claim 11, wherein the tree packing module is further configured to determine at least one division of the database, the database including the tree, the plurality of buckets, and the plurality of rules, the division based on either a horizontal division, the horizontal division separating the tree based on a depth of data of the tree or a vertical division, the vertical division separating the tree based on sub-trees of the tree, and generate at least one memory request to store each division of the database in a respective cluster memory.

21. A non-transitory computer-readable medium configured to store instructions for managing a database including a tree, a plurality of buckets, and a plurality of rules, the instructions, when loaded and executed by a control plane processor, causes the control plane processor to:
manage a memory with a plurality of cluster memories used by a search processor to walk the tree the manage operation including storing the database across the plurality of cluster memories of the memory and designating a given cluster memory of the plurality of cluster memories as a sink cluster memory; and
improve performance of the search processor by packing nodes of the tree in each of the plurality of cluster memories such that walking the tree by the search processor accesses a minimal amount of cluster memories in the memory and walking the tree by the search processor accesses each particular cluster memory no more than once by configuring the memory in such a way that prevents a migration loop from forming, wherein configuring the memory includes embedding one or more migration instructions in the memory that cause a migrated processing thread of the search processor to migrate to the sink memory cluster, the sink memory cluster configured to end migration of the migrated processing thread.

* * * * *